United States Patent
Suzuki et al.

(10) Patent No.: US 10,913,855 B2
(45) Date of Patent: Feb. 9, 2021

(54) SILICON-CONTAINING HETEROCYCLIC COMPOUND, AND QUENCHER

(71) Applicant: FUJIFILM Wako Pure Chemical Corporation, Osaka (JP)

(72) Inventors: Katsufumi Suzuki, Saitama (JP); Tetsuji Murase, Saitama (JP); Shigeaki Imazeki, Saitama (JP)

(73) Assignee: FUJIFILM Wako Pure Chemical Corporation, Osaka (JP)

( * ) Notice: Subject to any disclaimer, the term of this patent is extended or adjusted under 35 U.S.C. 154(b) by 0 days.

(21) Appl. No.: 16/311,568

(22) PCT Filed: Jun. 22, 2017

(86) PCT No.: PCT/JP2017/022961
§ 371 (c)(1),
(2) Date: Dec. 19, 2018

(87) PCT Pub. No.: WO2017/222006
PCT Pub. Date: Dec. 28, 2017

(65) Prior Publication Data
US 2019/0233651 A1 Aug. 1, 2019

(30) Foreign Application Priority Data
Jun. 22, 2016 (JP) .................. 2016-124017

(51) Int. Cl.
| | |
|---|---|
| *C07F 7/10* | (2006.01) |
| *C08F 230/08* | (2006.01) |
| *C08F 30/08* | (2006.01) |
| *C09B 11/28* | (2006.01) |
| *C09B 69/10* | (2006.01) |
| *C09K 3/00* | (2006.01) |
| *G02B 5/20* | (2006.01) |
| *G02B 5/22* | (2006.01) |
| *G02F 1/1335* | (2006.01) |

(52) U.S. Cl.
CPC ............ *C09B 69/104* (2013.01); *C08F 30/08* (2013.01); *C08F 230/08* (2013.01); *C09B 11/28* (2013.01); *C09B 69/101* (2013.01); *C09K 3/00* (2013.01); *G02B 5/20* (2013.01); *G02B 5/223* (2013.01); *G02F 1/133514* (2013.01); *C07F 7/10* (2013.01); *G02F 2202/022* (2013.01)

(58) Field of Classification Search
CPC ....... C07F 7/0816; C08F 30/08; C08F 230/08
See application file for complete search history.

(56) References Cited

U.S. PATENT DOCUMENTS

| | | | |
|---|---|---|---|
| 2014/0314677 A1* | 10/2014 | Groves | ........... G01N 33/56966 424/9.6 |
| 2016/0040013 A1 | 2/2016 | Shida et al. | |
| 2017/0137553 A1 | 5/2017 | Kimura et al. | |

FOREIGN PATENT DOCUMENTS

| | | |
|---|---|---|
| EP | 2 957 578 | 12/2015 |
| JP | 2010-249870 | 11/2010 |
| JP | 2011-241372 | 12/2011 |
| WO | 2014/126167 | 8/2014 |

OTHER PUBLICATIONS

Egawa et al. J. Ann. Chem. Soc. 2011, 133, 14157-14159. (Year: 2011).*

* cited by examiner

*Primary Examiner* — Amanda L. Aguirre
(74) *Attorney, Agent, or Firm* — Hamre, Schumann, Mueller & Larson, P.C.

(57) ABSTRACT

Quenchers of the related art do not have a quenching ability high enough to sufficiently inhibit the emission of fluorescence from fluorescence compounds. Therefore, the present invention aims to provide a quencher which can sufficiently quench the fluorescence from fluorescent compounds including xanthene-based dyes. The present invention relates to a quencher formed of a compound represented by the following general formula (1), and the like.

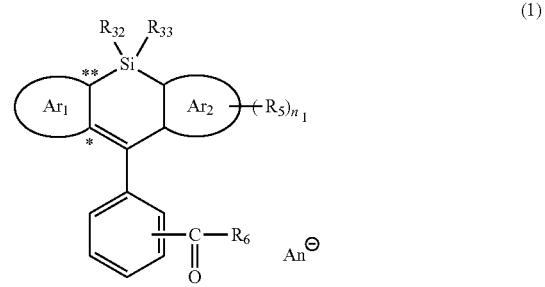

(1)

(In the formula, $n_1$ pieces of $R_5$ each independently represent a group having a polymerizable unsaturated group, an amino group having a substituent, or the like, $R_6$ represents a group having a polymerizable unsaturated group, a hydroxy group, or the like, $An^-$ represents an anion, $Ar_1$ represents a specific ring structure, * and ** each represent a position of bonding to the specific ring structure, $Ar_2$ represents a benzene ring or the like, in a case where $Ar_2$ is the benzene ring, $n_1$ represents an integer of 0 to 4, and $R_{32}$ and $R_{33}$ each independently represent an alkyl group or an aryl group.).

6 Claims, No Drawings

SILICON-CONTAINING HETEROCYCLIC COMPOUND, AND QUENCHER

TECHNICAL FIELD

The present invention relates to a quencher used for color filters in color liquid crystal displays or color image pickup tube elements and the like, a compound used as the quencher and the like, and a polymer having a monomer unit derived from the compound.

BACKGROUND ART

Generally, a color filter is constituted with a transparent substrate such as glass and fine belt (stripe)-like filter segments (pixels) formed of filter layers of various colors formed on a surface of the substrate. The filter segments are arranged to be parallel to each other or to cross each other, or arranged as uniform vertical or horizontal arrays. On the color filter, a transparent electrode or an alignment film is formed, and in order to make these sufficiently function, a step of forming these needs to be performed at a high temperature which is generally equal to or higher than 150° C. and preferably equal to or higher than 200° C.

As a quality item required for the color filter, brightness or a contrast ratio can be exemplified. Because a color filter with a low contrast ratio results in a blurred screen, the contrast ratio needs to be increased. In addition, because a color filter with low brightness has a low light transmittance and results in a dark screen, the brightness of the color filter needs to be increased.

As color filters solving the problems of brightness and contrast ratio, various color filters have been reported which use a dye having a xanthene skeleton such as a rhodamine dye or a dye based on the xanthene. For example, JP2011-241372A has reported a rhodamine dye suitably used in an ink for a color filter and the like. In addition, JP2010-249870A has reported a colored composition for a color filter containing a xanthene-based dye and the like, and WO2014/126167A has reported a colored composition containing a cationic rhodamine derivative having a specific anion and the like.

CITATION LIST

Patent Literature

Patent Literature 1: JP2011-241372A
Patent Literature 2: JP2010-249870A
Patent Literature 3: WO2014/126167A

SUMMARY OF INVENTION

Technical Problem

The xanthene-based dye emits fluorescence and thus has a problem of reducing the contrast ratio. Therefore, the quenchers of the related art were examined, but there was no quencher having a quenching ability high enough to sufficiently inhibit the emission of fluorescence from the xanthene-based dye. Accordingly, the present invention aims to provide a quencher which can sufficiently quench the fluorescence from fluorescent compounds including xanthene-based dyes.

Solution to Problem

In view of the situation, the inventors of the present invention conducted an in-depth study. As a result, the inventors have found that a compound having a specific structure is useful as a quencher for various fluorescent compounds such as xanthene-based dyes.

In addition, the inventors have found that in a case where a compound, which has a specific anion as a counter anion and has a polymerizable unsaturated group, or a polymer having a monomer unit derived from the compound is used, in addition to a quenching effect on fluorescent compounds, high heat resistance, elution resistance, and weather fastness are obtained. Based on these finding, the inventors have accomplished the present invention.

That is, the present invention relates to "a quencher comprising a compound represented by the following general formula (1) (hereinafter, simply described as quencher of the present invention in some cases),

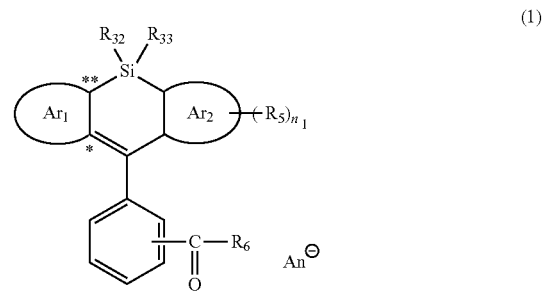

(1)

{in the formula, $n_1$ pieces of $R_5$ each independently represent a group having a polymerizable unsaturated group, a halogeno group, an alkyl group having 1 to 20 carbon atoms, an alkoxy group having 1 to 20 carbon atoms, an alkylthio group having 1 to 20 carbon atoms, an amino group which has a substituent or is unsubstituted, a hydroxy group, an aryl group having 6 to 14 carbon atoms, an aryloxy group having 6 to 14 carbon atoms, or an arylalkyl group having 7 to 20 carbon atoms, $R_6$ represents a group having a polymerizable unsaturated group, a hydroxy group, an alkoxy group having 1 to 20 carbon atoms, an amino group which has a substituent or is unsubstituted, or a heterocyclic amino group, $An^-$ represents an anion, $Ar_1$ represents a ring structure represented by any of the following general formulae (1-1) to (1-7), and * and ** each represent a position of bonding to the ring structure represented by any of the general formulae (1-1) to (1-7);

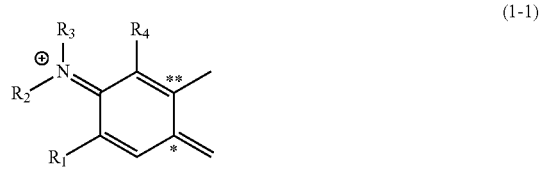

(1-1)

(in the formula, $R_1$ and $R_4$ each represent a hydrogen atom, $R_2$ and $R_3$ each independently represent a group having a polymerizable unsaturated group, an alkyl group having 1 to 20 carbon atoms, or an aryl group having 6 to 14 carbon atoms that has a substituent or is unsubstituted, * and ** each represent the same position as the position represented by each of * and ** in the general formula (1), $R_1$ and $R_2$ may form an alkylene group having 2 to 4 carbon atoms together, and $R_3$ and $R_4$ may form an alkylene group having 2 to 4 carbon atoms together),

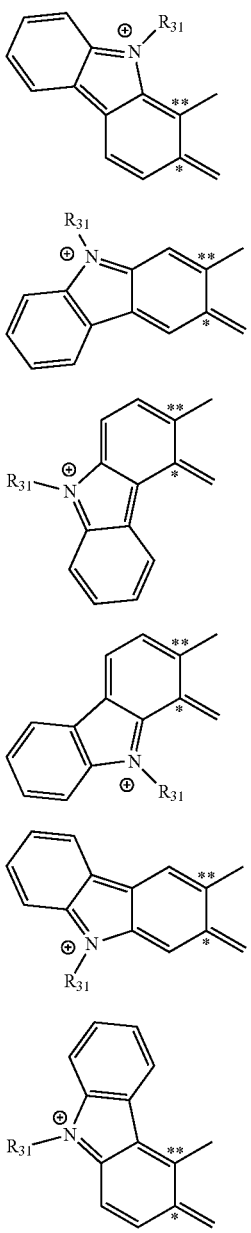

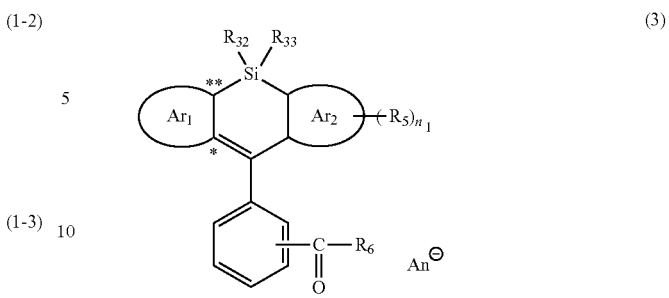

(in the formulae, $R_{31}$ represents a group having a polymerizable unsaturated group or an alkyl group having 1 to 20 carbon atoms, and * and ** each represent the same position as the position represented by each of * and ** in the general formula (1)), Ar$_2$ represents a benzene ring, a naphthalene ring, or an anthracene ring, in a case where Ar$_2$ is the benzene ring, $n_1$ represents an integer of 0 to 4, in a case where Ar$_2$ is the naphthalene ring, $n_1$ represents an integer of 0 to 6, in a case where Ar$_2$ is the anthracene ring, $n_1$ represents an integer of 0 to 8, and $R_{32}$ and $R_{33}$ each independently represent an alkyl group having 1 to 6 carbon atoms or an aryl group having 6 to 14 carbon atoms.}", "a compound represented by the following general formula (3) (hereinafter, simply described as compound of the present invention in some cases)

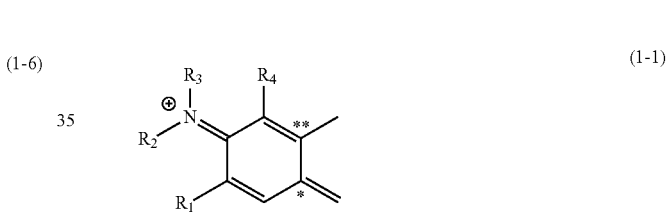

{in the formula, $n_1$ pieces of $R_5$ each independently represent a group having a polymerizable unsaturated group, a halogeno group, an alkyl group having 1 to 20 carbon atoms, an alkoxy group having 1 to 20 carbon atoms, an alkylthio group having 1 to 20 carbon atoms, an amino group which has a substituent or is unsubstituted, a hydroxy group, an aryl group having 6 to 14 carbon atoms, an aryloxy group having 6 to 14 carbon atoms, or an arylalkyl group having 7 to 20 carbon atoms, $R_6$ represents a group having a polymerizable unsaturated group, a hydroxy group, an alkoxy group having 1 to 20 carbon atoms, an amino group which has a substituent or is unsubstituted, or a heterocyclic amino group, An$^-$ represents an anion, Ar$_1$ represents a ring structure represented by any of the following general formulae (1-1) to (1-7), and * and ** each represent a position of bonding to the ring structure represented by any of the general formulae (1-1) to (1-7);

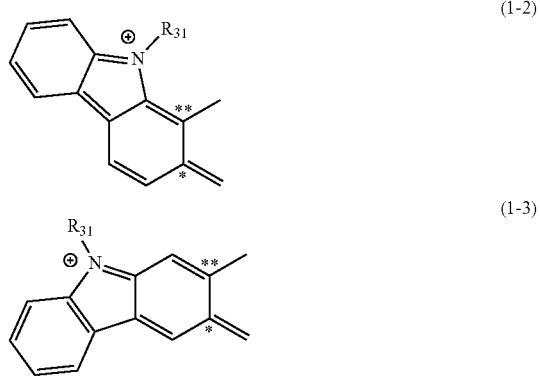

(in the formula, $R_1$ and $R_4$ each represent a hydrogen atom, $R_2$ and $R_3$ each independently represent a group having a polymerizable unsaturated group, an alkyl group having 1 to 20 carbon atoms, or an aryl group having 6 to 14 carbon atoms that has a substituent or is unsubstituted, * and ** each represent the same position as the position represented by each of * and ** in the general formula (1), $R_1$ and $R_2$ may form an alkylene group having 2 to 4 carbon atoms together, and $R_3$ and $R_4$ may form an alkylene group having 2 to 4 carbon atoms together), -continued

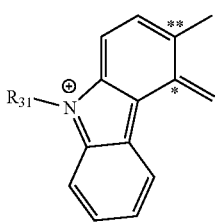
(1-4)

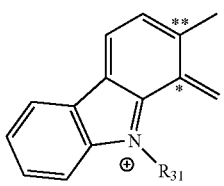
(1-5)

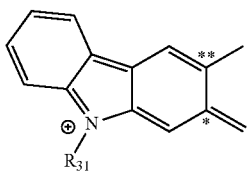
(1-6)

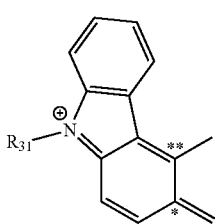
(1-7)

(in the formulae, $R_{31}$ represents a group having a polymerizable unsaturated group or an alkyl group having 1 to 20 carbon atoms, and * and ** each represent the same position as the position represented by each of * and ** in the general formula (1)), $Ar_2$ represents a benzene ring, a naphthalene ring, or an anthracene ring, in a case where $Ar_2$ is the benzene ring, $n_1$ represents an integer of 0 to 4, in a case where $Ar_2$ is the naphthalene ring, $n_1$ represents an integer of 0 to 6, in a case where $Ar_2$ is the anthracene ring, $n_1$ represents an integer of 0 to 8, $R_{32}$ and $R_{33}$ each independently represent an alkyl group having 1 to 6 carbon atoms or an aryl group having 6 to 14 carbon atoms, and at least one of $R_2$, $R_3$, $n_1$ pieces of $R_5$, $R_6$, and $R_{31}$ is a group having a polymerizable unsaturated group.}", and "a polymer having a monomer unit derived from the compound represented by the general formula (3) (hereinafter, simply described as polymer of the present invention in some cases)".

Advantageous Effects of Invention

In a case where the quencher of the present invention is used, the fluorescence which cannot be quenched by the quenchers of the related art, for example, the fluorescence emitted from xanthene-based dyes and the like can be effectively quenched. That is, a color filter containing the quencher of the present invention inhibits the fluorescence emitted from various fluorescent compounds such as xanthene-based dyes and brings about an effect of obtaining a high contrast ratio.

In addition, the compound of the present invention or the polymer of the present invention less undergoes heating-induced fading even in a case where the compound or the polymer is heated to a temperature of 150° C. to 250° C., and brings about a high heat resistant effect, in addition to the quenching effect. That is, a colored composition containing the compound of the present invention or the polymer of the present invention brings about not only the effect of obtaining a high contrast ratio but also the effect of obtaining heat resistance equivalent to or higher than that of colored compositions of the related art, and can form an excellent colored cured film. Therefore, the colored composition containing the compound of the present invention or the polymer of the present invention can be used for forming colored pixels of color filters used in liquid crystal display (LCD), a solid-state imaging device (CCD, CMOS, or the like), and can used in printing ink, ink jet ink, paint, and the like. Particularly, the colored composition is suitable for color filters of a liquid crystal display. Furthermore, the colored composition containing the compound of the present invention or the polymer of the present invention can be used as a colored resin molded material by being molded into a sheet, a film, a bottle, a cup, and the like by means of molding methods known in the related art. Accordingly, the colored composition can also be used for eyeglasses, colored contact lenses, and the like. By being made into a multilayer structure with a known resin, the colored composition can also be used for the same uses. In addition, for example, the colored composition can be used for optical films, hair coloring agents, labeling substances for compounds or biological substances, materials for organic solar cells, and the like.

DESCRIPTION OF EMBODIMENTS

In the following description, Me represents a methyl group, Et represents an ethyl group, Pr represents a propyl group, Bu represents a butyl group, and n- represents a normal-compound.

Quencher of Present Invention

The quencher of the present invention is formed of a compound represented by a general formula (1).

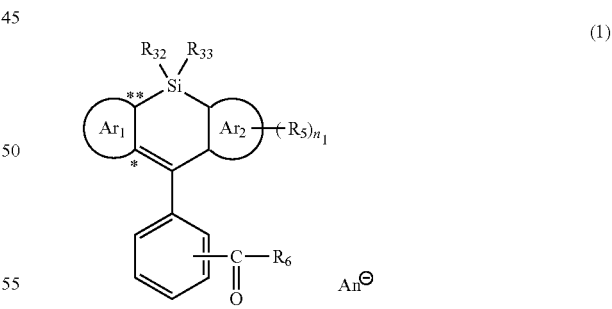
(1)

{In the formula, $n_1$ pieces of $R_5$ each independently represent a group having a polymerizable unsaturated group, a halogeno group, an alkyl group having 1 to 20 carbon atoms, an alkoxy group having 1 to 20 carbon atoms, an alkylthio group having 1 to 20 carbon atoms, an amino group which has a substituent or is unsubstituted, a hydroxy group, an aryl group having 6 to 14 carbon atoms, an aryloxy group having 6 to 14 carbon atoms, or an arylalkyl group having 7 to 20 carbon atoms, $R_6$ represents a group having a polymerizable unsaturated group, a hydroxy group, an alkoxy group having 1 to 20 carbon atoms, an amino group which has a substituent or is unsubstituted, or a heterocyclic amino group, An⁻ represents an anion, Ar₁ represents a ring structure represented by any of the following general formulae (1-1) to (1-7), and * and ** each represent a position of bonding to the ring structure represented by any of the general formulae (1-1) to (1-7);

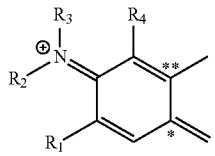

(1-1)

(in the formula, R₁ and R₄ each represent a hydrogen atom, R₂ and R₃ each independently represent a group having a polymerizable unsaturated group, an alkyl group having 1 to 20 carbon atoms, or an aryl group having 6 to 14 carbon atoms that has a substituent or is unsubstituted, * and ** each represent the same position as the position represented by each of * and ** in the general formula (1), R₁ and R₂ may form an alkylene group having 2 to 4 carbon atoms together, and R₃ and R₄ may form an alkylene group having 2 to 4 carbon atoms together),

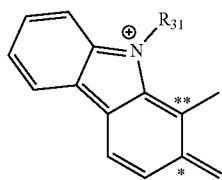

(1-2)

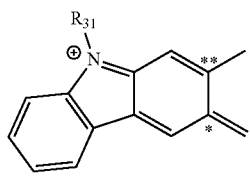

(1-3)

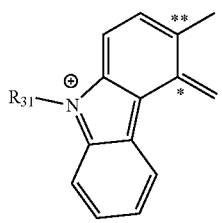

(1-4)

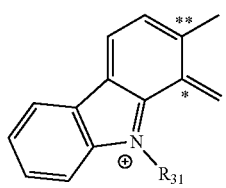

(1-5)

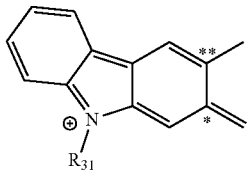

(1-6)

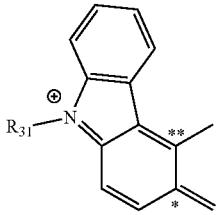

(1-7)

(in the formulae, R₃₁ represents a group having a polymerizable unsaturated group or an alkyl group having 1 to 20 carbon atoms, and * and ** each represent the same position as the position represented by each of * and ** in the general formula (1), Ar₂ represents a benzene ring, a naphthalene ring, or an anthracene ring, in a case where Ar₂ is the benzene ring, n₁ represents an integer of 0 to 4, in a case where Ar₂ is the naphthalene ring, n₁ represents an integer of 0 to 6, in a case where Ar₂ is the anthracene ring, n₁ represents an integer of 0 to 8, and R₃₂ and R₃₃ each independently represent an alkyl group having 1 to 6 carbon atoms or an aryl group having 6 to 14 carbon atoms.}

Group Having Polymerizable Unsaturated Group

The groups having a polymerizable unsaturated group represented by R₂, R₃, R₅, R₆, and R₃₁ are not limited as long as they have a polymerizable unsaturated group on a terminal of a functional group. Examples of the groups having a polymerizable unsaturated group include an acryloyl group, a methacryloyl group, a vinylaryl group, a vinyloxy group, an allyl group, and the like. Among these, the acryloyl group and the methacryloyl group are preferable, and the methacryloyl group is more preferable.

Among the groups having a polymerizable unsaturated group represented by R₅ and R₆, a group represented by the following general formula (2) can be exemplified as a preferred specific example.

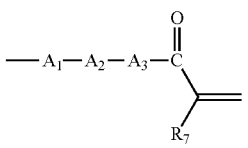

(2)

{In the formula, R₇ represents a hydrogen atom or a methyl group, A₁ represents —O— or a group represented by the following general formula (2-1), A₂ represents an alkylene group having 1 to 21 carbon atoms that has at least one group selected from —O—, —OCO—, —COO—, —NHCO—, —CONH—, —NHCONH—, and an arylene group in the chain; an alkylene group having 1 to 21 carbon atoms that has at least one group selected from —O—, —OCO—, —COO—, —NHCO—, —CONH—, —NHCONH—, and an arylene group in the chain and has a hydroxy group as a substituent; an alkylene group having 1 to 21 carbon atoms that has a hydroxy group as a substituent; or an alkylene group having 1 to 21 carbon atoms, $A_3$ represents —$NR_{10}$— or —O—, and $R_{10}$ represents a hydrogen atom or an alkyl group having 1 to 12 carbon atoms;

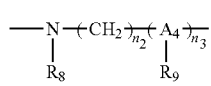
(2-1)

[in the formula, $R_8$ represents a hydrogen atom, an alkyl group having 1 to 12 carbon atoms, or a group represented by the following general formula (2-4), $R_9$ represents a hydrogen atom or an alkyl group having 1 to 12 carbon atoms, $A_4$ represents a nitrogen atom or a group represented by the following formula (2-2), $n_2$ represents an integer of 0 to 3, $R_8$ and $R_9$ may form a cyclic structure of a 5- or 6-membered ring together with —N—$(CH_2)_{n2}$-$(A_4)_{n3}$- bonded to $R_8$ and $R_9$, in a case where $R_8$, $R_9$, and —N—$(CH_2)_{n2}$-$(A_4)_{n3}$- form the cyclic structure of a 5- or 6-membered ring, $n_3$ represents 1, and in a case where $R_8$, $R_9$, and —N—$(CH_2)_{n2}$-$(A_4)_{n3}$- do not form the cyclic structure of a 5- or 6-membered ring, $n_3$ represents 0 or 1;

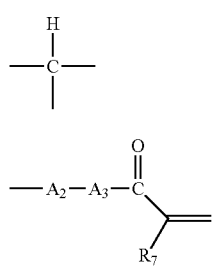
(2-2)

(2-4)

(in the formulae, $R_7$, $A_2$, and $A_3$ are the same as $R_7$, $A_2$, and $A_3$ described above.).].}

As $R_7$ in the general formulae (2) and (2-4), a methyl group is preferable.

In a case where $R_5$ is the group represented by the general formula (2), as $A_1$ in the general formula (2), the group represented by the general formula (2-1) is preferable. In a case where $R_6$ is the group represented by the general formula (2), as $A_1$ in the general formula (2), —O— is preferable.

The alkylene group having 1 to 21 carbon atoms in "alkylene group having 1 to 21 carbon atoms that has at least one group selected from —O—, —OCO—, —COO—, —NHCO—, —CONH—, —NHCONH—, and an arylene group in the chain", "alkylene group having 1 to 21 carbon atoms that has at least one group selected from —O—, —OCO—, —COO—, —NHCO—, —CONH—, —NHCONH—, and an arylene group in the chain and has a hydroxy group as a substituent", "alkylene group having 1 to 21 carbon atoms that has a hydroxy group as a substituent, and "alkylene group having 1 to 21 carbon atoms" represented by $A_2$ in the general formulae (2) and (2-4) may be any of linear, branched, and cyclic alkylene groups. Among these, the linear alkylene group is preferable. In addition, among the alkylene groups having 1 to 21 carbon atoms, an alkylene group having 1 to 12 carbon atoms is preferable, an alkylene group having 1 to 6 carbon atoms is more preferable, and an alkylene group having 1 to 3 carbon atoms is even more preferable. Specifically, examples thereof include a methylene group, an ethylene group, a trimethylene group, a propylene group, a tetramethylene group, a 1-methyltrimethylene group, a 2-methyltrimethylene group, a 1,2-dimethylethylene group, a 1,1-dimethylethylene group, an ethyl ethylene group, a pentamethylene group, a 1-methyltetramethylene group, a 2-methyltetramethylene group, a 1,2-dimethyltrimethylene group, a 1-ethyltrimethylene group, a hexamethylene group, a methyl pentamethylene group, a n-heptylene group, a n-octylene group, a n-nonylene group, a n-decylene group, a n-undecylene group, a n-dodecylene group, n-tridecylene group, a n-tetradecylene group, a n-pentadecylene group, n-hexadecylene group, a n-heptadecylene group, a n-octadecylene group, a n-nonadecylene group, a n-eicosylene group, a n-heneicosylene group, a —$C_4H_6$—$CH_2$— group, a —$C_5H_8$—$CH_2$— group, a —$C_6H_{10}$—$CH_2$— group, a —$C_6H_{10}$—$C_2H_4$— group, a —$C_6H_{10}$—$C_3H_6$— group, a —$C_7H_{12}$—$CH_2$— group, and the like. Among these, the methylene group, the ethylene group, the trimethylene group, the tetramethylene group, the pentamethylene group, the hexamethylene group, the —$C_6H_{10}$—$CH_2$— group, the —$C_6H_{10}$—$C_2H_4$— group, and the —$C_6H_{10}$—$C_3H_6$— group are preferable, the methylene group, the ethylene group, the trimethylene group, the tetramethylene group, the pentamethylene group, and the hexamethylene group are more preferable, the methylene group, the ethylene group, and the trimethylene group are even more preferable, and the ethylene group is particularly preferable.

Examples of the arylene group in "alkylene group having 1 to 21 carbon atoms that has at least one group selected from —O—, —OCO—, —COO—, —NHCO—, —CONH—, —NHCONH—, and an arylene group in the chain" and "alkylene group having 1 to 21 carbon atoms that has at least one group selected from —O—, —OCO—, —COO—, —NHCO—, —CONH—, —NHCONH—, and an arylene group in the chain and has a hydroxy group as a substituent" represented by $A_2$ in the general formulae (2) and (2-4) include an arylene group having 6 to 10 carbon atoms. Specifically, examples thereof include a phenylene group, a naphthylene group, and the like.

Examples of "alkylene group having 1 to 21 carbon atoms that has at least one group selected from —O—, —OCO—, —COO—, —NHCO—, —CONH—, —NHCONH—, and an arylene group in the chain" represented by $A_2$ in the general formulae (2) and (2-4) include groups represented by the following general formulae (21-1) to (21-5), and the like.

(21-1)

(In the formula, $R_{51}$ and $R_{52}$ each independently represent a linear or branched alkylene group having 1 to 4 carbon atoms, and $h_1$ represents an integer of 1 to 9. Here, the total number of carbon atoms in the formula is 2 to 21.)

(21-2)

(In the formula, $h_2$ and $h_3$ each independently represent an integer of 1 to 10.)

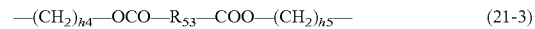
(21-3)

(In the formula, $R_{53}$ represents a phenylene group or an alkylene group having 1 to 7 carbon atoms, and $h_4$ and $h_5$ each independently represent an integer of 1 to 3.)

(21-4)

(In the formula, $A_5$ represents —NHCO—, —CONH—, or —NHCONH—, and $h_6$ and $h_7$ each independently represent an integer of 1 to 10.)

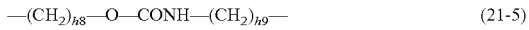
(21-5)

(In the formula, $h_8$ and $h_9$ each independently represent an integer of 1 to 10.)

Specifically, examples of the linear or branched alkylene group having 1 to 4 carbon atoms represented by $R_{51}$ and $R_{52}$ in the general formula (21-1) include a methylene group, an ethylene group, a trimethylene group, a propylene group, a tetramethylene group, a 1-methyltrimethylene group, a 2-methyltrimethylene group, a 1,2-dimethylethylene group, a 1,1-dimethylethylene group, an ethyl ethylene group, and the like. Among these, the ethylene group and the propylene group are preferable.

As $h_2$ in the general formula (21-2), an integer of 1 to 3 is preferable, and 2 is more preferable.

As $h_3$ in the general formula (21-2), 2 is preferable.

Specifically, examples of the alkylene group having 1 to 7 carbon atoms represented by $R_{53}$ in the general formula (21-3) include a methylene group, an ethylene group, a trimethylene group, a tetramethylene group, a pentamethylene group, a hexamethylene group, a n-heptylene group, a cyclobutylene group, a cyclopentylene group, a cyclohexylene group, a cycloheptylene group, and the like.

It is preferable that $h_4$ and $h_5$ in the general formula (21-3) are the same as each other. As $h_4$ and $h_5$, an integer of 1 to 3 is preferable, and 2 is more preferable.

As $A_5$ in the general formula (21-4), —NHCONH— is preferable.

It is preferable that $h_6$ and $h_7$ in the general formula (21-4) are the same as each other. As $h_6$ and $h_7$, 2 is preferable.

It is preferable that $h_8$ and $h_9$ in the general formula (21-5) are the same as each other. As $h_8$ and $h_9$, an integer of 1 to 4 is preferable.

Specific examples of the group represented by the general formula (21-1) include —$CH_2CH_2$—O—$CH_2CH_2$—, —($CH_2CH_2$—O)$_2$—$CH_2CH_2$—, —($CH_2CH_2$—O)$_3$—$CH_2CH_2$—, —($CH_2CH_2$—O)$_4$—$CH_2CH_2$—, —($CH_2CH_2$—O)$_5$—$CH_2CH_2$—, —($CH_2CH_2$—O)$_6$—$CH_2CH_2$—, —($CH_2CH_2$—O)$_7$—$CH_2CH_2$—, —($CH_2CH_2$—O)$_8$—$CH_2CH_2$—, —($CH_2CH_2$—O)$_9$—$CH_2CH_2$—, —$CH_2CH(CH_3)$—O—$CH_2CH(CH_3)$—, —($CH_2CH(CH_3)$—O)$_2$—$CH_2CH(CH_3)$—, —($CH_2CH(CH_3)$—O)$_3$—$CH_2CH(CH_3)$—, —($CH_2CH(CH_3)$—O)$_4$—$CH_2CH(CH_3)$—, —($CH_2CH(CH_3)$—O)$_5$—$CH_2CH(CH_3)$—, —($CH_2CH(CH_3)$—O)$_6$—$CH_2CH(CH_3)$—, —$CH(CH_3)CH_2$—O—$CH(CH_3)CH_2$—, —($CH(CH_3)CH_2$—O)$_2$—$CH(CH_3)CH_2$—, —($CH(CH_3)CH_2$—O)$_3$—$CH(CH_3)CH_2$—, —($CH(CH_3)CH_2$—O)$_4$—$CH(CH_3)CH_2$—, —($CH(CH_3)CH_2$—O)$_5$—$CH(CH_3)CH_2$—, —($CH(CH_3)CH_2$—O)$_6$—$CH(CH_3)CH_2$—, —$CH(CH_3)CH_2$—O—$CH_2CH(CH_3)$—, and the like.

Specifically, examples of the group represented by the general formula (21-2) include —$CH_2$—O—CO—($CH_2$)$_2$—, —($CH_2$)$_2$—O—CO—($CH_2$)$_2$—, —($CH_2$)$_3$—O—CO—($CH_2$)$_2$—, and the like.

Specific examples of the group represented by the general formula (21-3) include —$CH_2$—O—CO—$CH_2$—CO—O—$CH_2$—, —$CH_2$—O—CO—($CH_2$)—CO—O—$CH_2$—, —$CH_2$—O—CO—($CH_2$)$_3$—CO—O—$CH_2$—, —$CH_2$—O—CO—($CH_2$)$_4$—CO—O—$CH_2$—, —$CH_2$—O—CO—($CH_2$)$_5$—CO—O—$CH_2$—, —$CH_2$—O—CO—($CH_2$)$_6$—CO—O—$CH_2$—, —$CH_2$—O—CO—($CH_2$)$_7$—CO—O—$CH_2$—, —($CH_2$)$_2$—O—CO—$CH_2$—CO—O—($CH_2$)$_2$—, —($CH_2$)$_2$—O—CO—($CH_2$)$_2$—CO—O—($CH_2$)$_2$—, —($CH_2$)$_2$—O—CO—($CH_2$)$_3$—CO—O—($CH_2$)$_2$—, —($CH_2$)$_2$—O—CO—($CH_2$)$_4$—CO—O—($CH_2$)$_2$—, —($CH_2$)$_2$—O—CO—($CH_2$)$_5$—CO—O—($CH_2$)$_2$—, —($CH_2$)$_2$—O—CO—($CH_2$)$_6$—CO—O—($CH_2$)$_2$—, —($CH_2$)$_2$—O—CO—($CH_2$)$_7$—CO—O—($CH_2$)$_2$—, —($CH_2$)$_3$—O—CO—$CH_2$—CO—O—($CH_2$)$_3$—, —($CH_2$)$_3$—O—CO—($CH_2$)$_2$—CO—O—($CH_2$)$_3$—, —($CH_2$)$_3$—O—CO—($CH_2$)$_3$—CO—O—($CH_2$)$_3$—, —($CH_2$)$_3$—O—CO—($CH_2$)$_4$—CO—O—($CH_2$)$_3$—, —($CH_2$)$_3$—O—CO—($CH_2$)$_5$—CO—O—($CH_2$)$_3$—, —($CH_2$)$_3$—O—CO—($CH_2$)$_6$—CO—O—($CH_2$)$_3$—, —($CH_2$)$_3$—O—CO—($CH_2$)$_7$—CO—O—($CH_2$)$_3$—, —$CH_2$—O—CO—$C_6H_4$—CO—O—$CH_2$—, —($CH_2$)$_2$—O—CO—$C_6H_4$—CO—O—($CH_2$)$_2$—, —($CH_2$)$_3$—O—CO—$C_6H_4$—CO—O—($CH_2$)$_3$—, —$CH_2$—O—CO—$C_6H_{10}$—CO—O—$CH_2$—, —($CH_2$)$_2$—O—CO—$C_6H_{10}$—CO—O—($CH_2$)$_2$—, —($CH_2$)$_3$—O—CO—$C_6H_{10}$—CO—O—($CH_2$)$_3$—, and the like. Among these, —$CH_2$—O—CO—$CH_2$—CO—O—$CH_2$—, —$CH_2$—O—CO—($CH_2$)$_2$—CO—O—$CH_2$—, —$CH_2$—O—CO—($CH_2$)$_3$—CO—O—$CH_2$—, —$CH_2$—O—CO—($CH_2$)$_4$—CO—O—$CH_2$—, —$CH_2$—O—CO—($CH_2$)$_5$—CO—O—$CH_2$—, —$CH_2$—O—CO—($CH_2$)$_6$—CO—O—$CH_2$—, —$CH_2$—O—CO—($CH_2$)$_7$—CO—O—$CH_2$—, —($CH_2$)$_2$—O—CO—$CH_2$—CO—O—($CH_2$)$_2$—, —($CH_2$)$_2$—O—CO—($CH_2$)$_2$—CO—O—($CH_2$)$_2$—, —($CH_2$)$_2$—O—CO—($CH_2$)$_3$—CO—O—($CH_2$)$_2$—, —($CH_2$)$_2$—O—CO—($CH_2$)$_4$—CO—O—($CH_2$)$_2$—, —($CH_2$)$_2$—O—CO—($CH_2$)$_5$—CO—O—($CH_2$)$_2$—, —($CH_2$)$_2$—O—CO—($CH_2$)$_6$—CO—O—($CH_2$)$_2$—, —($CH_2$)$_2$—O—CO—($CH_2$)$_7$—CO—O—($CH_2$)$_2$—, —($CH_2$)$_3$—O—CO—$CH_2$—CO—O—($CH_2$)$_3$—, —($CH_2$)$_3$—O—CO—($CH_2$)$_2$—CO—O—($CH_2$)$_3$—, —($CH_2$)$_3$—O—CO—($CH_2$)$_3$—CO—O—($CH_2$)$_3$—, —($CH_2$)$_3$—O—CO—($CH_2$)$_4$—CO—O—($CH_2$)$_3$—, —($CH_2$)$_3$—O—CO—($CH_2$)$_5$—CO—O—($CH_2$)$_3$—, —($CH_2$)$_3$—O—CO—($CH_2$)$_6$—CO—O—($CH_2$)$_3$—, and —($CH_2$)$_3$—O—CO—($CH_2$)$_7$—CO—O—($CH_2$)$_3$— are preferable, and —($CH_2$)$_2$—O—CO—$CH_2$—CO—O—($CH_2$)$_2$—, —($CH_2$)$_2$—O—CO—($CH_2$)$_2$—CO—O—($CH_2$)$_2$—, —($CH_2$)$_2$—O—CO—($CH_2$)$_3$—CO—O—($CH_2$)$_2$—, —($CH_2$)$_2$—O—CO—($CH_2$)$_4$—($CH_2$)$_2$—, —($CH_2$)$_2$—O—CO—($CH_2$)$_5$—CO—O—($CH_2$)$_2$—, —($CH_2$)$_2$—O—CO—($CH_2$)$_6$—CO—O—($CH_2$)$_2$—, and —($CH_2$)$_2$—O—CO—($CH_2$)$_7$—CO—O—($CH_2$)$_2$— are more preferable, and —($CH_2$)$_2$—O—CO—($CH_2$)$_2$—CO—O—($CH_2$)$_2$— is particularly preferable.

Specific examples of the group represented by the general formula (21-4) include —$CH_2$—NHCO—$CH_2$—, —($CH_2$)$_2$—NHCO—($CH_2$)$_2$—, —($CH_2$)$_3$—NHCO—($CH_2$)$_3$—, —($CH_2$)$_4$—NHCO—($CH_2$)$_4$—, —$CH_2$—CONH—$CH_2$—, —($CH_2$)$_2$—CONH—($CH_2$)$_2$—, —($CH_2$)$_3$—CONH—($CH_2$)$_3$—, —($CH_2$)$_4$—CONH—($CH_2$)$_4$—, —$CH_2$—NHCONH—$CH_2$—, —($CH_2$)$_2$—NHCONH—($CH_2$)$_2$—, —($CH_2$)$_3$—NHCONH—($CH_2$)$_3$—, —($CH_2$)$_4$—NHCONH—($CH_2$)$_4$—, —($CH_2$)$_5$—NHCONH—($CH_2$)$_5$—, —($CH_2$)$_6$—NHCONH—($CH_2$)$_6$—, —($CH_2$)$_7$—NHCONH—($CH_2$)$_7$—, —($CH_2$)$_8$—NHCONH—($CH_2$)$_8$—, —($CH_2$)$_9$—NHCONH—($CH_2$)$_9$—, —($CH_2$)$_{10}$—NHCONH—($CH_2$)$_{10}$—, and the like. Among these, —$CH_2$—NHCONH—$CH_2$—, —($CH_2$)$_2$—NHCONH—($CH_2$)$_2$—, —($CH_2$)$_3$—NHCONH—($CH_2$)$_3$—, —($CH_2$)$_4$—NHCONH—($CH_2$)$_4$—, —($CH_2$)$_5$—NHCONH—($CH_2$)$_5$—, —($CH_2$)$_6$—NHCONH—($CH_2$)$_6$—, —($CH_2$)$_7$—NHCONH—($CH_2$)$_7$—, —($CH_2$)$_8$—NHCONH—($CH_2$)—, —($CH_2$)$_9$—NHCONH—($CH_2$)$_9$—, and —($CH_2$)$_{10}$—NHCONH—($CH_2$)$_{10}$— are preferable, and —($CH_2$)$_2$—NHCONH—($CH_2$)$_2$— is more preferable.

Specific examples of the group represented by the general formula (21-5) include —CH$_2$—O—CONH—CH$_2$—, —(CH$_2$)$_2$—O—CONH—(CH$_2$)$_2$—, —(CH$_2$)$_3$—O—CONH—(CH$_2$)$_3$—, —(CH$_2$)$_4$—O—CONH—(CH$_2$)$_4$—, and the like.

Examples of "alkylene group having 1 to 21 carbon atoms that has at least one group selected from —O—, —OCO—, —COO—, —NHCO—, —CONH—, —NHCONH—, and an arylene group in the chain and has a hydroxy group as a substituent" represented by A$_2$ in the general formulae (2) and (2-4) include groups represented by the following general formulae (22-1) and (22-2), and the like.

(In the formula, R$_{54}$ represents an arylene group having 6 to 10 carbon atoms that has a hydroxy group as a substituent, and h$_{10}$ represents an integer of 1 to 4.)

(In the formula, R$_{55}$ represents an alkylene group having 1 to 7 carbon atoms that has a hydroxy group as a substituent or an arylene group having 6 to 10 carbon atoms that has a hydroxy group as a substituent, A$_6$ represents —O—, —OCO—, —COO—, —NHCO—, —CONH—, or —NHCONH—, and h$_{11}$ represents an integer of 2 to 4.)

Examples of the arylene group having 6 to 10 carbon atoms that has a hydroxy group as a substituent represented by R$_{54}$ in the general formula (22-1) include a hydroxyphenylene group, a dihydroxyphenylene group, a hydroxynaphthylenen group, a dihydroxynaphthylene group, and the like.

Examples of the alkylene group having 1 to 7 carbon atoms that has a hydroxy group as a substituent represented by R$_{55}$ in the general formula (22-2) include a hydroxymethylene group, a hydroxyethylene group, a hydroxytrimethylene group, a hydroxytetramethylene group, a hydroxypentamethylene group, a hydroxyhexamethylene group, a hydroxyheptylene group, a hydroxycyclobutylene group, a hydroxycyclopentylene group, a hydroxycyclohexylene group, a hydroxycycloheptylene group, and the like.

Examples of the arylene group having 6 to 10 carbon atoms that has a hydroxy group as a substituent represented by R$_{55}$ in the general formula (22-2) are the same as the examples of the arylene group having 6 to 10 carbon atoms that has a hydroxy group as a substituent represented by R$_{54}$ in the general formula (22-1).

Preferred specific examples of the group represented by the general formula (22-1) include —C$_6$H$_3$(OH)—CH$_2$—, —C$_6$H$_3$(OH)—(CH$_2$)$_2$—, —C$_6$H$_3$(OH)—(CH$_2$)$_3$—, —C$_6$H$_3$(OH)—(CH$_2$)$_4$—, —C$_6$H$_2$(OH)$_2$—CH$_2$—, —C$_6$H$_2$(OH)$_2$—(CH$_2$)$_2$—, —C$_6$H$_2$(OH)$_2$—(CH$_2$)$_3$—, —C$_6$H$_2$(OH)$_2$—(CH$_2$)$_4$—, and the like.

Preferred specific examples of the group represented by the general formula (22-2) include —CH(OH)—CH$_2$—O—(CH$_2$)$_2$—, —CH(OH)—CH$_2$—O—(CH$_2$)$_3$—, —CH(OH)—CH$_2$—O—(CH$_2$)$_4$—, —CH(OH)—CH$_2$—OCO—(CH$_2$)$_2$—, —CH(OH)—CH$_2$—OCO—(CH$_2$)$_3$—, —CH(OH)—CH$_2$—OCO—(CH$_2$)$_4$—, —CH(OH)—CH$_2$—COO—(CH$_2$)$_2$—, —CH(OH)—CH$_2$—COO—(CH$_2$)$_3$—, —CH(OH)—CH$_2$—COO—(CH$_2$)$_4$—, —CH(OH)—CH$_2$—NHCO—(CH$_2$)$_2$—, —CH(OH)—CH$_2$—NHCO—(CH$_2$)$_3$—, —CH(OH)—CH$_2$—NHCO—(CH$_2$)$_4$—, —CH(OH)—CH$_2$—CONH—(CH$_2$)$_2$—, —CH(OH)—CH$_2$—CONH—(CH$_2$)$_3$—, —CH(OH)—CH$_2$—CONH—(CH$_2$)$_4$—, —CH(OH)—CH$_2$—NHCONH—(CH$_2$)$_2$—, —CH(OH)—CH$_2$—NHCONH—(CH$_2$)$_3$—, —CH(OH)—CH$_2$—NHCONH—(CH$_2$)$_4$—, and the like.

Examples of the alkylene group having 1 to 21 carbon atoms that has a hydroxy group as a substituent represented by A$_2$ in the general formulae (2) and (2-4) include a group represented by the following general formula (23-1) and the like.

(In the formula, R$_{56}$ represents an alkylene group having 1 to 7 carbon atoms that has a hydroxy group as a substituent, and h$_{12}$ represents an integer of 1 to 4.)

Examples of alkylene group having 1 to 7 carbon atoms that has a hydroxy group as a substituent represented by R$_{56}$ in the general formula (23-1) are the same as the examples of the alkylene group having 1 to 7 carbon atoms that has a hydroxy group as a substituent represented by R$_{55}$ in the general formula (22-2).

Specific examples of the group represented by the general formula (23-1) include —C$_6$H$_9$(OH)—CH$_2$—, —C$_6$H$_9$(OH)—(CH$_2$)$_2$—, —C$_6$H$_9$(OH)—(CH$_2$)$_3$—, —C$_6$H$_9$(OH)—(CH$_2$)$_4$—, —CH(OH)—CH$_2$—, —CH(OH)—(CH$_2$)$_2$—, —CH(OH)—(CH$_2$)$_3$—, —CH(OH)—(CH$_2$)$_4$—, and the like.

In a case where A$_1$ in the general formula (2) is —O—, as A$_2$ in the general formula (2), an alkylene group having 1 to 21 carbon atoms is preferable. Among these, a methylene group, an ethylene group, a trimethylene group, a tetramethylene group, a pentamethylene group, and a hexamethylene group are preferable, and the methylene group, the ethylene group, and the trimethylene group are more preferable, and the ethylene group is particularly preferable.

In a case where A$_1$ in the general formula (2) is the group represented by the general formula (2-1), as A$_2$ in the general formula (2), an alkylene group having 1 to 21 carbon atoms and an alkylene group having 1 to 21 carbon atoms that has at least one group selected from —O—, —OCO—, —COO—, —NHCO—, —CONH—, —NHCONH—, and an arylene group in the chain are preferable. Among these, an alkylene group having 1 to 12 carbon atoms and the groups represented by the general formulae (21-3) and (21-4) are preferable. More specifically, a methylene group, an ethylene group, a trimethylene group, a tetramethylene group, a pentamethylene group, a hexamethylene group, —CH$_2$—O—CO—CH$_2$—CO—O—CH$_2$—, —CH$_2$—O—CO—(CH$_2$)$_2$—CO—O—CH$_2$—, —CH$_2$—O—CO—(CH$_2$)$_3$—CO—O—CH$_2$—, —CH$_2$—O—CO—(CH$_2$)$_4$—CO—O—CH$_2$—, —CH$_2$—O—CO—(CH$_2$)$_5$—CO—O—CH$_2$—, —CH$_2$—O—CO—(CH$_2$)$_6$—CO—O—CH$_2$—, —CH$_2$—O—CO—(CH$_2$)$_7$—CO—O—CH$_2$—, —(CH$_2$)$_2$—O—CO—CH$_2$—CO—O—(CH$_2$)$_2$—, —(CH$_2$)$_2$—O—CO—(CH$_2$)$_2$—CO—O—(CH$_2$)$_2$—, —(CH$_2$)$_2$—O—CO—(CH$_2$)$_3$—CO—O—(CH$_2$)$_2$—, —(CH$_2$)$_2$—O—CO—(CH$_2$)$_4$—CO—O—(CH$_2$)$_2$—, —(CH$_2$)$_2$—O—CO—(CH$_2$)$_5$—CO—O—(CH$_2$)$_2$—, —(CH$_2$)$_2$—O—CO—(CH$_2$)$_6$—CO—O—(CH$_2$)$_2$—, —(CH$_2$)$_2$—O—CO—(CH$_2$)$_7$—CO—O—(CH$_2$)$_2$—, —(CH$_2$)$_3$—O—CO—CH$_2$—CO—O—(CH$_2$)$_3$—, —(CH$_2$)$_3$—O—CO—(CH$_2$)$_2$—CO—O—(CH$_2$)$_3$—, —(CH$_2$)$_3$—O—CO—(CH$_2$)$_3$—CO—O—(CH$_2$)$_3$—, —(CH$_2$)$_3$—O—CO—(CH$_2$)$_4$—CO—O—(CH$_2$)$_3$—, —(CH$_2$)$_3$—O—CO—(CH$_2$)$_5$—CO—O—(CH$_2$)$_3$—, —(CH$_2$)$_3$—O—CO—(CH$_2$)$_6$—CO—O—(CH$_2$)$_3$—, —(CH$_2$)$_3$—O—CO—(CH$_2$)$_7$—CO—O—(CH$_2$)$_3$—, —CH$_2$—NHCONH—CH$_2$—, —(CH$_2$)$_2$—NHCONH—(CH$_2$)$_2$—, —(CH$_2$)$_3$—NHCONH—(CH$_2$)$_3$—, —(CH$_2$)$_4$—NHCONH—(CH$_2$)$_4$—, —(CH$_2$)$_5$—NHCONH—(CH$_2$)$_5$—, —(CH$_2$)$_6$—NHCONH—(CH$_2$)$_6$—, —(CH$_2$)$_7$—NHCONH—(CH$_2$)$_7$—, —(CH$_2$)$_8$—NHCONH—(CH$_2$)$_8$—, —(CH$_2$)$_9$—NHCONH—(CH$_2$)$_9$—, and —(CH$_2$)$_{10}$—NHCONH—(CH$_2$)$_{10}$— are preferable, the methylene group, the ethylene group, the trimethylene group, —(CH$_2$)$_2$—O—CO—CH$_2$—CO—O—(CH$_2$)$_2$—, —(CH$_2$)$_2$—O—CO—(CH$_2$)$_2$—CO—O—(CH$_2$)$_2$—, —(CH$_2$)$_2$—O—CO—(CH$_2$)$_3$—CO—O—(CH$_2$)$_2$—, —(CH$_2$)$_2$—O—CO—(CH$_2$)$_4$—CO—O—(CH$_2$)$_2$—, —(CH$_2$)$_2$—O—CO—(CH$_2$)$_5$—CO—O—(CH$_2$)$_2$—, —(CH$_2$)$_2$—O—CO—(CH$_2$)$_6$—CO—O—(CH$_2$)$_2$—, —(CH$_2$)$_2$—O—CO—(CH$_2$)$_7$—CO—O—(CH$_2$)$_2$—, —CH$_2$—NHCONH—CH$_2$—, —(CH$_2$)$_2$—NHCONH—(CH$_2$)$_2$—, —(CH$_2$)$_3$—NHCONH—(CH$_2$)$_3$—, —(CH$_2$)$_4$—NHCONH—(CH$_2$)$_4$—, —(CH$_2$)$_5$—NHCONH—(CH$_2$)$_5$—, —(CH$_2$)$_6$—NHCONH—(CH$_2$)$_6$—, —(CH$_2$)$_7$—NHCONH—(CH$_2$)$_7$—, —(CH$_2$)$_8$—NHCONH—(CH$_2$)$_8$—, —(CH$_2$)$_9$—NHCONH—(CH$_2$)$_9$—, and —(CH$_2$)$_{10}$—NHCONH—(CH$_2$)$_{10}$— are more preferable, and the ethylene group, —(CH$_2$)$_2$—O—CO—(CH$_2$)$_2$—CO—O—(CH$_2$)$_2$—, and —(CH$_2$)$_2$—NHCONH—(CH$_2$)$_2$— are particularly preferable.

The alkyl group having 1 to 12 carbon atoms represented by R$_{10}$ in A$_3$ in the general formulae (2) and (2-4) may be any of linear, branched, and cyclic alkyl groups. Among these, the linear and branched alkyl groups are preferable. Among the alkyl groups having 1 to 12 carbon atoms, an alkyl group having 1 to 6 carbon atoms is preferable, and an alkyl group having 1 to 4 carbon atoms is more preferable. Specifically, examples thereof include a methyl group, an ethyl group, a n-propyl group, an isopropyl group, a n-butyl group, an isobutyl group, a sec-butyl group, a tert-butyl group, a cyclobutyl group, a n-pentyl group, an isopentyl group, a sec-pentyl group, a tert-pentyl group, a neopentyl group, a 2-methylbutyl group, a 1,2-dimethylpropyl group, a 1-ethylpropyl group, a cyclopentyl group, a n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, a cyclohexyl group, a n-heptyl group, an isoheptyl group, a sec-heptyl group, a tert-heptyl group, a neoheptyl group, a cycloheptyl group, a n-octyl group, an isooctyl group, a sec-octyl group, a tert-octyl group, a neooctyl group, a 2-ethylhexyl group, a cyclooctyl group, a n-nonyl group, an isononyl group, a sec-nonyl group, a tert-nonyl group, a neononyl group, a cyclononyl group, a n-decyl group, an isodecyl group, a sec-decyl group, a tert-decyl group, a neodecyl group, a cyclodecyl group, a n-undecyl group, a cycloundecyl group, a n-dodecyl group, a cyclododecyl group, a cyclohexyl methyl group, a 1-cyclohexylethyl group, a 2-methylcyclohexyl group, a 3-methylcyclohexyl group, a 4-methylcyclohexyl group, a 2,6-dimethylcyclohexyl group, a 2,4-dimethylcyclohexyl group, a 3,5-dimethylcyclohexyl group, a 2,5-dimethylcyclohexyl group, a 2,3-dimethylcyclohexyl group, a 3,3,5-trimethylcyclohexyl group, a 4-tert-butylcyclohexyl group, a 1-adamantyl group, a 2-adamantyl group, and the like. Among these, the methyl group, the ethyl group, the n-propyl group, the isopropyl group, the n-butyl group, the isobutyl group, the sec-butyl group, the tert-butyl group, the n-pentyl group, the isopentyl group, the sec-pentyl group, the tert-pentyl group, the neopentyl group, the 2-methylbutyl group, the 1,2-dimethylpropyl group, the 1-ethylpropyl group, the n-hexyl group, the isohexyl group, the sec-hexyl group, the tert-hexyl group, the neohexyl group, the 2-methylpentyl group, the 1,2-dimethylbutyl group, the 2,3-dimethylbutyl group, the 1-ethylbutyl group, the n-heptyl group, the n-octyl group, the n-nonyl group, the n-decyl group, the n-undecyl group, and the n-dodecyl group are preferable, the methyl group, the ethyl group, the n-propyl group, the isopropyl group, the n-butyl group, the isobutyl group, the sec-butyl group, the tert-butyl group, the n-pentyl group, the isopentyl group, and the n-hexyl group are more preferable, the methyl group, the ethyl group, the n-propyl group, the isopropyl group, the n-butyl group, the isobutyl group, the sec-butyl group, and the tert-butyl group are even more preferable, and the methyl group and the ethyl group are particularly preferable.

As R$_{10}$ in A$_3$ in the general formulae (2) and (2-4), a hydrogen atom and an alkyl group having 1 to 4 carbon atoms are preferable, and the hydrogen atom is more preferable. Specifically, examples of R$_{10}$ include a hydrogen atom, a methyl group, an ethyl group, a n-propyl group, an isopropyl group, a n-butyl group, an isobutyl group, a sec-butyl group, a tert-butyl group, and the like. Among these, the hydrogen atom, the methyl group, and the ethyl group are preferable, and the hydrogen atom is more preferable.

As A$_3$ in the general formulae (2) and (2-4), —O— is preferable.

Among the groups represented by the general formula (2-4), a group represented by the following general formula (2-4') can be exemplified as a preferred specific example.

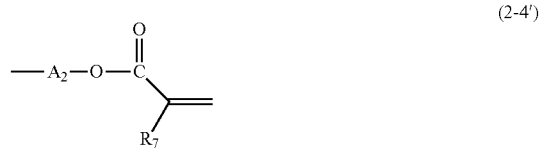

(2-4')

(In the formula, R$_7$ and A$_2$ are the same as R$_7$ and A$_2$ described above.)

Among the groups represented by the general formula (2-4'), a group represented by the following general formula (2-4") can be exemplified as a preferred specific example.

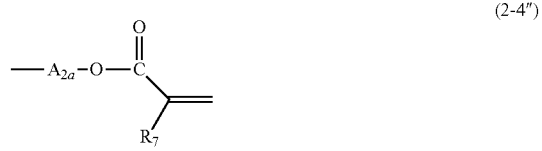

(2-4")

(In the formula, A$_{2a}$ represents an alkylene group having 1 to 21 carbon atoms, and R$_7$ is the same as R$_7$ described above.)

Examples of the alkylene group having 1 to 21 carbon atoms represented by A$_{2a}$ in the general formula (2-4") are the same as the examples of the alkylene group having 1 to 21 carbon atoms represented by A$_2$ in the general formula (2), and preferred examples thereof are also the same.

Preferred specific examples of the group represented by the general formula (2-4") include the following groups.

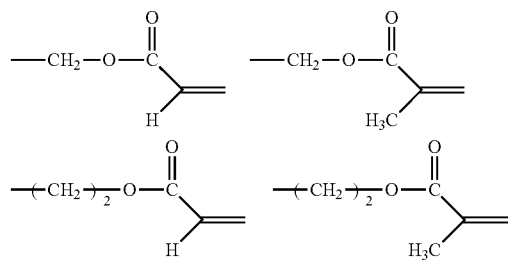

-continued

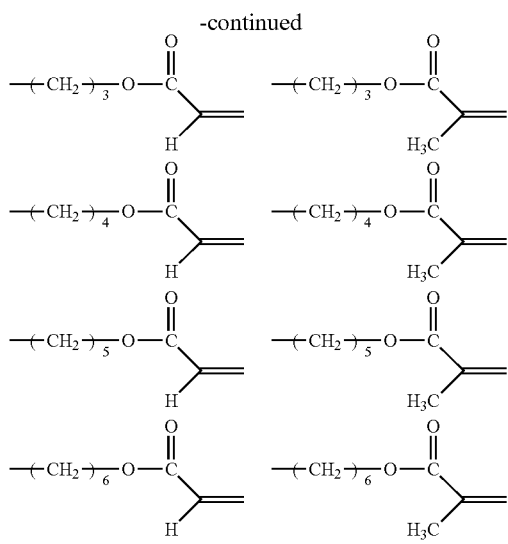

Among the specific examples, the following groups are preferable.

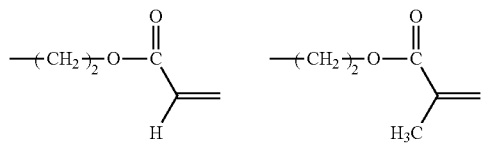

Examples of the alkyl group having 1 to 12 carbon atoms represented by $R_8$ and $R_9$ in the general formula (2-1) are the same as the examples of the alkyl group having 1 to 12 carbon atoms represented by $R_{10}$ in $A_3$ in the general formulae (2) and (2-4), and preferred examples thereof are also the same.

In a case where $R_8$ and $R_9$ in the general formula (2-1) form a cyclic structure of a 5- or 6-membered ring together with $-N-(CH_2)_{n2}-(A_4)_{n3}$- bonded to $R_8$ and $R_9$, $n_3$ is 1, and the cyclic structure is represented by the following general formula (2-3);

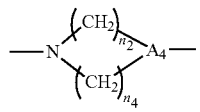

(2-3)

(In the formula, $n_4$ represents an integer of 0 to 4, and $A_4$ and $n_2$ are the same as $A_4$ and $n_2$ described above. Here, $n_2+n_4$ equals an integer of 3 or 4).

As $A_4$ in the general formula (2-1), the group represented by the formula (2-2) is preferable.

In a case where the cyclic structure represented by the general formula (2-3) is formed, $n_2$ in the general formula (2-1) is preferably 2. In a case where the cyclic structure represented by the general formula (2-1) is not formed, $n_2$ in the general formula (2-3) is preferably 0. It should be noted that in a case where $n_2$ is 0, $-(CH_2)_{n2}-$ represents a single bond.

In a case where the cyclic structure represented by the general formula (2-3) is formed, $n_3$ in the general formula (2-1) represents 1. In a case where the cyclic structure represented by the general formula (2-3) is not formed, $n_3$ in the general formula (2-1) is preferably 0. It should be noted that in a case where $n_3$ is 0, $-(A_4R_9)_{n3}-$ represents a single bond.

$n_4$ in the general formula (2-3) is preferably 2. It should be noted that in a case where $n_4$ is 0, $-(CH_2)_{n4}-$ represents a single bond.

The cyclic structure represented by the general formula (2-3) represents a 5- or 6-membered ring, and is preferably a 6-membered ring.

Specific examples of the cyclic structure represented by the general formula (2-3) include the following structures.

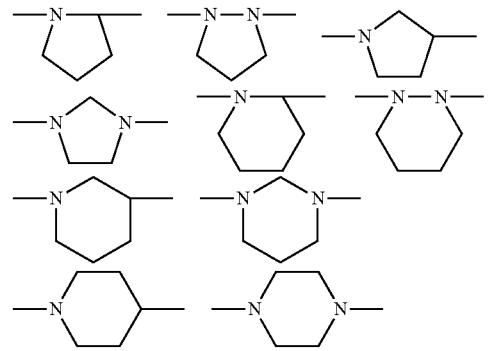

Among the specific examples, the following structures are preferable.

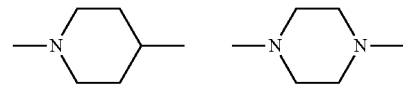

As $R_8$ in the general formula (2-1), a hydrogen atom, an alkyl group having 1 to 6 carbon atoms, or the group represented by the general formula (2-4') is preferable, and the hydrogen atom, an alkyl group having 1 to 4 carbon atoms, or the group represented by the general formula (2-4") is more preferable. Specifically, examples thereof include a hydrogen atom, a methyl group, an ethyl group, a n-propyl group, an isopropyl group, a n-butyl group, an isobutyl group, a sec-butyl group, a tert-butyl group, groups represented by the following formulae, and the like.

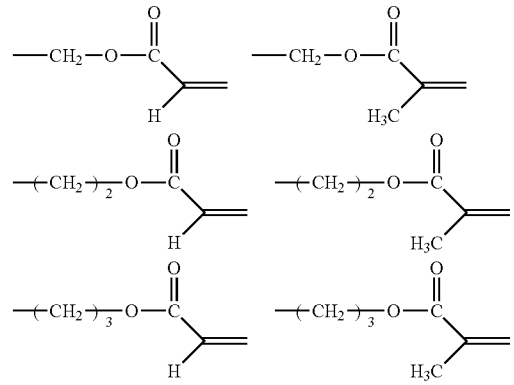

-continued

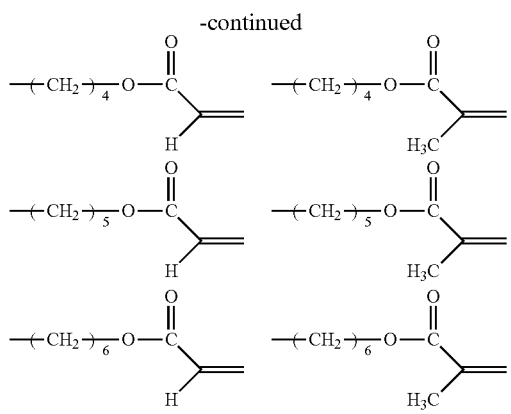

Among these, the hydrogen atom, the methyl group, the ethyl group, and the groups represented by the following formulae are preferable.

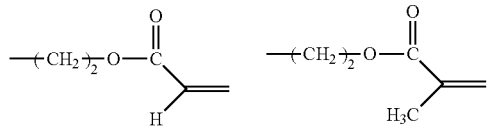

As $R_9$ in the general formula (2-1), a hydrogen atom and an alkyl group having 1 to 4 carbon atoms are preferable. Specifically, the hydrogen atom, a methyl group, an ethyl group, a n-propyl group, an isopropyl group, a n-butyl group, an isobutyl group, a sec-butyl group, and a tert-butyl group are preferable, and the hydrogen atom, the methyl group, and the ethyl group are more preferable.

Among the groups represented by the general formula (2), a group represented by the following general formula (2') can be exemplified as a preferred specific example.

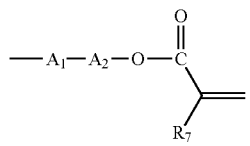

(2')

(In the formula, $R_7$, $A_1$, and $A_2$ are the same as $R_7$, $A_1$, and $A_2$ described above.)

Among the groups represented by the general formula (2'), groups represented by the following general formulae (2'a) to (2'd) can be exemplified as preferred specific examples.

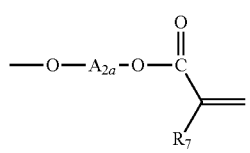

(2'a)

(In the formula, $R_7$ and $A_{2a}$ are the same as $R_7$ and $A_{2a}$ described above.)

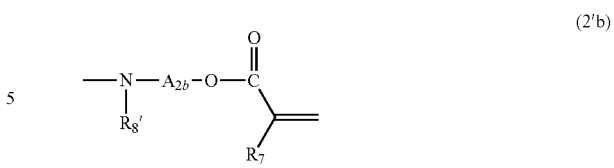

(2'b)

(In the formula, $R_8'$ represents a hydrogen atom or an alkyl group having 1 to 12 carbon atoms, $A_{2b}$ represents an alkylene group having 1 to 21 carbon atoms that has at least one group selected from —O—, —OCO—, —COO—, —NHCO—, —CONH—, —NHCONH—, and an arylene group in the chain; or an alkylene group having 1 to 21 carbon atoms, and $R_7$ is the same as $R_7$ described above.)

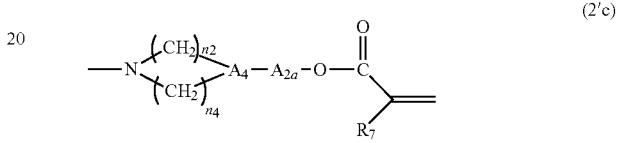

(2'c)

(In the formula, $R_7$, $A_{2a}$, $A_4$, $n_2$, and $n_4$ are the same as $R_7$, $A_{2a}$, $A_4$, $n_2$, and $n_4$ described above.)

(2'd)

(In the formula, $R_7$ and $A_{2a}$ are the same as $R_7$ and $A_{2a}$ described above, and two $R_7$'s and two $A_{2a}$'s may be the same as or different from each other.)

Examples of the alkyl group having 1 to 12 carbon atoms represented by $R_8'$ in the general formula (2'b) are the same as the examples of the alkyl group having 1 to 12 carbon atoms represented by $R_{10}$ in $A_3$ in the general formulae (2) and (2-4), and preferred examples thereof are also the same.

Examples of the alkylene group having 1 to 21 carbon atoms represented by $A_{2b}$ in the general formula (2'b) are the same as the examples of the alkylene group having 1 to 21 carbon atoms represented by $A_2$ in the general formula (2), and preferred examples thereof are also the same.

Examples of the alkylene group having 1 to 21 carbon atoms that has at least one group selected from —O—, —OCO—, —COO—, —NHCO—, —CONH—, —NHCONH—, and an arylene group in the chain represented by $A_{2b}$ in the general formula (2'b) are the same as the examples of the alkylene group having 1 to 21 carbon atoms that has at least one group selected from —O—, —OCO—, —COO—, —NHCO—, —CONH—, —NHCONH—, and an arylene group in the chain represented by $A_2$ in the general formula (2), and preferred examples thereof are also the same.

Two $R_7$'s and two $A_{2a}$'s in the general formula (2'd) are independent from each other and may be the same as or different from each other. Particularly, it is preferable that two $R_7$'s and two $A_{2a}$'s are the same as each other respectively.
Preferred specific examples of the group represented by the general formula (2'a) include the following groups.
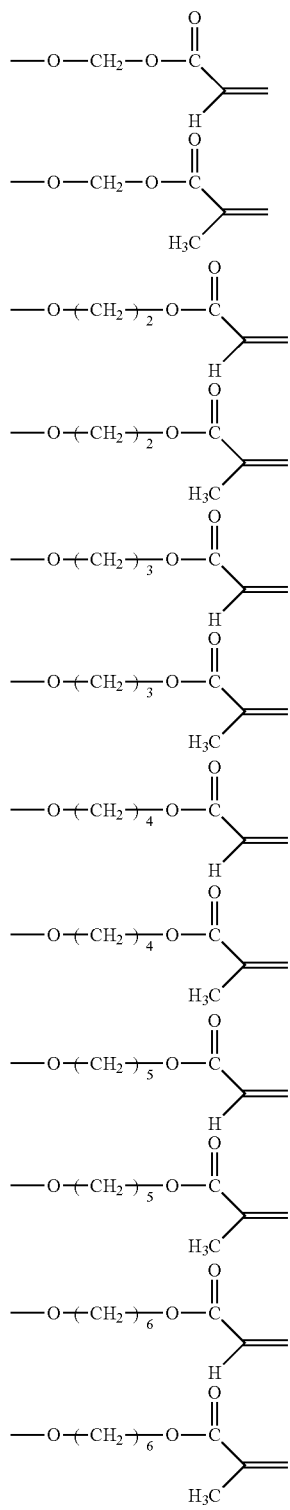
Preferred specific examples of the group represented by the general formula (2'b) include the following groups.
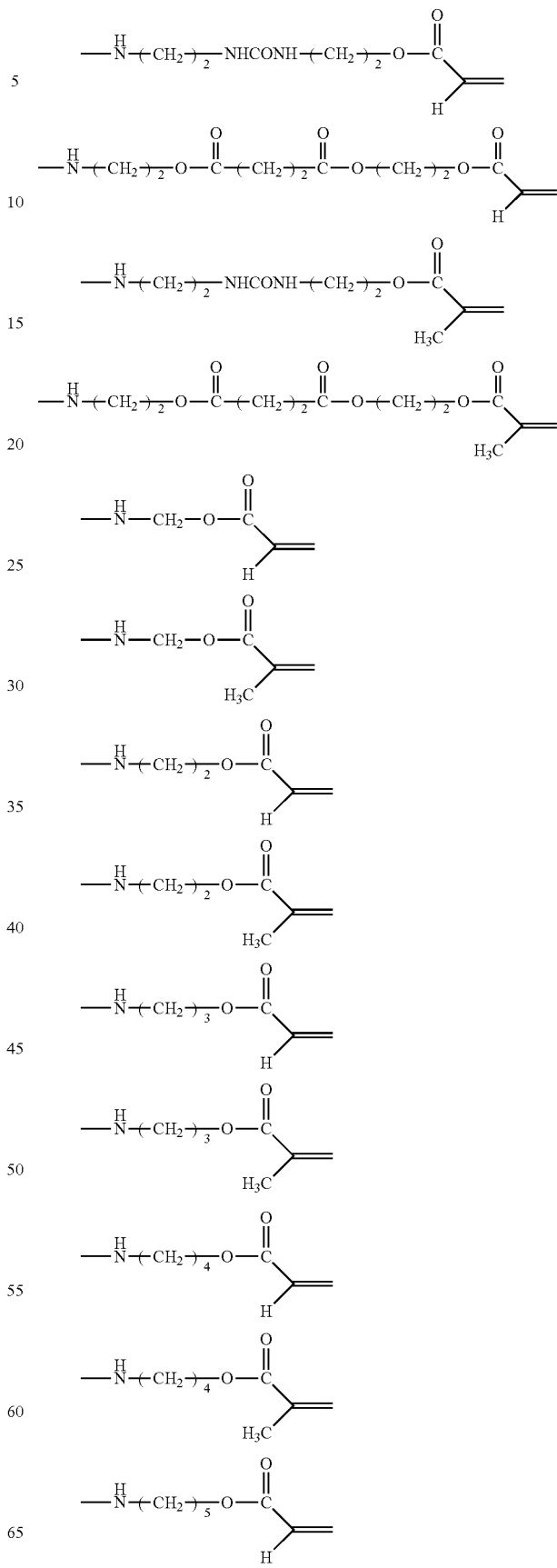

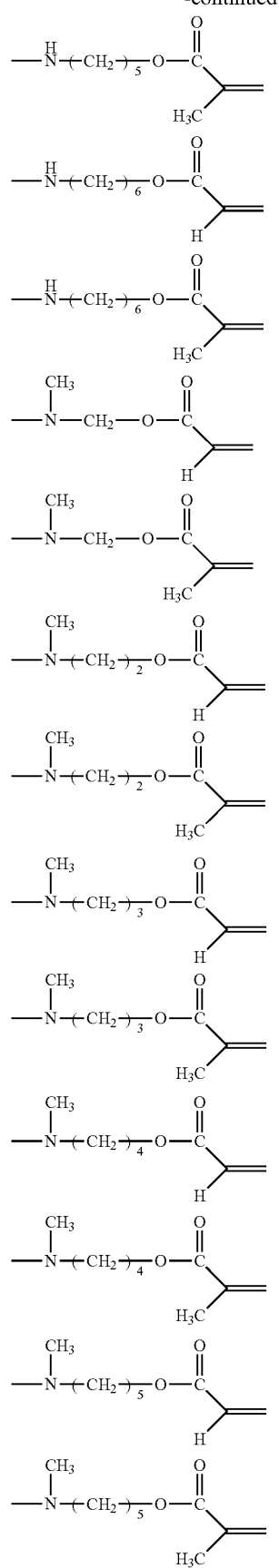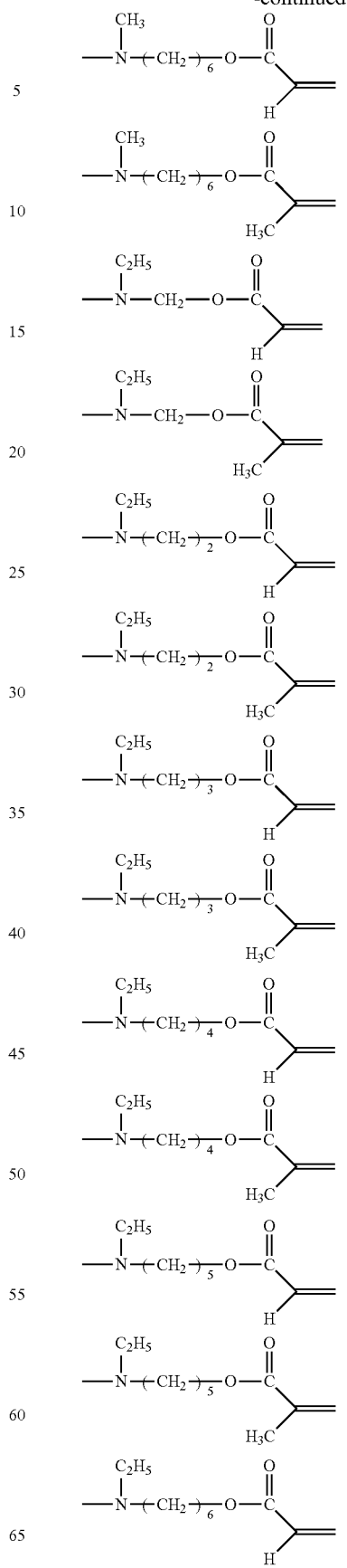

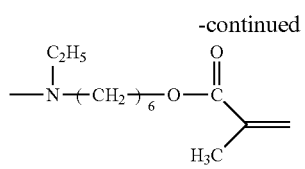
Preferred specific examples of the group represented by the general formula (2'c) include the following groups.
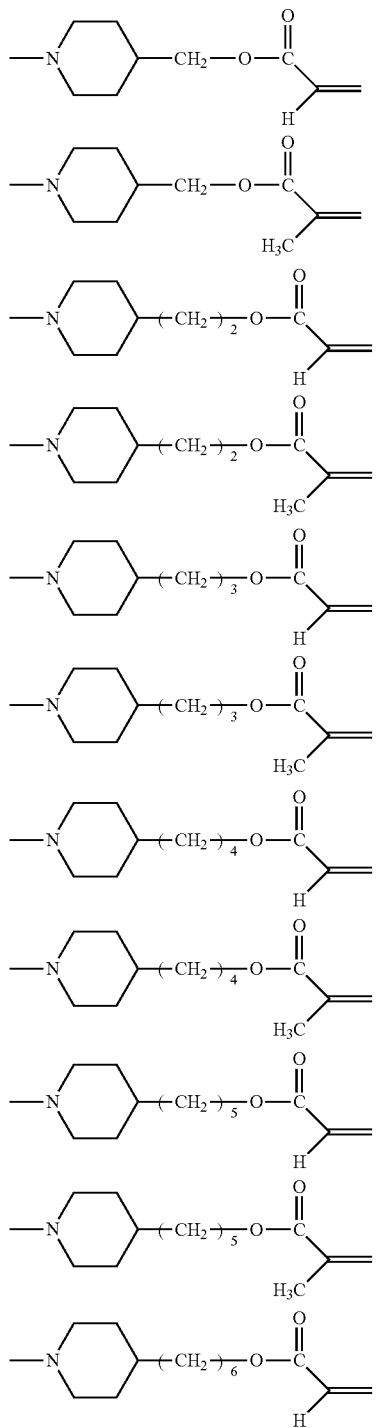
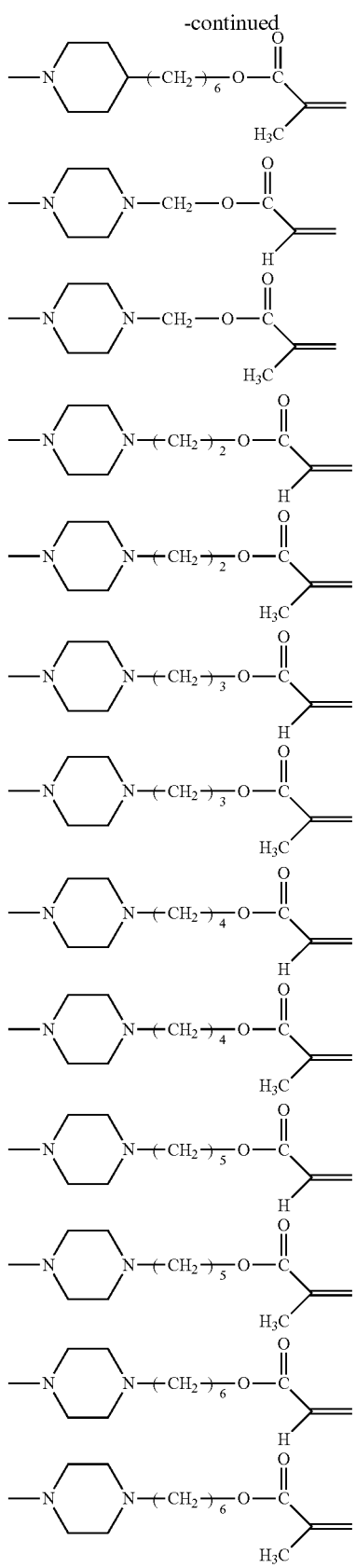
Preferred specific examples of the group represented by the general formula (2'd) include the following groups.

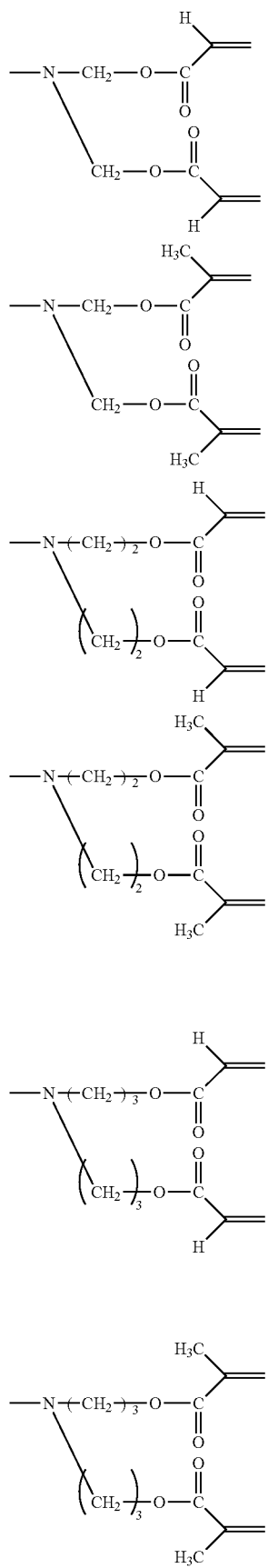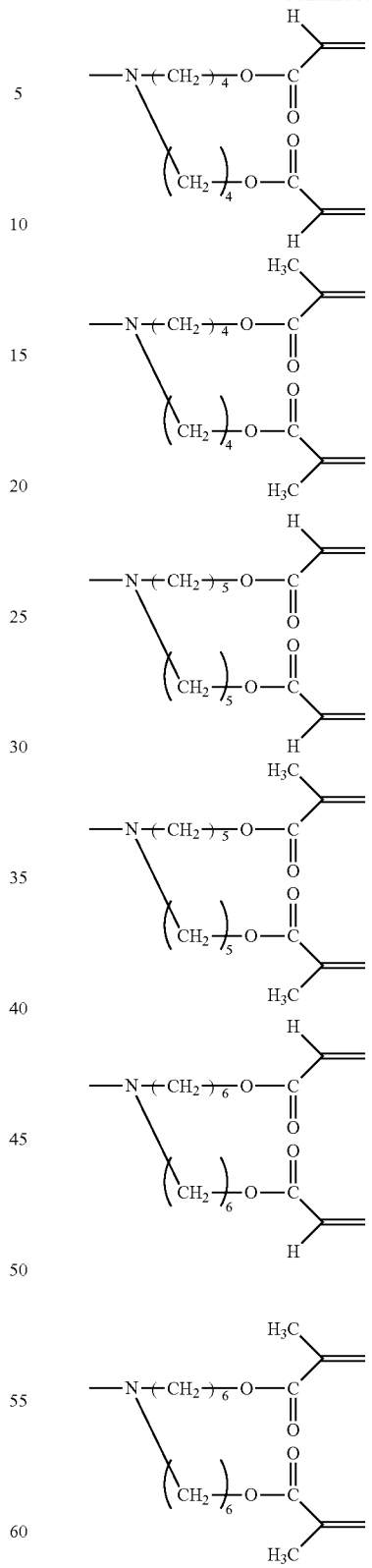
In a case where $R_5$ is the group represented by the general formula (2), as $R_5$, the groups represented by the general formula (2'b) and (2'd) are preferable, and the following groups are more preferable.

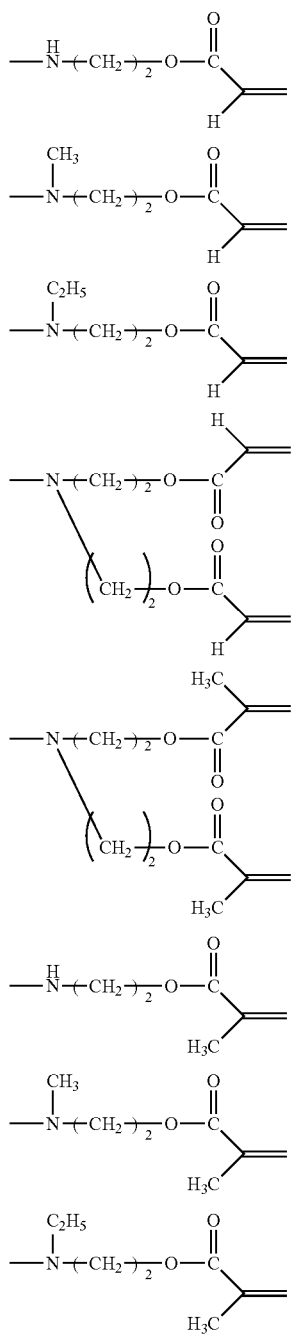

In a case where $R_6$ is the group represented by the general formula (2), as $R_6$, the groups represented by the general formula (2'a) to (2'c) are preferable, the group represented by the general formula (2'a) is more preferable, and the following groups are particularly preferable.

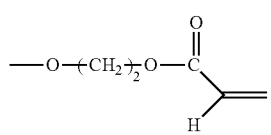

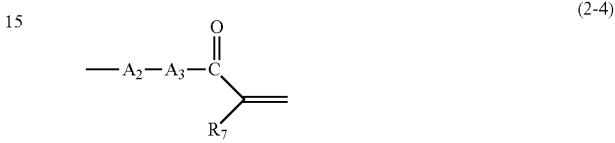

Among the groups having a polymerizable unsaturated group represented by $R_2$, $R_3$, and $R_{31}$, a group represented by the following general formula (2-4) can be exemplified as a preferred specific example.

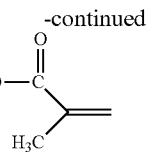

(2-4)

(In the formula, $R_7$, $A_2$, and $A_3$ are the same as $R_7$, $A_2$, and $A_3$ described above.)

Examples of the group represented by the general formula (2-4) in $R_2$, $R_3$, and $R_{31}$ are the same as the examples of the group represented by the general formula (2-4) in $R_8$, and preferred examples thereof are also the same.

Other Functional Groups

The compound represented by the general formula (1) is preferably a compound in which $n_1$ pieces of $R_5$ are independent from each other and may be the same as or different from each other; and at least one of $n_1$ pieces of $R_5$ is a group having a polymerizable unsaturated group or an amino group which has a substituent or is unsubstituted, and more preferably a compound in which one $R_5$ is a group having a polymerizable unsaturated group or an amino group which has a substituent or is unsubstituted, and the remaining $(n_1-1)$ pieces of $R_5$ represent a halogeno group, an alkyl group having 1 to 20 carbon atoms, an alkoxy group having 1 to 20 carbon atoms, an alkylthio group having 1 to 20 carbon atoms, a hydroxy group, an aryl group having 6 to 14 carbon atoms, an aryloxy group having 6 to 14 carbon atoms, or an arylalkyl group having 7 to 20 carbon atoms. Among these, a compound is preferable in which at least one of $n_1$ pieces of $R_5$ is the amino group having a substituent is even more preferable; and a compound is particularly preferable in which one $R_5$ is the amino group having a substituent, and the remaining $(n_1-1)$ pieces of $R_5$ represent the halogeno group, the alkyl group having 1 to 20 carbon atoms, the alkoxy group having 1 to 20 carbon atoms, the alkylthio group having 1 to 20 carbon atoms, the hydroxy group, the aryl group having 6 to 14 carbon atoms, the aryloxy group having 6 to 14 carbon atoms, or the arylalkyl group having 7 to 20 carbon atoms.

Examples of the halogeno group represented by $R_5$ in the general formula (1) include a fluoro group, a chloro group, a bromo group, an iodo group, and the like. Among these, the fluoro group is preferable.

The alkyl group having 1 to 20 carbon atoms represented by $R_5$ in the general formula (1) may be any of linear, branched, and cyclic alkyl groups. Among these, the linear and branched alkyl groups are preferable. In addition, among the alkyl groups having 1 to 20 carbon atoms, an alkyl group having 1 to 12 carbon atoms is preferable, an alkyl group having 1 to 6 carbon atoms is more preferable, and an alkyl group having 1 to 4 carbon atoms is particularly preferable. Specifically, examples thereof include a methyl group, an ethyl group, a n-propyl group, an isopropyl group, a n-butyl group, an isobutyl group, a sec-butyl group, a tert-butyl group, a cyclobutyl group, a n-pentyl group, an isopentyl group, a sec-pentyl group, a tert-pentyl group, a neopentyl group, a 2-methylbutyl group, a 1,2-dimethylpropyl group, a 1-ethylpropyl group, a cyclopentyl group, a n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, a cyclohexyl group, a n-heptyl group, an isoheptyl group, a sec-heptyl group, a tert-heptyl group, a neoheptyl group, a cycloheptyl group, a n-octyl group, an isooctyl group, a sec-octyl group, a tert-octyl group, a neooctyl group, a 2-ethylhexyl group, a cyclooctyl group, a n-nonyl group, an isononyl group, a sec-nonyl group, a tert-nonyl group, a neononyl group, a cyclononyl group, a n-decyl group, an isodecyl group, a sec-decyl group, a tert-decyl group, a neodecyl group, a cyclodecyl group, a n-undecyl group, a cycloundecyl group, a n-dodecyl group, a cyclododecyl group, a n-tridecyl group, an isotridecyl group, a n-tetradecyl group, an isotetradecyl group, a n-pentadecyl group, an isopentadecyl group, a n-hexadecyl group, an isohexadecyl group, a n-heptadecyl group, an isoheptadecyl group, a n-octadecyl group, an isooctadecyl group, a n-nonadecyl group, an isononadecyl group, a n-eicosyl group, an isoeicosyl group, a cyclohexyl methyl group, a 1-cyclohexylethyl group, a 2-methylcyclohexyl group, a 3-methylcyclohexyl group, a 4-methylcyclohexyl group, a 2,6-dimethylcyclohexyl group, a 2,4-dimethylcyclohexyl group, a 3,5-dimethylcyclohexyl group, a 2,5-dimethylcyclohexyl group, a 2,3-dimethylcyclohexyl group, a 3,3,5-trimethylcyclohexyl group, a 4-tert-butylcyclohexyl group, a 1-adamantyl group, a 2-adamantyl group, and the like. Among these, the methyl group, the ethyl group, the n-propyl group, the isopropyl group, the n-butyl group, the isobutyl group, the sec-butyl group, the tert-butyl group, the n-pentyl group, the isopentyl group, the sec-pentyl group, the tert-pentyl group, the neopentyl group, the 2-methylbutyl group, the 1,2-dimethylpropyl group, the 1-ethylpropyl group, the n-hexyl group, the isohexyl group, the sec-hexyl group, the tert-hexyl group, the neohexyl group, the 2-methylpentyl group, the 1,2-dimethylbutyl group, the 2,3-dimethylbutyl group, the 1-ethylbutyl group, the n-heptyl group, the n-octyl group, the n-nonyl group, the n-decyl group, the n-undecyl group, and the n-dodecyl group are preferable, the methyl group, the ethyl group, the n-propyl group, the isopropyl group, the n-butyl group, the isobutyl group, the sec-butyl group, the tert-butyl group, the n-pentyl group, the isopentyl group, and the n-hexyl group are more preferable, the methyl group, the ethyl group, the n-propyl group, the isopropyl group, the n-butyl group, the isobutyl group, the sec-butyl group, and the tert-butyl group are even more preferable, and the methyl group and the ethyl group are particularly preferable.

The alkoxy group having 1 to 20 carbon atoms represented by $R_5$ in the general formula (1) may be any of linear, branched, and cyclic alkoxy groups. Among these, the linear and branched alkoxy groups are preferable. In addition, among the alkoxy groups having 1 to 20 carbon atoms, an alkoxy group having 1 to 12 carbon atoms is preferable, an alkoxy group having 1 to 6 carbon atoms is more preferable, and an alkoxy group having 1 to 4 carbon atoms is particularly preferable. Specifically, examples thereof include a methoxy group, an ethoxy group, a n-propoxy group, an isopropoxy group, a n-butoxy group, an isobutoxy group, a sec-butoxy group, a tert-butoxy group, a cyclobutoxy group, a n-pentyloxy group, an isopentyloxy group, a sec-pentyloxy group, a tert-pentyloxy group, a neopentyloxy group, a 2-methylbutoxy group, a 1,2-dimethylpropoxy group, a 1-ethylpropoxy group, a cyclopentyloxy group, a n-hexyloxy group, an isohexyloxy group, a sec-hexyloxy group, a tert-hexyloxy group, a neohexyloxy group, a 2-methylpentyloxy group, a 1,2-dimethylbutoxy group, a 2,3-dimethylbutoxy group, a 1-ethylbutoxy group, a cyclohexyloxy group, a n-heptyloxy group, an isoheptyloxy group, a sec-heptyloxy group, a tert-heptyloxy group, a neoheptyloxy group, a cycloheptyloxy group, a n-octyloxy group, an isooctyloxy group, a sec-octyloxy group, a tert-octyloxy group, a neooctyloxy group, a 2-ethylhexyloxy group, a cyclooctyloxy group, a n-nonyloxy group, an isononyloxy group, a sec-nonyloxy group, a tert-nonyloxy group, a neononyloxy group, a cyclononyloxy group, a n-decyloxy group, an isodecyloxy group, a sec-decyloxy group, a tert-decyloxy group, a neodecyloxy group, a cyclodecyloxy group, a n-undecyloxy group, a cycloundecyloxy group, a n-dodecyloxy group, a cyclododecyloxy group, a n-tridecyloxy group, an isotridecyloxy group, a n-tetradecyloxy group, an isotetradecyloxy group, a n-pentadecyloxy group, an isopentadecyloxy group, a n-hexadecyloxy group, an isohexadecyloxy group, a n-heptadecyloxy group, an isoheptadecyloxy group, a n-octadecyloxy group, an isooctadecyloxy group, a n-nonadecyloxy group, an isononadecyloxy group, a n-eicosyloxy group, an isoeicosyloxy group, and the like. Among these, the methoxy group, the ethoxy group, the n-propoxy group, the isopropoxy group, the n-butoxy group, the isobutoxy group, the sec-butoxy group, the tert-butoxy group, the n-pentyloxy group, the isopentyloxy group, the sec-pentyloxy group, the tert-pentyloxy group, the neopentyloxy group, the 2-methylbutoxy group, the 1,2-dimethylpropoxy group, the 1-ethylpropoxy group, the n-hexyloxy group, the isohexyloxy group, the sec-hexyloxy group, the tert-hexyloxy group, the neohexyloxy group, the 2-methylpentyloxy group, the 1,2-dimethylbutoxy group, the 2,3-dimethylbutoxy group, and the 1-ethylbutoxy group are preferable, the methoxy group, the ethoxy group, the n-propoxy group, the isopropoxy group, the n-butoxy group, the isobutoxy group, the sec-butoxy group, and the tert-butoxy group are more preferable, and the methoxy group and the ethoxy group are even more preferable.

The alkylthio group having 1 to 20 carbon atoms represented by $R_5$ in the general formula (1) may be any of linear, branched, and cyclic alkylthio groups. Among these, the linear and branched alkylthio groups are preferable. In addition, among the alkylthio groups having 1 to 20 carbon atoms, an alkylthio group having 1 to 12 carbon atoms is preferable, an alkylthio group having 1 to 6 carbon atoms is more preferable, and an alkylthio group having 1 to 4 carbon atoms is particularly preferable. Specifically, examples thereof include a methylthio group, an ethylthio group, a n-propylthio group, an isopropylthio group, a n-butylthio group, an isobutylthio group, a sec-butylthio group, a tert-butylthio group, a cyclobutylthio group, a n-pentylthio group, an isopentylthio group, a sec-pentylthio group, a tert-pentylthio group, a neopentylthio group, a 2-methylbutylthio group, a 1,2-dimethylpropylthio group, a 1-ethylpropylthio group, a cyclopentylthio group, a n-hexylthio group, an isohexylthio group, a sec-hexylthio group, a tert-hexylthio group, a neohexylthio group, a 2-methylpentylthio group, a 1,2-dimethylbutylthio group, a 2,3-dimethylbutylthio group, a 1-ethylbutylthio group, a cyclohexylthio group, a n-heptylthio group, an isoheptylthio group, a sec-heptylthio group, a tert-heptylthio group, a neoheptylthio group, a cycloheptylthio group, a n-octylthio group, an isooctylthio group, a sec-octylthio group, a tert-octylthio group, a neooctylthio group, a 2-ethylhexylthio group, a cyclooctylthio group, a n-nonylthio group, an isononylthio group, a sec-nonylthio group, a tert-nonylthio group, a neononylthio group, a cyclononylthio group, a n-decylthio group, an isodecylthio group, a sec-decylthio group, a tert-decylthio group, a neodecylthio group, a cyclodecylthio group, a n-undecylthio group, a cycloundecylthio group, a n-dodecylthio group, a cyclododecylthio group, a n-tridecylthio group, an isotridecylthio group, a n-tetradecylthio group, an isotetradecylthio group, a n-pentadecylthio group, an isopentadecylthio group, a n-hexadecylthio group, an isohexadecylthio group, a n-heptadecylthio group, an isoheptadecylthio group, a n-octadecylthio group, an isooctadecylthio group, a n-nonadecylthio group, an isononadecylthio group, a n-eicosylthio group, an isoeicosylthio group, and the like. Among these, the methylthio group, the ethylthio group, the n-propylthio group, the isopropylthio group, the n-butylthio group, the isobutylthio group, the sec-butylthio group, the tert-butylthio group, the n-pentylthio group, the isopentylthio group, the sec-pentylthio group, the tert-pentylthio group, the neopentylthio group, the 2-methylbutylthio group, the 1,2-dimethylpropylthio group, the 1-ethylpropylthio group, the n-hexylthio group, the isohexylthio group, the sec-hexylthio group, the tert-hexylthio group, the neohexylthio group, the 2-methylpentylthio group, the 1,2-dimethylbutylthio group, the 2,3-dimethylbutylthio group, and the 1-ethylbutylthio group are preferable, the methylthio group, the ethylthio group, the n-propylthio group, the isopropylthio group, the n-butylthio group, the isobutylthio group, the sec-butylthio group, and the tert-butylthio group are more preferable, and the methylthio group and the ethylthio group are even more preferable.

The amino group which has a substituent represented by $R_5$ in the general formula (1) has 1 or 2 substituents. Examples of the substituent include an alkyl group having 1 to 20 carbon atoms, a halogenated alkyl group having 1 to 20 carbon atoms, an aryl group having 6 to 10 carbon atoms, an arylalkyl group having 7 to 13 carbon atoms, and the like. Among these, the alkyl group having 1 to 20 carbon atoms, the aryl group having 6 to 10 carbon atoms, and the arylalkyl group having 7 to 13 carbon atoms are preferable, and the alkyl group having 1 to 20 carbon atoms is more preferable.

Examples of the alkyl group having 1 to 20 carbon atoms as the substituent of the amino group which has a substituent represented by $R_5$ in the general formula (1) are the same as the examples of the alkyl group having 1 to 20 carbon atoms represented by $R_5$ in the general formula (1), and preferred examples thereof are also the same.

The halogenated alkyl group having 1 to 20 carbon atoms as the substituent of the amino group which has a substituent represented by $R_5$ in the general formula (1) may be any of linear, branched, and cyclic halogenated alkyl groups. Among these, the linear and branched halogenated alkyl groups are preferable. In addition, among the halogenated alkyl groups having 1 to 20 carbon atoms, a halogenated alkyl group having 1 to 12 carbon atoms is preferable, a halogenated alkyl group having 1 to 6 carbon atoms is more preferable, and a halogenated alkyl group having 1 to 3 carbon atoms is particularly preferable. Specifically, examples thereof include a chloroalkyl group such as a chloromethyl group, a trichloromethyl group, a 2-chloroethyl group, a 2,2,2-trichloroethyl group, a pentachloroethyl group, a 2-chloropropyl group, a 3-chloropropyl group, a 2-chloro-2-propyl group, or a heptachloropropyl group; a bromoalkyl group such as a bromomethyl group, a tribromomethyl group, a 2-bromoethyl group, a 2,2,2-tribromoethyl group, a pentabromoethyl group, a 2-bromopropyl group, a 3-bromopropyl group, a 2-bromo-2-propyl group, or a heptabromopropyl group; an iodoalkyl group such as an iodomethyl group, a triiodomethyl group, a 2-iodoethyl group, a 2,2,2-triiodoethyl group, a pentaiodoethyl group, a 2-iodopropyl group, a 3-iodopropyl group, a 2-iodo-2-propyl group, or a heptaiodopropyl group; and a fluoroalkyl group such as a fluoromethyl group, a trifluoromethyl group, a 2-fluoroethyl group, a 2,2,2-trifluoroethyl group, a 1,1,2,2-tetrafluoroethyl group, a pentafluoroethyl group, a 3-fluoropropyl group, a 3,3,3-trifluoropropyl group, a 2,2,3,3-tetrafluoropropyl group, or a heptafluoropropyl group. Among these, a perhalogenoalkyl group such as the trichloromethyl group, the pentachloroethyl group, the heptachloropropyl group, the tribromomethyl group, the pentabromoethyl group, the heptabromopropyl group, the triiodomethyl group, the pentaiodoethyl group, the heptaiodopropyl group, the trifluoromethyl group, the pentafluoroethyl group, or the heptafluoropropyl group is preferable, a perfluoroalkyl group such as the trifluoromethyl group, the pentafluoroethyl group, or the heptafluoropropyl group is more preferable, and the trifluoromethyl group is particularly preferable.

Examples of the aryl group having 6 to 10 carbon atoms as the substituent of the amino group which has a substituent represented by $R_5$ in the general formula (1) include a phenyl group, a naphthyl group, and the like. Among these, the phenyl group is preferable.

Examples of the arylalkyl group having 7 to 13 carbon atoms as the substituent of the amino group which has a substituent represented by $R_5$ in the general formula (1) include a phenylalkyl group having 7 to 9 carbon atoms, a naphthylalkyl group having 11 to 13 carbon atoms, and the like. Among these, the phenylalkyl group having 7 to 9 carbon atoms is preferable. Specific examples thereof include a benzyl group, a phenethyl group (2-phenylethyl group), a 1-phenylethyl group, a hydrocinnamyl group (3-phenylpropyl group), a 2-phenylpropyl group, a 1-phenylpropyl group, a cumyl group (2-phenylpropan-2-yl group), a naphthylmethyl group, a 2-naphthylethyl group, a 3-naphthylpropyl group, and the like. Among these, the benzyl group, the phenethyl group, the 1-phenylethyl group, the hydrocinnamyl group, the 2-phenylpropyl group, the 1-phenylpropyl group, and the cumyl group are preferable, the benzyl group, the phenethyl group, and the hydrocinnamyl group are more preferable, and the benzyl group is even more preferable.

As the amino group which has a substituent or is unsubstituted represented by $R_5$ in the general formula (1), an amino group which has a substituent is preferable, an amino group having an alkyl group having 1 to 20 carbon atoms, a halogenated alkyl group having 1 to 20 carbon atoms, an aryl group having 6 to 10 carbon atoms, or an arylalkyl group having 7 to 13 carbon atoms is preferable, and an amino group having an alkyl group having 1 to 6 carbon atoms, a phenyl group, or a phenylalkyl group having 7 to 9 carbon atoms is more preferable. Specifically, examples thereof include a methylamino group, an ethylamino group, a n-propylamino group, an isopropylamino group, a n-butylamino group, an isobutylamino group, a sec-butylamino group, a tert-butylamino group, a n-pentylamino group, an isopentylamino group, a n-hexylamino group, a phenylamino group, a benzylamino group, a phenethylamino group, a hydrocinnamylamino group, a dimethylamino group, a diethylamino group, a di-n-propylamino group, a diisopropylamino group, a di-n-butylamino group, a diisobutylamino group, a di-sec-butylamino group, a di-tertbutylamino group, a di-n-pentylamino group, a diisopentylamino group, a di-n-hexylamino group, a diphenylamino group, a dibenzylamino group, a diphenethylamino group, a bis(hydrocinnamyl)amino group, and the like. Among these, the methylamino group, the ethylamino group, the n-propylamino group, the isopropylamino group, the n-butylamino group, the isobutylamino group, the sec-butylamino group, the tert-butylamino group, the phenylamino group, the benzylamino group, the dimethylamino group, the diethylamino group, the di-n-propylamino group, the diisopropylamino group, the di-n-butylamino group, the diisobutylamino group, the di-sec-butylamino group, the di-tert-butylamino group, the diphenylamino group, and the dibenzylamino group are preferable.

Among these, an amino group having an alkyl group having 1 to 4 carbon atoms is preferable, and an amino group having two alkyl groups each having 1 to 4 carbon atoms is particularly preferable. Specifically, examples thereof include a methylamino group, an ethylamino group, a n-propylamino group, an isopropylamino group, a n-butylamino group, an isobutylamino group, a sec-butylamino group, a tert-butylamino group, a dimethylamino group, a diethylamino group, a di-n-propylamino group, a diisopropylamino group, a di-n-butylamino group, the diisobutylamino group, the di-sec-butylamino group, and the di-tert-butylamino group are preferable, the dimethylamino group, the diethylamino group, the di-n-propylamino group, the diisopropylamino group, the di-n-butylamino group, the diisobutylamino group, the di-sec-butylamino group, and the di-tert-butylamino group are more preferable, and the dimethylamino group and the diethylamino group are particularly preferable.

Specific examples of the aryl group having 6 to 14 carbon atoms represented by $R_5$ in the general formula (1) include a phenyl group, a naphthyl group, an anthracenyl group, and the like. Among these, the phenyl group is preferable.

Specific examples of the aryloxy group having 6 to 14 carbon atoms represented by $R_5$ in the general formula (1) include a phenoxy group, a naphthyloxy group, an anthracenyloxy group, and the like. Among these, the phenoxy group is preferable.

Examples of the arylalkyl group having 7 to 20 carbon atoms represented by $R_5$ in the general formula (1) include a phenylalkyl group having 7 to 12 carbon atoms, a naphthylalkyl group having 11 to 16 carbon atoms, an anthracenylalkyl group having 15 to 20 carbon atoms, and the like. Among these, the phenylalkyl group having 7 to 12 carbon atoms is preferable, and the phenylalkyl group having 7 to 9 carbon atoms is more preferable. Specifically, examples thereof include a benzyl group, a phenethyl group (2-phenylethyl group), a 1-phenylethyl group, a hydrocinnamyl group (3-phenylpropyl group), a 2-phenylpropyl group, a 1-phenylpropyl group, a cumyl group (2-phenylpropan-2-yl group), a 4-phenylbutyl group, a 3-phenylbutyl group, a 2-phenylbutyl group, a 1-phenylbutyl group, a 5-phenylpentyl group, a 4-phenylpentyl group, a 3-phenylpentyl group, a 2-phenylpentyl group, a 1-phenylpentyl group, a 6-phenylhexyl group, a 5-phenylhexyl group, a 4-phenylhexyl group, a 3-phenylhexyl group, a 2-phenylhexyl group, a 1-phenylhexyl group, a naphthylmethyl group, a 2-naphthylethyl group, a 3-naphthylpropyl group, a 4-naphthylbutyl group, a 5-naphthylpentyl group, a 6-naphthylhexyl group, an anthracenylmethyl group, a 2-anthracenylethyl group, a 3-anthracenylpropyl group, a 4-anthracenylbutyl group, a 5-anthracenylpentyl group, a 6-anthracenylhexyl group, and the like. Among these, the benzyl group, the phenethyl group, the 1-phenylethyl group, the hydrocinnamyl group, the 2-phenylpropyl group, the 1-phenylpropyl group, the cumyl group, the 4-phenylbutyl group, the 3-phenylbutyl group, the 2-phenylbutyl group, the 1-phenylbutyl group, the 5-phenylpentyl group, the 4-phenylpentyl group, the 3-phenylpentyl group, the 2-phenylpentyl group, the 1-phenylpentyl group, the 6-phenylhexyl group, the 5-phenylhexyl group, the 4-phenylhexyl group, the 3-phenylhexyl group, the 2-phenylhexyl group, and the 1-phenylhexyl group are preferable, the benzyl group, the phenethyl group, the 1-phenylethyl group, the hydrocinnamyl group, the 2-phenylpropyl group, the 1-phenylpropyl group, and the cumyl group are more preferable, and the benzyl group, the phenethyl group, the hydrocinnamyl group, and the cumyl group are even more preferable.

As $R_5$ in the general formula (1), a group having an acryloyl group or a methacryloyl group; a halogeno group; an alkyl group having 1 to 12 carbon atoms; an alkoxy group having 1 to 12 carbon atoms; an alkylthio group having 1 to 12 carbon atoms; an amino group having an alkyl group having 1 to 20 carbon atoms, a halogenated alkyl group having 1 to 20 carbon atoms, an aryl group having 6 to 10 carbon atoms, or an arylalkyl group having 7 to 13 carbon atoms; a hydroxy group; an aryl group having 6 to 14 carbon atoms; an aryloxy group having 6 to 14 carbon atoms; and an arylalkyl group having 7 to 20 carbon atoms are preferable, the group represented by the general formula (2); the halogeno group; the alkyl group having 1 to 12 carbon atoms; the alkoxy group having 1 to 12 carbon atoms; the alkylthio group having 1 to 12 carbon atoms; an amino group having an alkyl group having 1 to 6 carbon atoms, a phenyl group, or a phenylalkyl group having 7 to 9 carbon atoms; the hydroxy group; a phenyl group; a phenoxy group; and a phenylalkyl group having 7 to 12 carbon atoms are more preferable, the group represented by the general formula (2'b); the group represented by the general formula (2'd); the halogeno group; the alkyl group having 1 to 6 carbon atoms; the alkoxy group having 1 to 6 carbon atoms; the alkylthio group having 1 to 6 carbon atoms; the amino group having the alkyl group having 1 to 6 carbon atoms, the phenyl group, or the phenylalkyl group having 7 to 9 carbon atoms; the hydroxy group; the phenyl group; the phenoxy group; and the phenylalkyl group having 7 to 9 carbon atoms are even more preferable; the amino group having the alkyl group having 1 to 4 carbon atoms is still more preferable, and the amino group having two alkyl groups each having 1 to 4 carbon atoms is particularly preferable.

Specifically, a fluoro group, a methyl group, an ethyl group, a n-propyl group, an isopropyl group, a n-butyl group, an isobutyl group, a sec-butyl group, a tert-butyl group, a n-pentyl group, an isopentyl group, a n-hexyl group, a methoxy group, an ethoxy group, a n-propoxy group, an isopropoxy group, a n-butoxy group, an isobutoxy group, a sec-butoxy group, a tert-butoxy group, a methylthio group, an ethylthio group, a n-propylthio group, an isopropylthio group, a n-butylthio group, an isobutylthio group, a sec-butylthio group, a tert-butylthio group, a methylamino group, an ethylamino group, a n-propylamino group, an isopropylamino group, a n-butylamino group, an isobutylamino group, a sec-butylamino group, a tert-butylamino group, a n-pentylamino group, an isopentylamino group, a n-hexylamino group, a phenylamino group, a benzylamino group, a dimethylamino group, a diethylamino group, a di-n-propylamino group, a diisopropylamino group, a di-n-butylamino group, a diisobutylamino group, a di-sec-butylamino group, a di-tert-butylamino group, a di-n-pentylamino group, a diisopentylamino group, a di-n-hexylamino group, a diphenylamino group, a dibenzylamino group, a hydroxy group, a phenyl group, a phenoxy group, a benzyl group, a phenethyl group, a 1-phenylethyl group, a hydrocinnamyl group, a 2-phenylpropyl group, a 1-phenylpropyl group, a cumyl group, and groups represented by the following formulae are preferable.
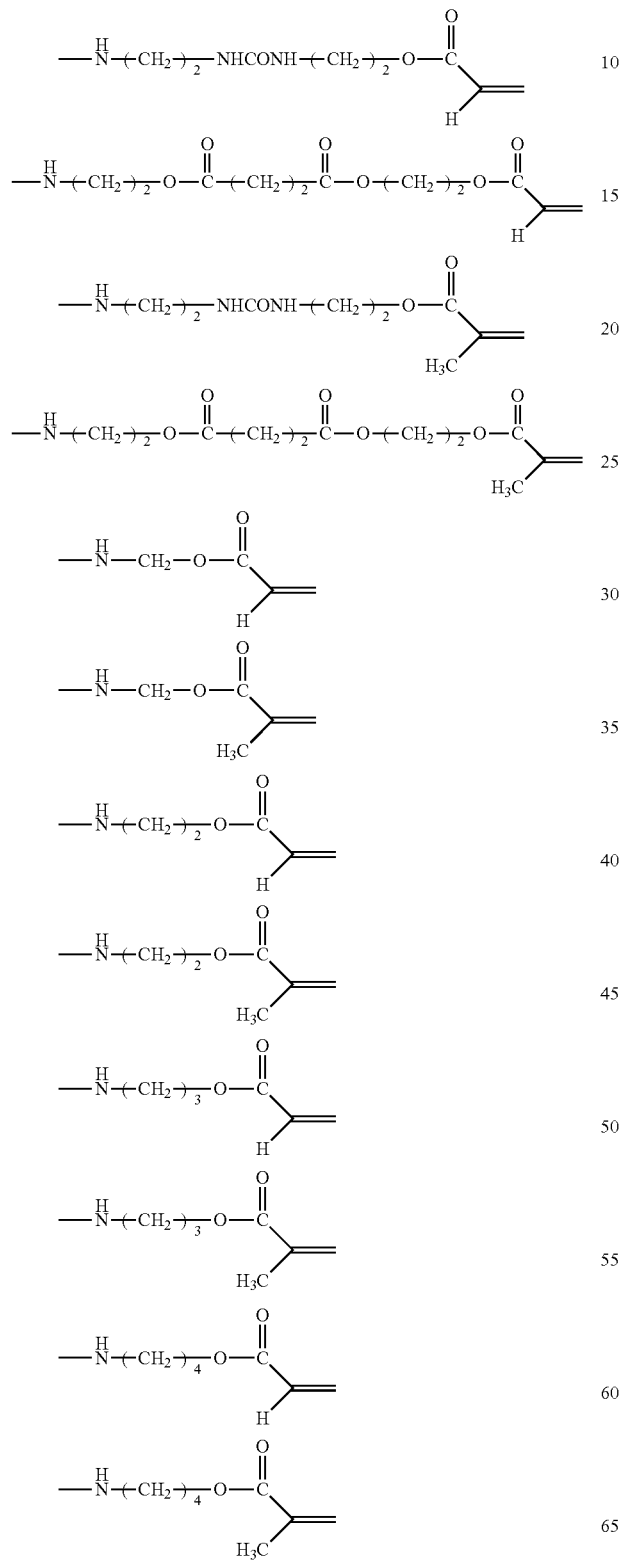
-continued
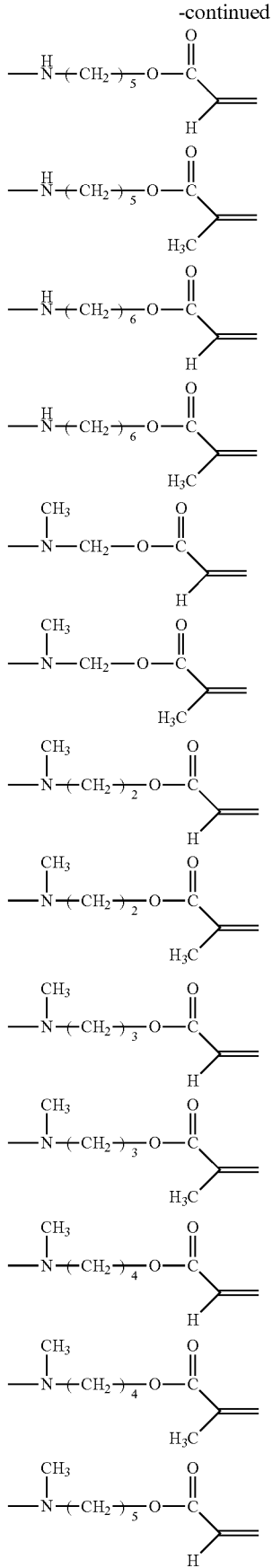

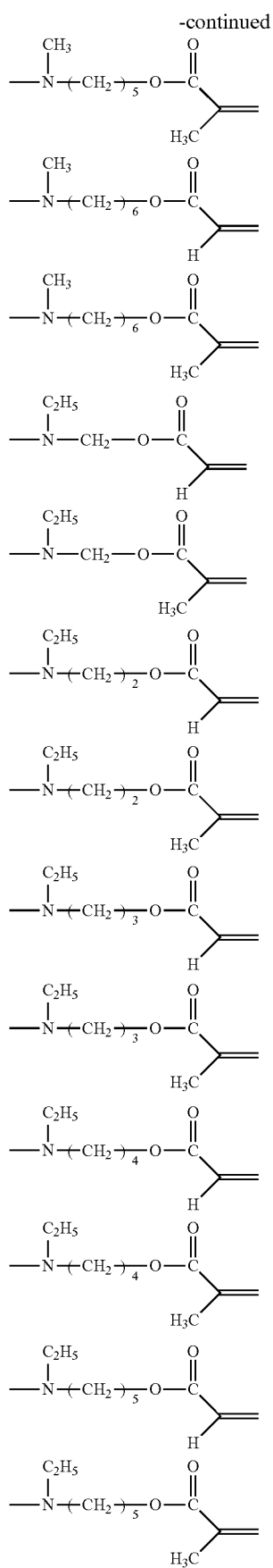
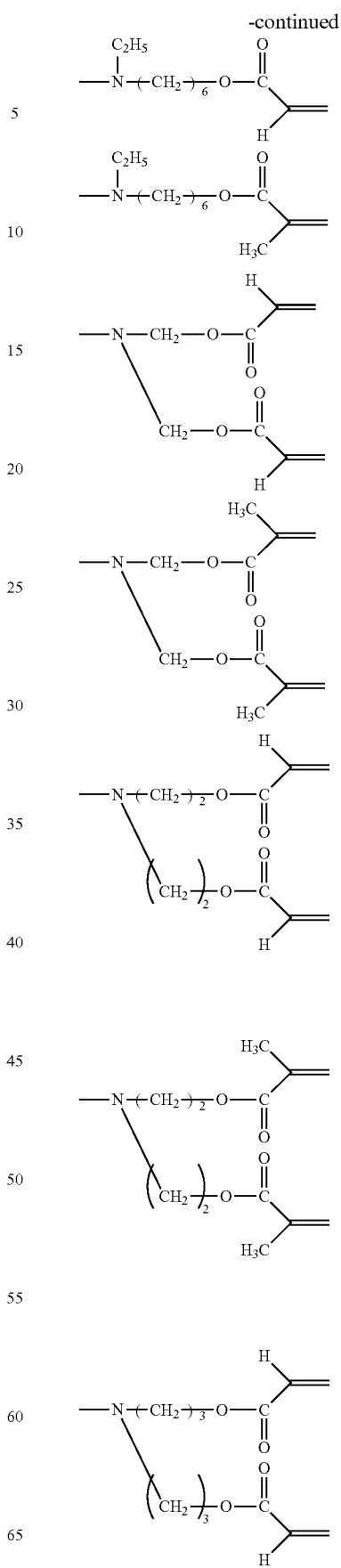

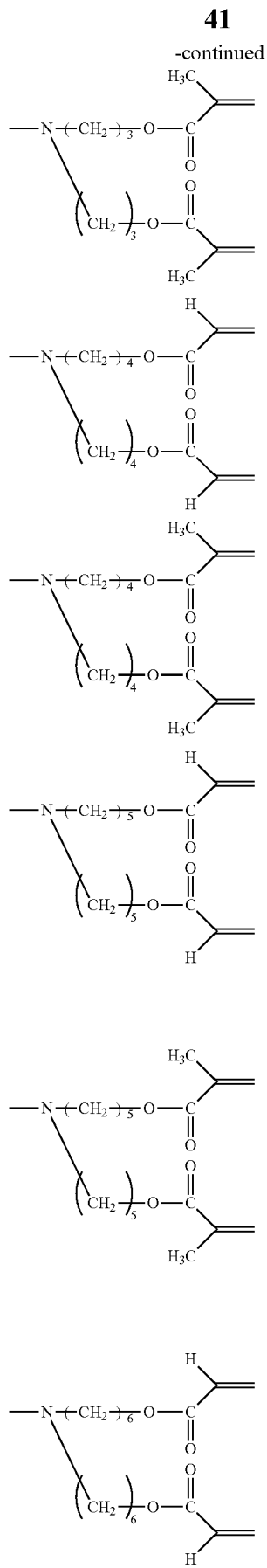

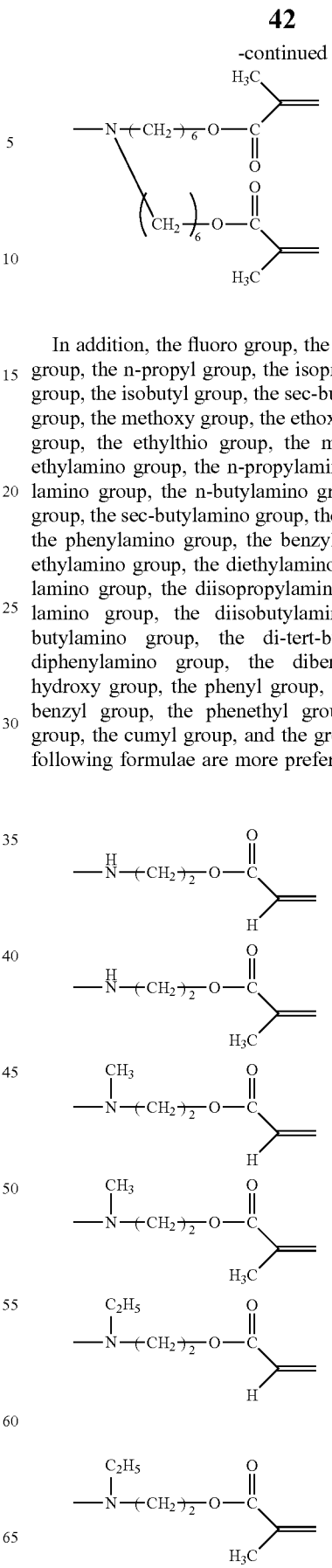

In addition, the fluoro group, the methyl group, the ethyl group, the n-propyl group, the isopropyl group, the n-butyl group, the isobutyl group, the sec-butyl group, the tert-butyl group, the methoxy group, the ethoxy group, the methylthio group, the ethylthio group, the methylamino group, the ethylamino group, the n-propylamino group, the isopropylamino group, the n-butylamino group, the isobutylamino group, the sec-butylamino group, the tert-butylamino group, the phenylamino group, the benzylamino group, the dimethylamino group, the diethylamino group, the di-n-propylamino group, the diisopropylamino group, the di-n-butylamino group, the diisobutylamino group, the di-sec-butylamino group, the di-tert-butylamino group, the diphenylamino group, the dibenzylamino group, the hydroxy group, the phenyl group, the phenoxy group, the benzyl group, the phenethyl group, the hydrocinnamyl group, the cumyl group, and the groups represented by the following formulae are more preferable.

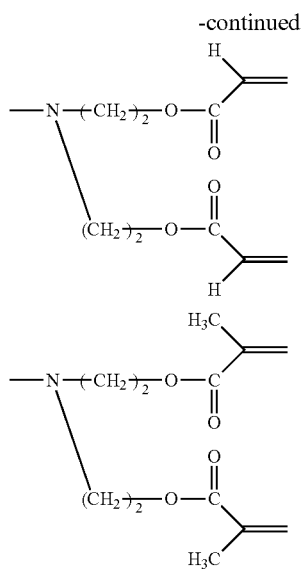

Among these, the methylamino group, the ethylamino group, the n-propylamino group, the isopropylamino group, the n-butylamino group, the isobutylamino group, the sec-butylamino group, the tert-butylamino group, the phenylamino group, the benzylamino group, the dimethylamino group, the diethylamino group, the di-n-propylamino group, the diisopropylamino group, the di-n-butylamino group, the diisobutylamino group, the di-sec-butylamino group, the di-tert-butylamino group, the diphenylamino group, the dibenzylamino group, and the groups represented by the following formulae are preferable, the methylamino group, the ethylamino group, the n-propylamino group, the isopropylamino group, the n-butylamino group, the isobutylamino group, the sec-butylamino group, the tert-butylamino group, the dimethylamino group, the diethylamino group, the di-n-propylamino group, the diisopropylamino group, the di-n-butylamino group, the diisobutylamino group, the di-sec-butylamino group, and the di-tert-butylamino group are more preferable, the dimethylamino group, the diethylamino group, the di-n-propylamino group, the diisopropylamino group, the di-n-butylamino group, the diisobutylamino group, the di-sec-butylamino group, and the di-tert-butylamino group are even more preferable, and dimethylamino group and the diethylamino group are particularly preferable.

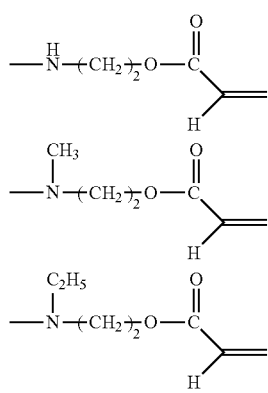

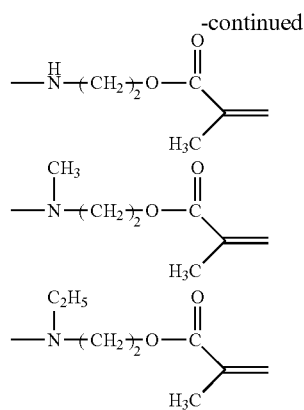

Examples of the alkoxy group having 1 to 20 carbon atoms represented by $R_1$ in the general formula (1) are the same as the examples of the alkoxy group having 1 to 20 carbon atoms represented by $R_5$ in the general formula (1), and preferred examples thereof are also the same.

The amino group which has a substituent represented by R % in the general formula (1) has 1 or 2 substituents and preferably has 2 substituents. Examples of the substituent include an alkyl group having 1 to 20 carbon atoms, a halogenated alkyl group having 1 to 20 carbon atoms, and the like.

Examples of the alkyl group having 1 to 20 carbon atoms and the halogenated alkyl group having 1 to 20 carbon atoms as the substituent of the amino group which has a substituent represented by $R_6$ in the general formula (1) are the same as the examples of the substituent of the amino group which has a substituent represented by $R_5$ in the general formula (1), and preferred examples thereof are also the same.

As the amino group which has a substituent or is unsubstituted represented by $R_6$ in the general formula (1), an amino group is preferable which has an alkyl group having 1 to 20 carbon atoms or a halogenated alkyl group having 1 to 20 carbon atoms or is unsubstituted, an amino group is more preferable which has an alkyl group having 1 to 20 carbon atoms or is unsubstituted, an amino group is even more preferable which has an alkyl group having 1 to 6 carbon atoms or is unsubstituted, and an amino group is particularly preferable which has an alkyl group having 1 to 4 carbon atoms or is unsubstituted. Specifically, examples thereof include an amino group, a methylamino group, an ethylamino group, a n-propylamino group, an isopropylamino group, a n-butylamino group, an isobutylamino group, a sec-butylamino group, a tert-butylamino group, a dimethylamino group, a diethylamino group, a di-n-propylamino group, a diisopropylamino group, a di-n-butylamino group, a diisobutylamino group, a di-sec-butylamino group, a di-tert-butylamino group, a N,N-ethylmethylamino group, a N,N-ethylpropylamino group, a N,N-dimethylpropylamino group, a N,N-butylmethylamino group, a N,N-butylethylamino group, a N,N-butylpropylamino group, and the like.

Examples of the heterocyclic amino group represented by R % in the general formula (1) include a heterocyclic amino group of a 5- to 7-membered ring. Among these, a heterocyclic amino group of a 5- or 6-membered ring is preferable. Specifically, examples thereof include a pyrrolidino group, a 1-pyrrolyl group, a 1-pyrazolyl group, a 1-imidazolyl group, a 3-oxazolyl group, a 3-thiazolyl group, a piperidino group, a piperazino group, a morpholino group, a 1-pyridyl group, a 1-pyridazinyl group, a 1-pyrimidinyl group, a 1-pyrazinyl group, and the like. Among these, the pyrrolidino group, the 1-pyrrolyl group, the piperidino group, and the 1-pyridyl group are preferable, and the piperidino group is more preferable.

As $R_6$ in the general formula (1), a group having a polymerizable unsaturated group, a hydroxy group, an alkoxy group having 1 to 20 carbon atoms, an amino group which has an alkyl group having 1 to 20 carbon atoms or is unsubstituted, and a heterocyclic amino group are preferable, a group having an acryloyl group or a methacryloyl group, the hydroxy group, an alkoxy group having 1 to 6 carbon atoms, an amino group which has an alkyl group having 1 to 6 carbon atoms or is unsubstituted, and heterocyclic amino group of a 5- or 6-membered ring are more preferable, the group represented by the general formula (2), the hydroxy group, an alkoxy group having 1 to 4 carbon atoms, an amino group which has an alkyl group having 1 to 4 carbon atoms or is unsubstituted, and a piperidino group are even more preferable, the group represented by the general formula (2) is even more preferable, and the group represented by the general formula (2'a) is particularly preferable.

In the general formula (1), a group represented by the following general formula (1-8) that is bonded to a phenyl group in the basic skeleton may be located at any of the ortho-position, the meta-position, and the para-position of the phenyl group. Among these, the ortho-position and the para-position are preferable, and the ortho-position is more preferable. Specifically, the group represented by the following general formula (1-8) is preferably bonded to the phenyl group in the basic skeleton just as compounds represented by the following general formulae (1-9) and (1-9'), and more preferably bonded to the phenyl group in the basic skeleton just as the compound represented by the general formula (1-9).

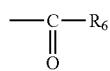
(1-8)

(In the formula, $R_6$ is the same as $R_6$ described above.)

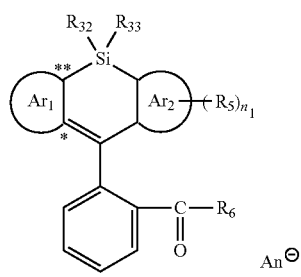
(1-9)

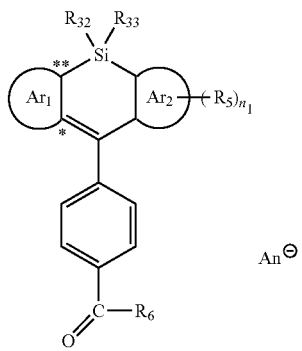
(1-9')

(In the formulae, * and ** each represent a position of bonding to the ring structures represented by any of the general formulae (1-1) to (1-7), and $n_1$ pieces of $R_5$, $R_6$, $R_{32}$, $R_{33}$, $An^-$, $Ar_1$, $Ar_2$, and $n_1$ are the same as $R_5$, $R_6$, $R_{32}$, $R_{33}$, $An^-$, $Ar_1$, $Ar_2$, and $n_1$ described above.)

Examples of the alkyl group having 1 to 20 carbon atoms represented by $R_2$ and $R_3$ in the general formula (1-1) are the same as the examples of the alkyl group having 1 to 20 carbon atoms represented by $R_5$ in the general formula (1), and preferred examples thereof are also the same.

Examples of the aryl group having 6 to 14 carbon atoms in the "aryl group having 6 to 14 carbon atoms that has a substituent or is unsubstituted" represented by $R_2$ and $R_3$ in the general formula (1-1) include a phenyl group, a naphthyl group, an anthracenyl group, and the like. Among these, the phenyl group is preferable.

The aryl group having 6 to 14 carbon atoms that has a substituent represented by $R_2$ and $R_3$ in the general formula (1-1) generally has 1 to 5 substituents, preferably has 1 to 3 substituents, and more preferably has 1 substituent. Examples of the substituent include an alkyl group having 1 to 20 carbon atoms and the like.

Examples of the alkyl group having 1 to 20 carbon atoms as the substituent of the "aryl group having 6 to 14 carbon atoms that has a substituent" represented by $R_2$ and $R_3$ in the general formula (1-1) are the same as the examples of the alkyl group having 1 to 20 carbon atoms represented by $R_5$ in the general formula (1), and preferred examples thereof are also the same.

Examples of the aryl group having 6 to 14 carbon atoms that has a substituent represented by $R_2$ and $R_3$ in the general formula (1-1) include an aryl group having 6 to 14 carbon atoms that has an alkyl group having 1 to 20 carbon atoms and the like. Among these, a phenyl group having an alkyl group having 1 to 20 carbon atoms, a naphthyl group, and an anthracenyl group are preferable, a phenyl group having an alkyl group having 1 to 12 carbon atoms is more preferable, a phenyl group having an alkyl group having 1 to 6 carbon atoms is even more preferable, and a phenyl group having an alkyl group having 1 to 3 carbon atoms is particularly preferable. Specifically, examples thereof include an o-tolyl group (methylphenyl group), a m-tolyl group, a p-tolyl group, an o-ethylphenyl group, a m-ethylphenyl group, a p-ethylphenyl group, an o-propylphenyl group, a m-propylphenyl group, a p-propylphenyl group, an o-butylphenyl group, a m-butylphenyl group, a p-butylphenyl group, an o-pentylphenyl group, a m-pentylphenyl group, a p-pentylphenyl group, an o-hexylphenyl group, a m-hexylphenyl group, a p-hexylphenyl group, a 2,3-xylyl group (2,3-dimethylphenyl group), a 2,4-xylyl group, a 2,5-xylyl group, a 2,6-xylyl group, a 3,4-xylyl group, a 3,5-xylyl group, a mesityl group (2,4,6-trimethylphenyl group), and the like. Among these, the p-tolyl group, the p-ethylphenyl group, the p-propylphenyl group, the p-butylphenyl group, the p-pentylphenyl group, the p-hexylphenyl group, the 2,4-xylyl group, the 2,6-xylyl group, the 3,5-xylyl group, and the mesityl group are preferable, and the p-tolyl group, the p-ethylphenyl group, and the p-propylphenyl group are more preferable. It should be noted that the alkyl group in the specific examples is not limited to a normal-isomer and includes all the branched alkyl groups such as a sec-isomer, a tert-isomer, an iso-isomer, and a neo-isomer. Among these, the normal-isomer and the iso-isomer are preferable, and the normal-isomer is more preferable.

In a case where $R_1$ and $R_2$ in the general formula (1-1) form an alkylene group having 2 to 4 carbon atoms together and in a case where $R_3$ and $R_4$ in the general formula (1-1) form an alkylene group having 2 to 4 carbon atoms together, the alkylene group having 2 to 4 carbon atoms may be any of linear and branched alkylene groups. Among these, the linear alkylene group is preferable. Specifically, examples thereof include an ethylene group, a trimethylene group, a propylene group, a 1,1-dimethylmethylene group, a tetramethylene group, a 1-methyltrimethylene group, a 2-methyltrimethylene group, a 1,2-dimethylethylene group, a 1,1-dimethylethylene group, an ethyl ethylene group, and the like. Among these, the ethylene group, the trimethylene group, and the tetramethylene group are preferable, and the trimethylene group is more preferable.

In a case where $R_1$ and $R_2$ in the general formula (1-1) form an alkylene group having 2 to 4 carbon atoms together and/or in a case where $R_3$ and $R_4$ in the general formula (1-1) form an alkylene group having 2 to 4 carbon atoms together, the following structures can be exemplified as specific examples of the ring structure represented by the general formula (1-1).

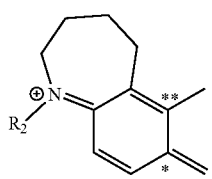 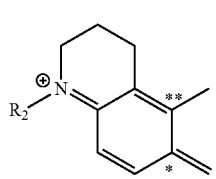

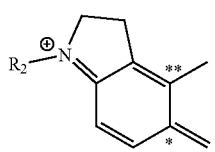 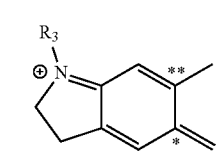

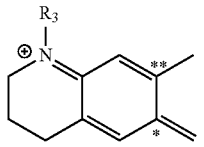 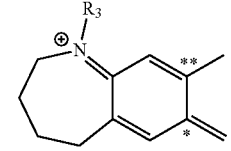

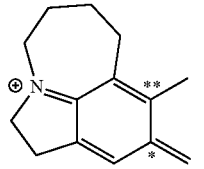 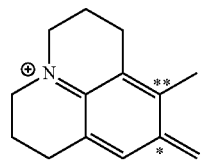

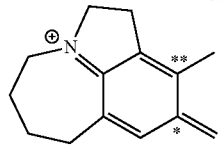

(In the formulae, * and ** each represent the same position as the position represented by each of * and ** in the general formula (1), and $R_2$ and $R_3$ are the same as $R_2$ and $R_3$ described above.)

Among the specific examples, the following structures are preferable.

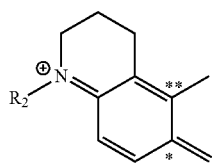

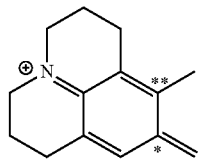

(In the formulae, * and ** each represent the same position as the position represented by each of * and ** in the general formula (1), and $R_2$ and $R_3$ are the same as $R_2$ and $R_3$ described above.)

Among the specific examples, the following structure is more preferable.

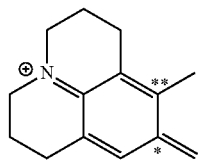

(In the formula, * and ** each represent the same position as the position represented by each of * and ** in the general formula (1).)

As $R_1$ in the general formula (1-1), a hydrogen atom and a group forming a linear alkylene group having 2 to 4 carbon atoms together with $R_2$ are preferable. Specifically, examples of $R_1$ include a hydrogen atom, a group forming an ethylene group together with $R_2$, a group forming a trimethylene group together with $R_2$, a group forming a tetramethylene group together with $R_2$, and the like. Among these, the hydrogen atom and the group forming a trimethylene group together with $R_2$ are preferable, and the hydrogen atom is more preferable.

As $R_2$ in the general formula (1-1), the group represented by the general formula (2-4), an alkyl group having 1 to 12 carbon atoms, a phenyl group which has an alkyl group having 1 to 6 carbon atoms or is unsubstituted, and a group forming an alkylene group having 2 to 4 carbon atoms together with $R_1$ are preferable, the group represented by the general formula (2-4"), an alkyl group having 1 to 6 carbon atoms, a phenyl group which has an alkyl group having 1 to 3 carbon atoms or is unsubstituted, and a group forming a linear alkylene group having 2 to 4 carbon atoms together with $R_1$ are more preferable, the alkyl group having 1 to 6 carbon atoms and the phenyl group which has an alkyl group having 1 to 3 carbon atoms or is unsubstituted are even more preferable, and an alkyl group having 1 to 4 carbon atoms is particularly preferable.

Specifically, examples of $R_2$ include a methyl group, an ethyl group, a propyl group, a butyl group, a pentyl group, a hexyl group, a phenyl group, a p-tolyl group, a p-ethylphenyl group, a p-propylphenyl group, a p-butylphenyl group, a p-pentylphenyl group, a p-hexylphenyl group, a 2,4-xylyl group, a 2,6-xylyl group, a 3,5-xylyl group, a mesityl group, a group forming an ethylene group together with $R_1$, a group forming a trimethylene group together with $R_1$, a group forming a tetramethylene group together with $R_1$, groups represented by the following formulae, and the like. It should be noted that the alkyl group in the specific examples is not limited to a normal-isomer, and includes all the branched alkyl groups such as a sec-isomer, a tert-isomer, an iso-isomer, and a neo-isomer.

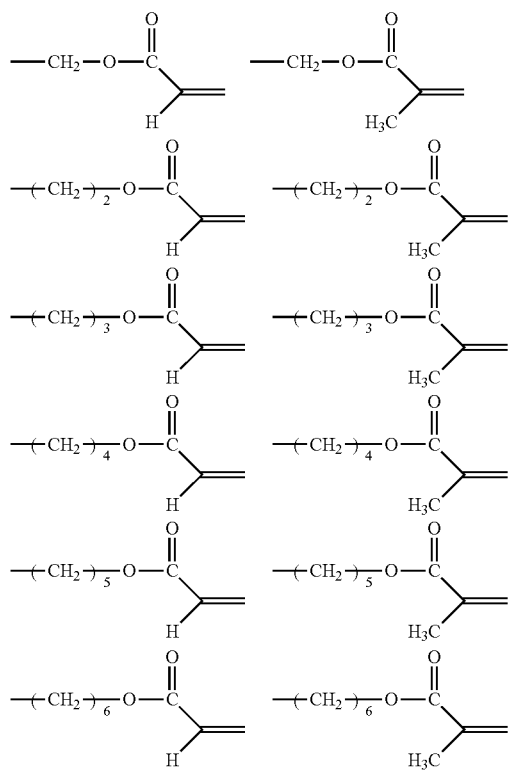

Among these, the methyl group, the ethyl group, the n-propyl group, the isopropyl group, the n-butyl group, the isobutyl group, the sec-butyl group, the tert-butyl group, the n-pentyl group, the isopentyl group, the n-hexyl group, the phenyl group, the p-tolyl group, the p-ethylphenyl group, the p-(n-propyl)phenyl group, the p-isopropylphenyl group, the group forming a trimethylene group together with $R_1$, and the groups represented by the following formulae are preferable, the methyl group, the ethyl group, the n-propyl group, the isopropyl group, the n-butyl group, the isobutyl group, the sec-butyl group, the tert-butyl group, the n-pentyl group, the isopentyl group, the n-hexyl group, the phenyl group, the p-tolyl group, the p-ethylphenyl group, the p-(n-propyl)phenyl group, and the p-isopropylphenyl group are more preferable, the methyl group, the ethyl group, the n-propyl group, the isopropyl group, the n-butyl group, the isobutyl group, the sec-butyl group, and the tert-butyl group are even more preferable, and the methyl group and the ethyl group are particularly preferable.

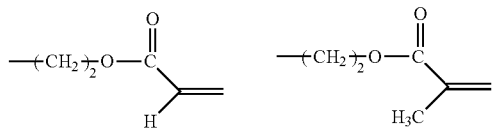

As $R_3$ in the general formula (1-1), the group represented by the general formula (2-4), an alkyl group having 1 to 12 carbon atoms, a phenyl group which has an alkyl group having 1 to 6 carbon atoms or is unsubstituted, and a group forming an alkylene group having 2 to 4 carbon atoms together with $R_4$ are preferable, the group represented by the general formula (2-4"), an alkyl group having 1 to 6 carbon atoms, a phenyl group which has an alkyl group having 1 to 3 carbon atoms or is unsubstituted, and a group forming a linear alkylene group having 2 to 4 carbon atoms together with $R_4$ are more preferable, the alkyl group having 1 to 6 carbon atoms and the phenyl group which has an alkyl group having 1 to 3 carbon atoms or is unsubstituted are even more preferable, and an alkyl group having 1 to 4 carbon atoms is particularly preferable.

Specifically, examples of $R_3$ include a methyl group, an ethyl group, a propyl group, a butyl group, a pentyl group, a hexyl group, a phenyl group, a p-tolyl group, a p-ethylphenyl group, a p-propylphenyl group, a p-butylphenyl group, a p-pentylphenyl group, a p-hexylphenyl group, a 2,4-xylyl group, a 2,6-xylyl group, a 3,5-xylyl group, a mesityl group, a group forming an ethylene group together with $R_4$, a group forming a trimethylene group together with $R_4$, a group forming a tetramethylene group together with $R_4$, groups represented by the following formulae, and the like. It should be noted that the alkyl group in the specific examples is not limited to a normal-isomer, and includes all the branched alkyl groups such as a sec-isomer, a tert-isomer, an iso-isomer, and a neo-isomer.

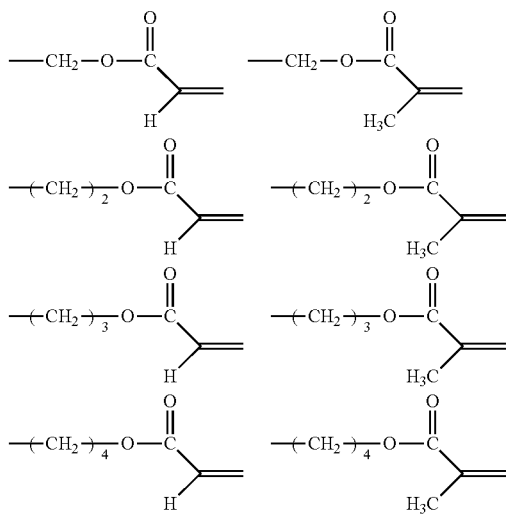

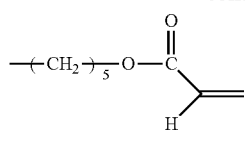 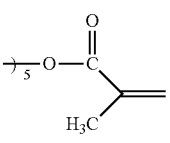

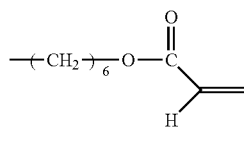 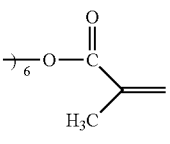

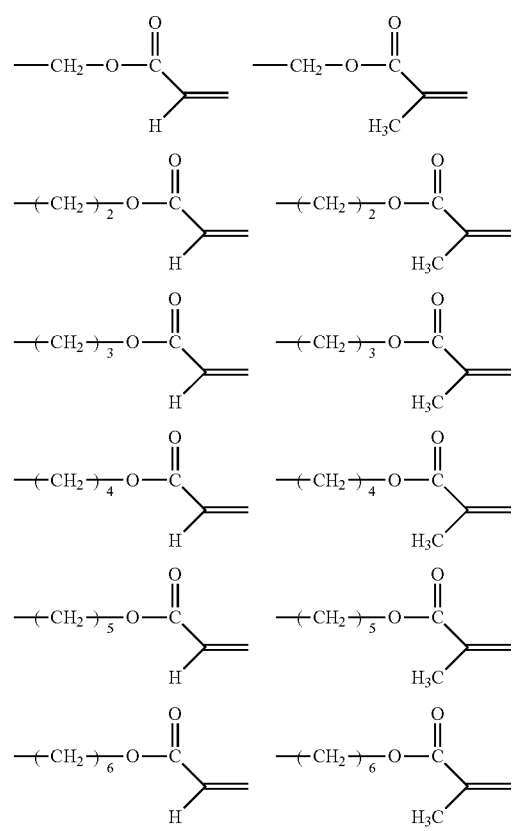

Among these, the methyl group, the ethyl group, the n-propyl group, the isopropyl group, the n-butyl group, the isobutyl group, the sec-butyl group, the tert-butyl group, the n-pentyl group, the isopentyl group, the n-hexyl group, the phenyl group, the p-tolyl group, the p-ethylphenyl group, the p-(n-propyl)phenyl group, the p-isopropylphenyl group, the group forming a trimethylene group together with $R_4$, and the groups represented by the following formulae are preferable, the methyl group, the ethyl group, the n-propyl group, the isopropyl group, the n-butyl group, the isobutyl group, the sec-butyl group, the tert-butyl group, the n-pentyl group, the isopentyl group, the n-hexyl group, the phenyl group, the p-tolyl group, the p-ethylphenyl group, the p-(n-propyl)phenyl group, and the p-isopropylphenyl group are more preferable, the methyl group, the ethyl group, the n-propyl group, the isopropyl group, the n-butyl group, the isobutyl group, the sec-butyl group, and the tert-butyl group are even more preferable, and the methyl group and the ethyl group are particularly preferable.

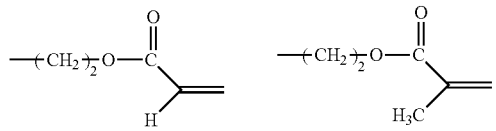

As $R_4$ in the general formula (1-1), a hydrogen atom and a group forming a linear alkylene group having 2 to 4 carbon atoms together with $R_3$ are preferable. Specifically, examples of $R_4$ include a hydrogen atom, a group forming an ethylene group together with $R_3$, a group forming a trimethylene group together with $R_3$, a group forming a tetramethylene group together with $R_3$, and the like. Among these, the hydrogen atom and the group forming a trimethylene group together with $R_3$ are preferable, and the hydrogen atom is more preferable.

Examples of the alkyl group having 1 to 20 carbon atoms represented by $R_{31}$ in the general formulae (1-2) to (1-7) are the same as the examples of the alkyl group having 1 to 20 carbon atoms represented by $R_5$ in the general formula (1), and preferred examples thereof are also the same.

As $R_{31}$ in the general formulae (1-2) to (1-7), the group represented by the general formula (2-4) or an alkyl group having 1 to 12 carbon atoms is preferable, and the group represented by the general formula (2-4″) or an alkyl group having 1 to 6 carbon atoms is more preferable. Specifically, examples of $R_{31}$ include a methyl group, an ethyl group, a propyl group, a butyl group, a pentyl group, a hexyl group, groups represented by the following formulae, and the like.

It should be noted that the alkyl group in the specific examples is not limited to a normal-isomer, and includes all the branched alkyl groups such as a sec-isomer, a tert-isomer, an iso-isomer, and a neo-isomer. Among these, the normal-isomer and the iso-isomer are preferable, and the normal-isomer is more preferable.

* and ** in the general formula (1) correspond to * and ** in the general formulae (1-1) to (1-7), and show that the group represented by any of the general formulae (1-1) to (1-7) is bonded to the positions represented by * and ** in the compound represented by the general formula (1). Specifically, the resulting structures are as below.

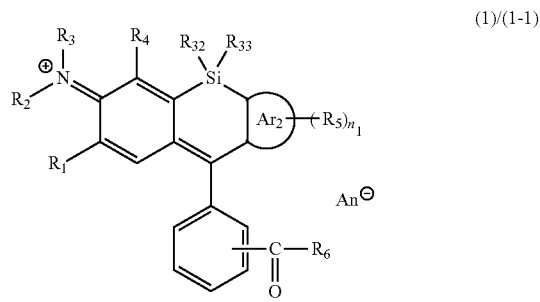

(1)/(1-1)

(1)/(1-2)

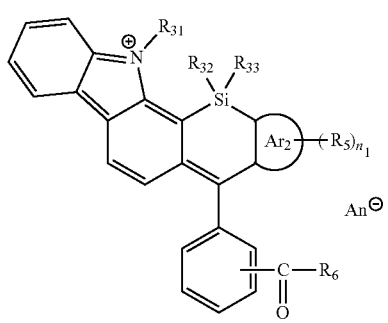

(1)/(1-3)

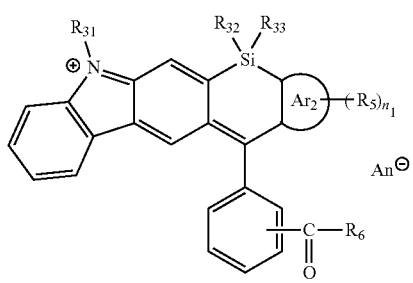

(1)/(1-4)

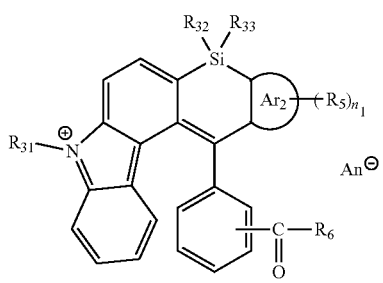

(1)/(1-5)

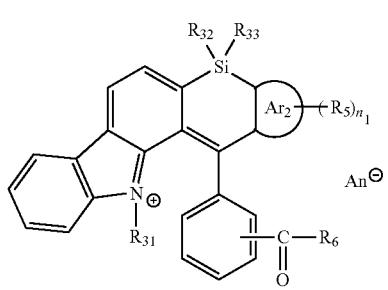

(1)/(1-6)

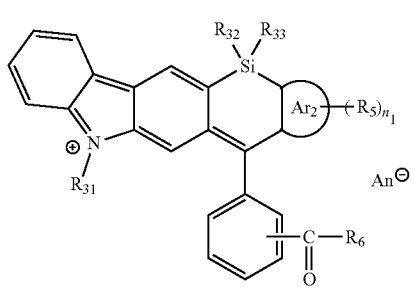

(1)/(1-7)

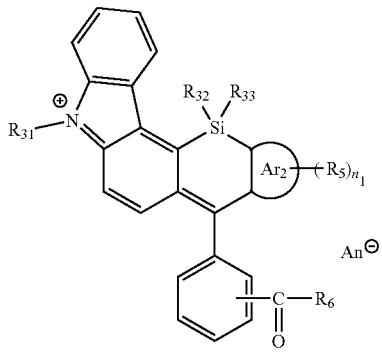

(In the formulae, $R_1$ to $R_4$, $n_1$ pieces of $R_5$, $R_6$, $R_{31}$ to $R_{33}$, An$^-$, Ar$_2$, and $n_1$ are the same as $R_1$ to $R_4$, $n_1$ pieces of $R_5$, $R_6$, $R_{31}$ to $R_{33}$, An$^-$, Ar$_2$, and $n_1$ described above.)

As Ar$_1$ in the general formula (1), the ring structure represented by the general formula (1-1) is preferable.

In a case where Ar$_2$ in the general formula (1) is a benzene ring, the general formula (1) is represented by the following general formula (10-1).

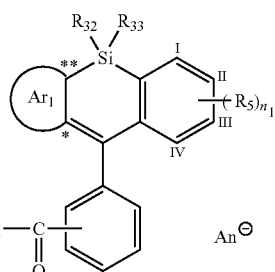

(10-1)

(In the formula, I to IV each represent a position which can be substituted with $R_5$, * and ** each represent a position of bonding to the ring structures represented by any of the general formulae (1-1) to (1-7), and $n_1$ pieces of $R_5$, $R_6$, $R_{32}$, $R_{33}$, An$^-$, Ar$_1$, and $n_1$ are the same as $n_1$ pieces of $R_5$, $R_6$, $R_{32}$, $R_{33}$, An$^-$, Ar$_1$, and $n_1$ described above.)

$n_1$ pieces of $R_5$ in the general formula (10-1) may be located at any of positions I to IV in the benzene ring. In a case where $n_1$ is 1, $R_5$ is preferably located at position II or position III, and more preferably located at position II. In a case where $n_1$ is 2, $R_5$ is preferably located at position II and position III or at position II and position IV. In a case where $n_1$ is 3, $R_5$ is preferably located at position II, position III, and position IV.

In a case where Ar$_2$ in the general formula (1) is a naphthalene ring, the general formula (1) is represented by any of the following general formulae (10-4) to (10-6).

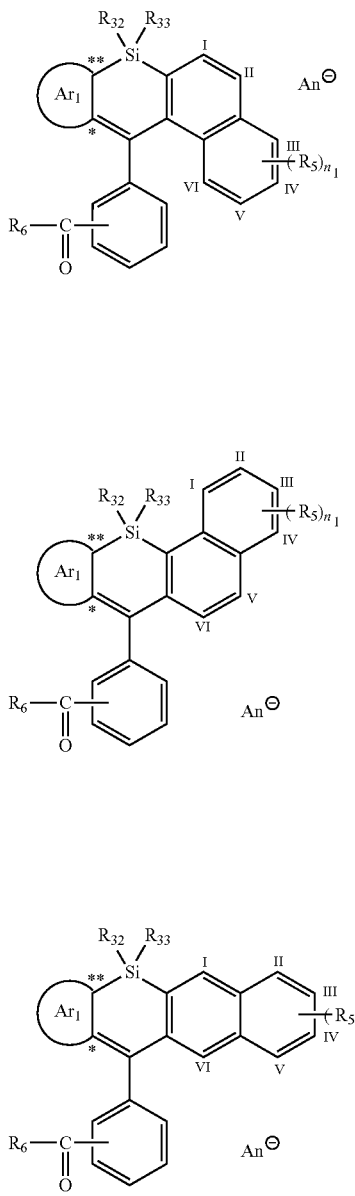

(10-4)
(10-5)
(10-6)

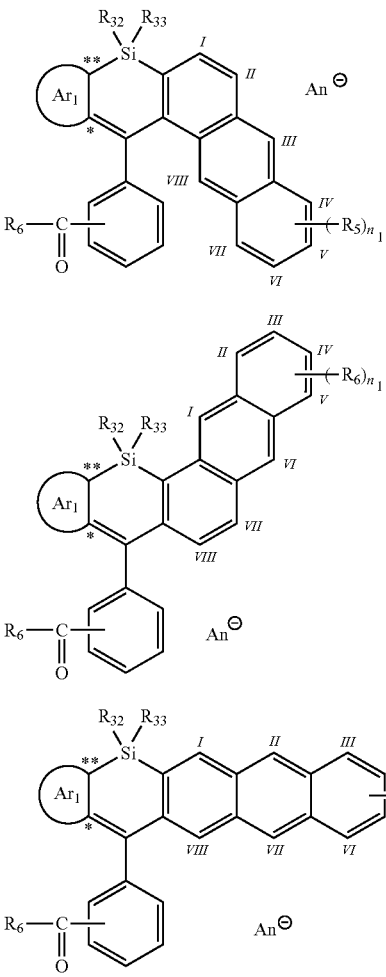

(10-7)
(10-8)
(10-9)

(In the formulae, I to VI each represent a position which can be substituted with $R_5$, * and ** each represent a position of bonding to the ring structure represented by any of the general formulae (1-1) to (1-7), and $n_1$ pieces of $R_5$, $R_6$, $R_{32}$, $R_{33}$, $An^-$, $Ar_1$, and $n_1$ are the same as $n_1$ pieces of $R_5$, $R_6$, $R_{32}$, $R_{33}$, $An^-$, $Ar_1$, and $n_1$ described above.)

$n_1$ pieces of $R_5$ in the general formula (10-4) may be located at any of positions I to VI in the naphthalene ring, and is preferably located at position IV or position VI.

$n_1$ pieces of $R_5$ in the general formula (10-5) may be located at any of positions I to VI in the naphthalene ring, and is preferably located at position III.

$n_1$ pieces of $R_5$ in the general formula (10-6) may be located at any of positions I to VI in the naphthalene ring, and is preferably located at position II or position IV.

In a case where $Ar_2$ in the general formula (1) is an anthracene ring, the general formula (1) is represented by any of the following general formulae (10-7) to (10-9).

(In the formulae, I to VIII each represent a position which can be substituted with $R_5$, * and ** each represent a position of bonding to the ring structure represented by any of the general formulae (1-1) to (1-7), and $n_1$ pieces of $R_5$, $R_6$, $R_{32}$, $R_{33}$, $An^-$, $Ar_1$, and $n_1$ are the same as $n_1$ pieces of $R_5$, $R_6$, $R_{32}$, $R_{33}$, $An^-$, $Ar_1$, and $n_1$ described above.)

$n_1$ pieces of $R_5$ in the general formula (10-7) may be located at any of positions I to VIII in the anthracene ring, and is preferably located at position I, position V, or position VI position.

$n_1$ pieces of $R_5$ in the general formula (10-8) may be located at any of positions I to VIII in the anthracene ring, and is preferably located at position II, position V, or position VII.

$n_1$ pieces of $R_5$ in the general formula (10-9) may be located at any of positions I to VIII in the anthracene ring, and is preferably located at position IV or position V.

As $Ar_2$ in the general formula (1), a benzene ring is preferable.

In a case where $Ar_2$ in the general formula (1) is a benzene ring, $n_1$ is preferably an integer of 0 to 3, more preferably 1 or 2, and particularly preferably 1. In a case where $Ar_2$ is a naphthalene ring or an anthracene ring, $n_1$ is preferably 0 or 1, and more preferably 0.

As the "alkyl group having 1 to 6 carbon atoms" represented by $R_{32}$ and $R_{33}$ in the general formula (1), any of the linear, branched, and cyclic alkyl groups are preferable.

Among these, the linear and branched alkyl groups are preferable. In addition, among the alkyl groups having 1 to 6 carbon atoms, an alkyl group having 1 to 4 carbon atoms is preferable. Specific examples thereof include a methyl group, an ethyl group, a n-propyl group, an isopropyl group, a n-butyl group, an isobutyl group, a sec-butyl group, a tert-butyl group, a cyclobutyl group, a n-pentyl group, an isopentyl group, a sec-pentyl group, a tert-pentyl group, a neopentyl group, a 2-methylbutyl group, a 1,2-dimethylpropyl group, a 1-ethylpropyl group, a cyclopentyl group, a n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, a cyclohexyl group, and the like. Among these, the methyl group, the ethyl group, the n-propyl group, the isopropyl group, the n-butyl group, the isobutyl group, the sec-butyl group, the tert-butyl group, the n-pentyl group, the isopentyl group, and n-hexyl group are preferable, the methyl group, the ethyl group, the n-propyl group, the isopropyl group, the n-butyl group, the isobutyl group, the sec-butyl group, and the tert-butyl group are more preferable, and the methyl group and the ethyl group are particularly preferable.

Examples of the aryl group having 6 to 14 carbon atoms represented by $R_{32}$ and $R_{33}$ in the general formula (1) include a phenyl group, a naphthyl group, an anthracenyl group, and the like. Among these, the phenyl group is preferable.

As $R_{32}$ and $R_{33}$ in the general formula (1), an alkyl group having 1 to 6 carbon atoms and a phenyl group are preferable, and an alkyl group having 1 to 4 carbon atoms is more preferable. Specifically, examples thereof include a methyl group, an ethyl group, a n-propyl group, an isopropyl group, a n-butyl group, an isobutyl group, a sec-butyl group, a tert-butyl group, a n-pentyl group, an isopentyl group, a n-hexyl group, a phenyl group, and the like. Among these, the methyl group, the ethyl group, the n-propyl group, the isopropyl group, the n-butyl group, the isobutyl group, the sec-butyl group, and the tert-butyl group are preferable, and the methyl group and the ethyl group are more preferable.

Anion represented by $An^-$ $An^-$ in the general formula (1) is not limited as long as it is an anion. Specifically, examples thereof include, an aryl group having an electron-withdrawing substituent, a sulfonyl group having an electron-withdrawing substituent, an anion containing a halogenated alkyl group or a halogeno group, and a halogen oxoacid anion or a sulfonate anion (hereinafter, simply described as anions according to the present invention in some cases).

Examples of the anionic portion in the aryl group having an electron-withdrawing substituent, the sulfonyl group having an electron-withdrawing substituent, and the anion containing a halogenated alkyl group among the anions according to the present invention include a sulfonate anion, a nitrogen anion (N), a quaternary boron anion, a nitrate ion, a phosphate ion, and the like. Among these, the sulfonate anion, the nitrogen anion, and the quaternary boron anion are preferable, and the quaternary boron anion is more preferable.

Examples of the anionic portion in the anion containing a halogeno group among the anions according to the present invention include a quaternary boron anion, a phosphorus anion, an antimony anion, and the like. Among these, the phosphorus anion and the antimony anion are preferable.

In the anions according to the present invention, examples of the electron-withdrawing substituent in the aryl group having an electron-withdrawing substituent or the sulfonyl group having an electron-withdrawing substituent include a halogenated alkyl group having 1 to 3 carbon atoms, a halogeno group, a nitro group, and the like. Among these, the halogenated alkyl group having 1 to 3 carbon atoms and the halogeno group are preferable, and the halogeno group is particularly preferable.

Examples of the halogenated alkyl group having 1 to 3 carbon atoms as the electron-withdrawing substituent include a chloroalkyl group such as a chloromethyl group, a trichloromethyl group, a 2-chloroethyl group, a 2,2,2-trichloroethyl group, a pentachloroethyl group, a 2-chloropropyl group, a 3-chloropropyl group, a 2-chloro-2-propyl group, or a heptachloropropyl group; a bromoalkyl group such as a bromomethyl group, a tribromomethyl group, a 2-bromoethyl group, a 2,2,2-tribromoethyl group, a pentabromoethyl group, a 2-bromopropyl group, a 3-bromopropyl group, a 2-bromo-2-propyl group, or a heptabromopropyl group; an iodoalkyl group such as an iodomethyl group, a triiodomethyl group, a 2-iodoethyl group, a 2,2,2-triiodoethyl group, a pentaiodoethyl group, a 2-iodopropyl group, a 3-iodopropyl group, a 2-iodo-2-propyl group, or a heptaiodopropyl group; and a fluoroalkyl group such as a fluoromethyl group, a trifluoromethyl group, a 2-fluoroethyl group, a 2,2,2-trifluoroethyl group, a 1,1,2,2-tetrafluoroethyl group, a pentafluoroethyl group, a 3-fluoropropyl group, a 3,3,3-trifluoropropyl group, a 2,2,3,3-tetrafluoropropyl group, or a heptafluoropropyl group. Among these, a perhalogenoalkyl group such as the trichloromethyl group, the pentachloroethyl group, the heptachloropropyl group, the tribromomethyl group, the pentabromoethyl group, the heptabromopropyl group, the iodomethyl group, the pentaiodoethyl group, the heptaiodopropyl group, the trifluoromethyl group, the pentafluoroethyl group, or the heptafluoropropyl group is preferable, a perfluoroalkyl group such as the trifluoromethyl group, the pentafluoroethyl group, or the heptafluoropropyl group is more preferable, and the trifluoromethyl group is particularly preferable.

Examples of the halogeno group as the electron-withdrawing substituent include a fluoro group, a chloro group, a bromo group, and an iodo group. Among these, the fluoro group is preferable.

In the anions according to the present invention, as the electron-withdrawing substituent in the aryl group having an electron-withdrawing substituent, among the specific examples, those having a strong electron-withdrawing force are preferable. As the electron-withdrawing substituent, a trifluoromethyl group, a fluoro group, and a nitro group are preferable, and the fluoro group is more preferable.

In the anions according to the present invention, as the electron-withdrawing substituent in the sulfonyl group having an electron-withdrawing substituent, among the specific examples, the trifluoromethyl group, the pentafluoroethyl group, the heptafluoropropyl group, and the fluoro group are preferable.

Examples of the aryl group in the aryl group having an electron-withdrawing substituent in the anions according to the present invention include a phenyl group, a naphthyl group, and the like. Among these, the phenyl group is preferable.

Specific examples of the aryl group having an electron-withdrawing substituent in the anions according to the present invention include aryl groups represented by the following general formulae (11) and (12).

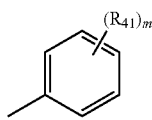

(11)

(In the formula, m represents an integer of 1 to 5, and m pieces of $R_{41}$ each independently represent a halogenated alkyl group having 1 to 3 carbon atoms, a halogeno group, or a nitro group.)

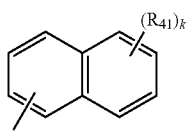

(12)

(In the formula, k represents an integer of 1 to 7, and $R_{41}$ is the same as $R_{41}$ described above. k pieces of $R_{41}$ may be the same as or different from each other.)

m in the general formula (11) is generally an integer of 1 to 5. In a case where $R_{41}$ is a halogeno group, m is preferably an integer of 2 to 5, more preferably an integer of 3 to 5, and even more preferably 5. In a case where $R_{41}$ is a nitro group, m is preferably an integer of 1 to 3, and more preferably 1. In a case where $R_{41}$ is a halogenated alkyl group, m is preferably an integer of 1 to 5, and more preferably an integer of 1 to 3.

k in the general formula (12) is generally an integer of 1 to 7. In a case where $R_{41}$ is a halogeno group, k is preferably an integer of 2 to 7. In a case where $R_{41}$ is a nitro group, k is preferably an integer of 1 to 3, and more preferably 1. In a case where $R_{41}$ is a halogenated alkyl group, k is preferably an integer of 1 to 7, and more preferably an integer of 1 to 3.

Examples of the "halogenated alkyl group having 1 to 3 carbon atoms" represented by $R_{41}$ in the general formula (11) and the general formula (12) are the same as the examples of the halogenated alkyl group having 1 to 3 carbon atoms as the electron-withdrawing substituent in the anions according to the present invention, and preferred examples thereof are also the same.

Examples of the halogeno group represented by $R_{41}$ in the general formula (11) and the general formula (12) include a fluoro group, a chloro group, a bromo group, and an iodo group. Among these, the fluoro group is preferable.

Specific examples preferred as $R_{41}$ in the general formula (11) and the general formula (12) are the same as the specific examples preferred as the electron-withdrawing substituent in the aryl group having an electron-withdrawing substituent.

Specifically, examples of the group represented by the general formula (11) include a trifluoromethylphenyl group, a di(trifluoromethyl)phenyl group, a tri(trifluoromethyl)phenyl group, a monofluorophenyl group, a difluorophenyl group, a trifluorophenyl group, a perfluorophenyl group, a monochlorophenyl group, a dichlorophenyl group, a trichlorophenyl group, a perchlorophenyl group, a monobromophenyl group, a dibromophenyl group, a tribromophenyl group, a perbromophenyl group, a monoiodophenyl group, a diiodophenyl group, a triiodophenyl group, a periodophenyl group, a nitrophenyl group, a dinitrophenyl group, a trinitrophenyl group, and the like. Among these, the difluorophenyl group, the trifluorophenyl group, and the perfluorophenyl group are preferable, and the perfluorophenyl group is more preferable.

Specifically, examples of the group represented by the general formula (12) include a trifluoromethylnaphthyl group, a di(trifluoromethyl)naphthyl group, a tri(trifluoromethyl)naphthyl group, a monofluoronaphthyl group, a difluoronaphthyl group, a trifluoronaphthyl group, a perfluoronaphthyl group, a monochloronaphthyl group, a dichloronaphthyl group, a trichloronaphthyl group, a perchloronaphthyl group, a monobromonaphthyl group, a dibromonaphthyl group, a tribromonaphthyl group, a perbromonaphthyl group, a monoiodonaphthyl group, a diiodonaphthyl group, a triiodonaphthyl group, a periodonaphthyl group, a nitronaphthyl group, a dinitronaphthyl group, a trinitronaphthyl group, and the like.

As the aryl group having an electron-withdrawing substituent in the anions according to the present invention, among the specific examples, the group represented by the general formula (11) is preferable. Specifically, a trifluoromethylphenyl group, a nitrophenyl group, a dinitrophenyl group, a trinitrophenyl group, a monofluorophenyl group, a difluorophenyl group, a trifluorophenyl group, and a perfluorophenyl group are preferable, the difluorophenyl group, the trifluorophenyl group, the nitrophenyl group, and the perfluorophenyl group are more preferable, and the perfluorophenyl group is particularly preferable.

Examples of the sulfonyl group having an electron-withdrawing substituent in the anions according to the present invention include $—SO_2—CF_3$, $—SO_2—C_2F_5$, $—SO_2—C_3F_7$, $—SO_2—F$, $—SO_2—Cl$, $—SO_2—Br$, $—SO_2—I$, and the like.

Examples of the halogenated alkyl group in the anions according to the present invention include a halogenated alkyl group having 1 to 3 carbon atoms. Among these, a perhalogenated alkyl group is preferable. Specifically, examples thereof include a trifluoromethyl group, a pentafluoroethyl group, a heptafluoropropyl group, a trichloromethyl group, a pentachloroethyl group, a heptachloropropyl group, a tribromomethyl group, a pentabromoethyl group, a heptabromopropyl group, a triiodomethyl group, a pentaiodoethyl group, a heptaiodopropyl group, and the like. Among these, the trifluoromethyl group, the pentafluoroethyl group, and the heptafluoropropyl group are preferable.

Examples of the halogeno group in the anions according to the present invention include a fluoro group, a chloro group, a bromo group, and an iodo group. Among these, the fluoro group is preferable.

Specifically, examples of the aryl group having an electron-withdrawing substituent, the sulfonyl group having an electron-withdrawing substituent, and the anion containing a halogenated alkyl group or a halogeno group according to the present invention include groups represented by the following general formulae (13) to (19).

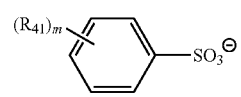

(13)

(In the formula, $R_{41}$ and m are the same as $R_{41}$ and m described above. m pieces of $R_{41}$ may be the same as or different from each other.)

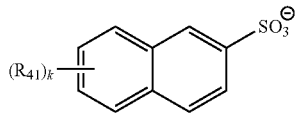
(14)

(In the formula, $R_{41}$ and k are the same as $R_{41}$ and k described above. k pieces of $R_{41}$ may be the same as or different from each other.)

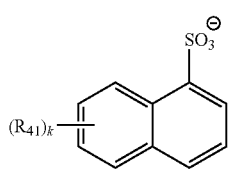
(15)

(In the formula, $R_{41}$ and k are the same as $R_{41}$ and k described above. k pieces of $R_{41}$ may be the same as or different from each other.)

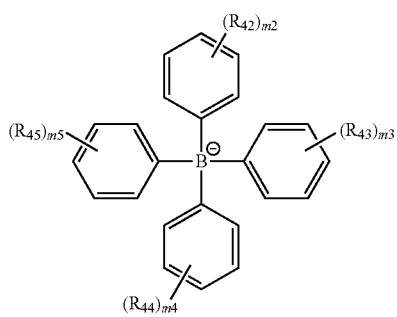
(16)

(In the formula, $R_{42}$ to $R_{45}$ each independently represent a halogenated alkyl group having 1 to 3 carbon atoms, a halogeno group, or a nitro group, and $m_2$ to $m_5$ each independently represent an integer of 1 to 5. $m_2$ pieces of $R_{42}$, $m_3$ pieces of $R_{43}$, $m_4$ pieces of $R_{44}$, and $m_5$ pieces of $R_{45}$ may be the same as or different from each other respectively.)

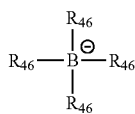
(17)

(In the formula, four $R_{46}$'s each independently represent a halogenated alkyl group having 1 to 3 carbon atoms or a halogeno group.)

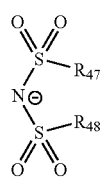
(18)

(In the formula, $R_{47}$ and $R_{48}$ each independently represent a halogenated alkyl group having 1 to 3 carbon atoms or a halogeno group. $R_{47}$ and $R_{48}$ may form a halogenated alkylene group having 2 or 3 carbon atoms together.)

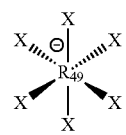
(19)

(In the formula, $R_{49}$ represents a phosphorus atom or an antimony atom, and all of six X's represent the same halogeno group.)

It is preferable that all of m pieces of $R_{41}$ in the general formula (13) are the same as each other.

Examples of the combination of $R_{41}$ and m in the general formula (13) include combinations described in the following table.

| $R_{41}$ | m |
|---|---|
| Trifluoromethyl group ($-CF_3$) | 1 to 3 |
| Pentafluoroethyl group ($-C_2F_5$) | 1 to 3 |
| Heptafluoropropyl group ($-C_3F_7$) | 1 to 3 |
| Nitro group | 1 to 3 |
| Fluoro group | 1 to 5 |
| Chloro group | 1 to 5 |
| Bromo group | 1 to 5 |
| Iodo group | 1 to 5 |

Preferred specific examples of the anion represented by the general formula (13) include the following anions.

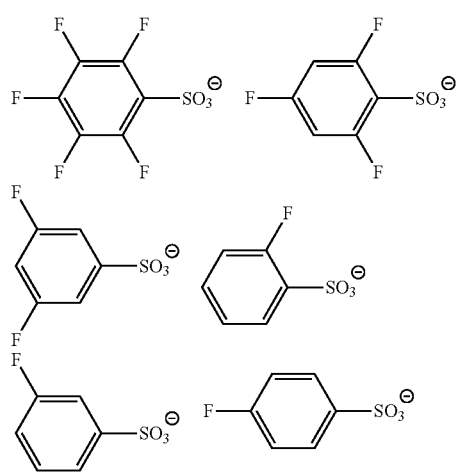

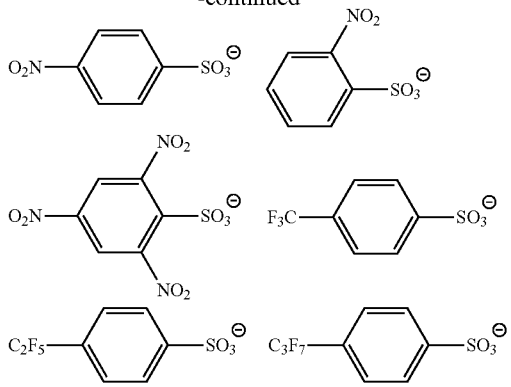

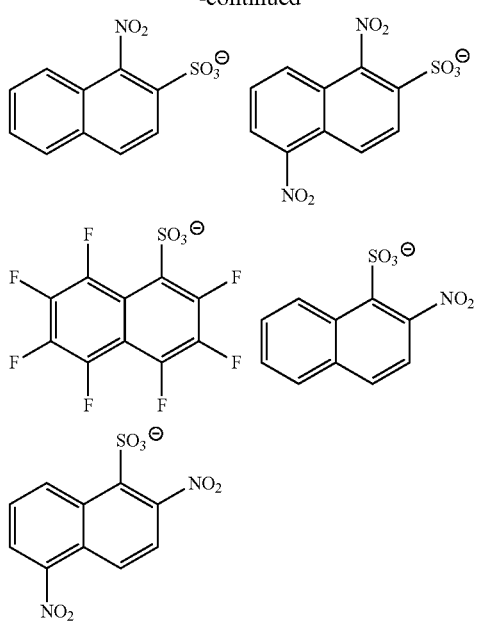

It is preferable that all of k pieces of $R_{41}$ in the general formulae (14) and (15) are the same as each other.

Examples of the combination of $R_{41}$ and k in the general formulae (14) and (15) include combinations described in the following table.

| $R_{41}$ | k |
|---|---|
| Trifluoromethyl group (—CF$_3$) | 1 to 3 |
| Pentafluoroethyl group (—C$_2$F$_5$) | 1 to 3 |
| Heptafluoropropyl group (—C$_3$F$_7$) | 1 to 3 |
| Nitro group | 1 to 3 |
| Fluoro group | 1 to 7 |
| Chloro group | 1 to 7 |
| Bromo group | 1 to 7 |
| Iodo group | 1 to 7 |

Preferred specific examples of the anions represented by the general formulae (14) and (15) include the following anions.

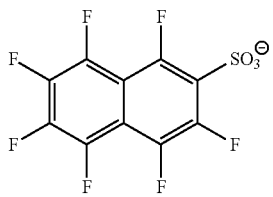

Examples of the halogenated alkyl group having 1 to 3 carbon atoms represented by $R_{42}$ to $R_{45}$ in the general formula (16) are the same as the examples of the halogenated alkyl group having 1 to 3 carbon atoms as the electron-withdrawing substituent in the anions according to the present invention, and preferred examples thereof are also the same.

Examples of the halogeno group represented by $R_{42}$ to $R_{45}$ in the general formula (16) include a fluoro group, a chloro group, a bromo group, an iodo group, and the like. Among these, the fluoro group is preferable.

$m_2$ pieces of $R_{42}$, $m_3$ pieces of $R_{43}$, $m_4$ pieces of $R_{44}$, and $m_5$ pieces of $R_{45}$ in the general formula (16) are preferably the same as each other respectively. It is more preferable that all of these are the same as each other.

Examples of the combination of $R_{42}$ to $R_{45}$ and $m_2$ to $m_5$ in the general formula (16) include combinations described in the following table.

| $R_{42}$ | $m_2$ | $R_{43}$ | $m_3$ | $R_{44}$ | $m_4$ | $R_{45}$ | $m_5$ |
|---|---|---|---|---|---|---|---|
| —CF$_3$ | 1 to 3 | —CF$_3$ | 1 to 3 | —CF$_3$ | 1 to 3 | —CF$_3$ | 1 to 3 |
| —C$_2$F$_5$ | 1 to 3 | —C$_2$F$_5$ | 1 to 3 | —C$_2$F$_5$ | 1 to 3 | —C$_2$F$_5$ | 1 to 3 |
| —C$_3$F$_7$ | 1 to 3 | —C$_3$F$_7$ | 1 to 3 | —C$_3$F$_7$ | 1 to 3 | —C$_3$F$_7$ | 1 to 3 |
| Nitro group | 1 to 3 | Nitro group | 1 to 3 | Nitro group | 1 to 3 | Nitro group | 1 to 3 |
| Fluoro group | 1 to 5 | Fluoro group | 1 to 5 | Fluoro group | 1 to 5 | Fluoro group | 1 to 5 |
| Chloro group | 1 to 5 | Chloro group | 1 to 5 | Chloro group | 1 to 5 | Chloro group | 1 to 5 |
| Bromo group | 1 to 5 | Bromo group | 1 to 5 | Bromo group | 1 to 5 | Bromo group | 1 to 5 |
| Iodo group | 1 to 5 | Iodo group | 1 to 5 | Iodo group | 1 to 5 | Iodo group | 1 to 5 |
| Nitro group | 1 to 3 | Fluoro group | 1 to 5 | Fluoro group | 1 to 5 | Fluoro group | 1 to 5 |
| Nitro group | 1 to 3 | Nitro group | 1 to 3 | Fluoro group | 1 to 5 | Fluoro group | 1 to 5 |
| Nitro group | 1 to 3 | Nitro group | 1 to 3 | Nitro group | 1 to 3 | Fluoro group | 1 to 5 |

Preferred specific examples of the anion represented by the general formula (16) include the following anions.
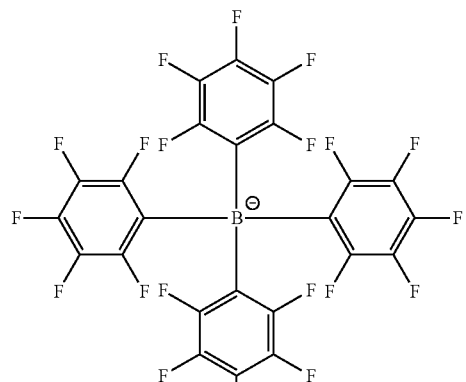
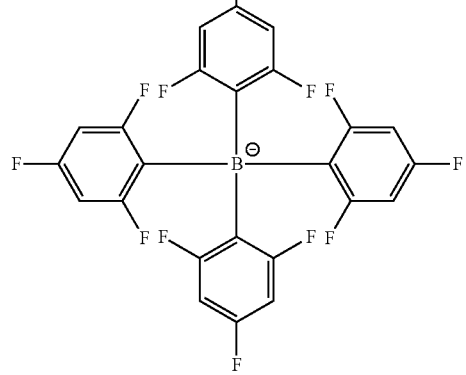
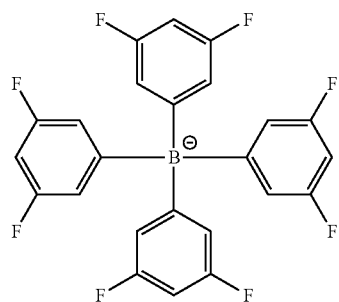
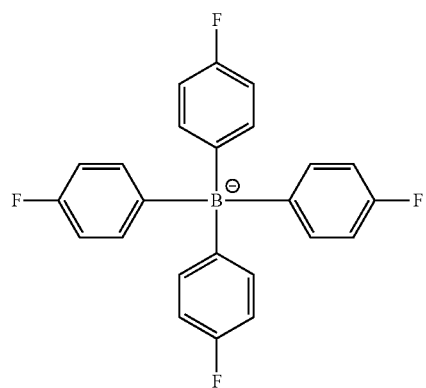
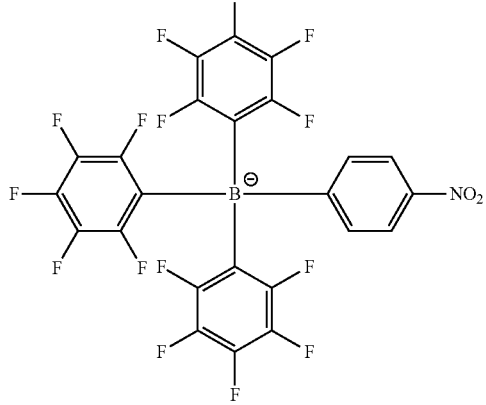
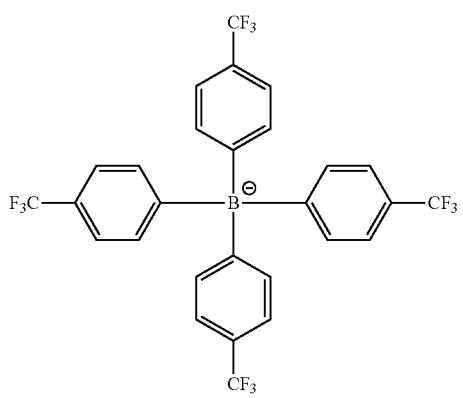
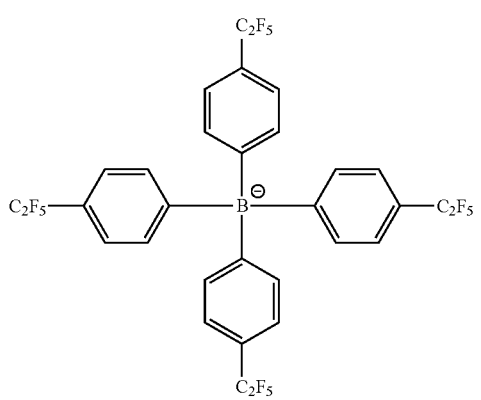
Among the specific examples, the following anions are more preferable.

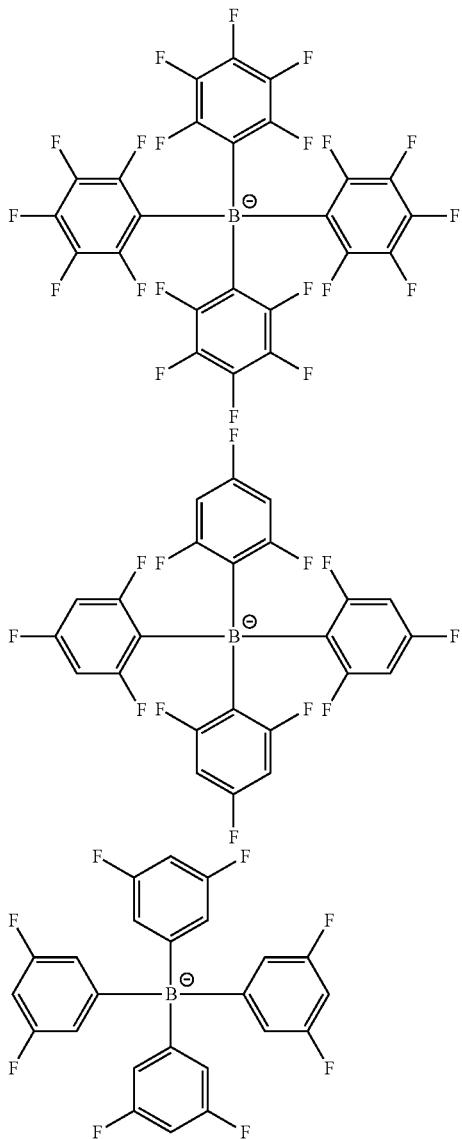

Among the specific examples, a tetrakis(pentafluorophenyl)boron (IV) anion is particularly preferable.

Examples of the halogenated alkyl group having 1 to 3 carbon atoms represented by $R_{46}$ in the general formula (17) are the same as the examples of the halogenated alkyl group having 1 to 3 carbon atoms as the electron-withdrawing substituent in the anions according to the present invention, and preferred examples thereof are also the same.

Examples of the halogeno group represented by $R_{46}$ in the general formula (17) include a fluoro group, a chloro group, a bromo group, an iodo group, and the like. Among these, the fluoro group is preferable.

Preferred specific examples of the anion represented by the general formula (17) include $BF_4^-$, $CF_3BF_3^-$, $C_2F_5BF_3^-$, $C_3F_7BF_3^-$, $(CF_3)_4B^-$, $(C_2F_5)_4B^-$, $(C_3F_7)_4B^-$, and the like.

Examples of the halogenated alkyl group having 1 to 3 carbon atoms represented by $R_{47}$ and $R_{48}$ in the general formula (18) are the same as the examples of the halogenated alkyl group having 1 to 3 carbon atoms as the electron-withdrawing substituent in the anions according to the present invention, and preferred examples thereof are also the same.

Examples of the halogeno group represented by $R_{47}$ and $R_{48}$ in the general formula (18) include a fluoro group, a chloro group, a bromo group, an iodo group, and the like. Among these, the fluoro group is preferable.

Examples of the halogenated alkylene group having 2 or 3 carbon atoms formed by $R_{47}$ and $R_{48}$ in the general formula (18) include a tetrafluoroethylene group, a hexafluoropropylene group, and the like. Among these, the hexafluoropropylene group is preferable.

Preferred specific examples of the anion represented by the general formula (18) include the following anions.

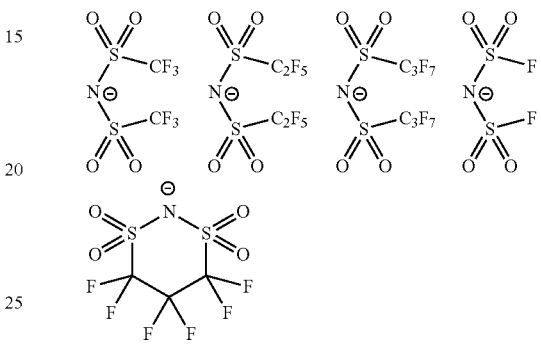

As $R_{49}$ in the general formula (19), an antimony atom is preferable.

Examples of the halogeno group represented by X in the general formula (19) include a fluoro group, a chloro group, a bromo group, an iodo group, and the like. Among these, the fluoro group is preferable.

Preferred specific examples of the anion represented by the general formula (19) include the following anions.

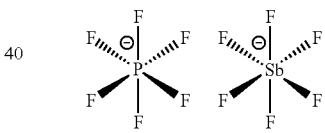

Specific examples of the halogen oxoacid anion in the anions according to the present invention include a hypochlorite anion, a chlorite anion, a chlorate anion, a perchlorate anion, and the like. Among these, the perchlorate anion is preferable.

Specific examples of the sulfonate anion in the anions according to the present invention include an alkylsulfonate anion having 1 to 20 carbon atoms such as a methanesulfonate anion; a halogenated alkylsulfonate anion having 1 to 20 carbon atoms such as a trifluoromethanesulfonate anion; a benzenesulfonate anion which has an alkyl group as a substituent or is unsubstituted, such as a toluenesulfonate anion or a benzenesulfonate anion; and the like.

As the anion represented by $An^-$ in the general formula (1), the anions according to the present invention are preferable. Among these, the aryl group having an electron-withdrawing substituent, the sulfonyl group having an electron-withdrawing substituent, and the anion containing a halogenated alkyl group or a halogeno group are more preferable. Specifically, the anions represented by the general formulae (16) to (19) are preferable, the anions represented by the general formula (16), the general formula (18), and the general formula (19) are more preferable, the anions represented by the general formula (16) and the general formula (18) are even more preferable, and the anion represented by the general formula (16) is particularly preferable.

As the anion represented by An⁻ in the general formula (1), among the specific examples, the following anions are preferable.

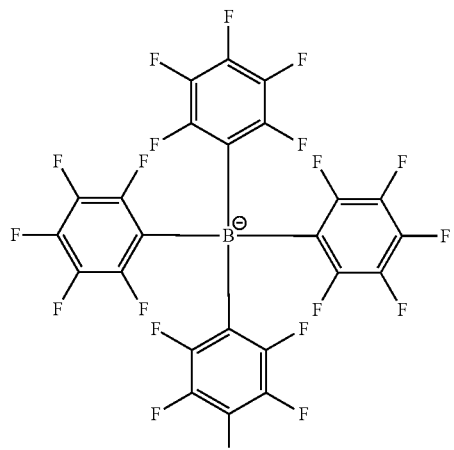

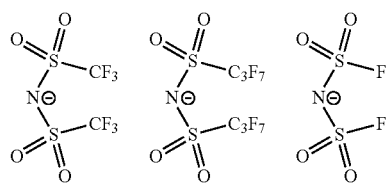

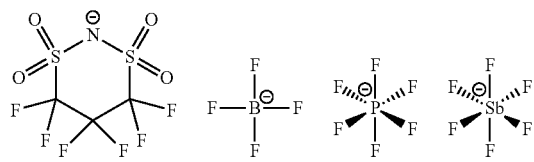

Among the specific examples, the following anions are more preferable.

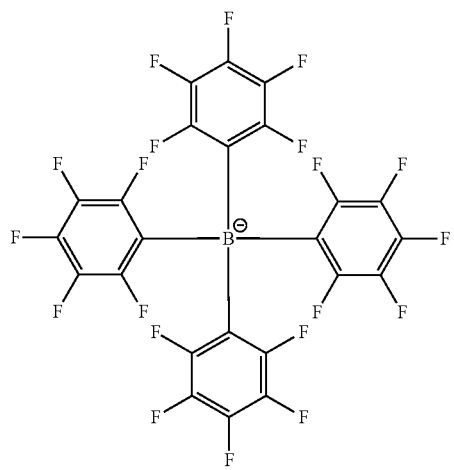

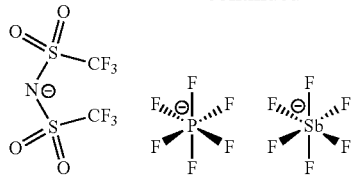

Among the specific examples, a tetrakis(pentafluorophenyl)boron (IV) anion and a bis(trifluoromethanesulfonyl) imide anion are even more preferable, and the tetrakis (pentafluorophenyl)boron (IV) anion is particularly preferable.

Preferred Specific Examples of Quencher of Present Invention

As one of the preferred specific examples of the quencher of the present invention, a quencher formed of a compound represented by the following general formula (1') can be exemplified.

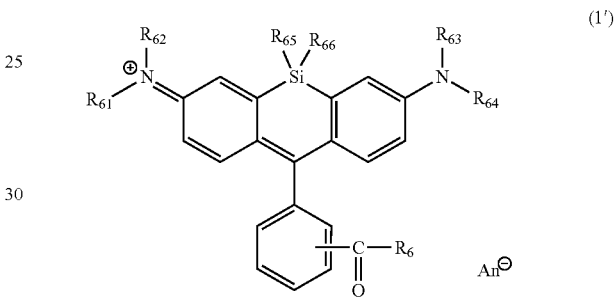

(1')

(In the formula, $R_{61}$ and $R_{62}$ each independently represent an alkyl group having 1 to 12 carbon atoms or a phenyl group which has an alkyl group having 1 to 6 carbon atoms or is unsubstituted, $R_{63}$ and $R_{64}$ each independently represent an alkyl group having 1 to 6 carbon atoms, a phenyl group, or a phenylalkyl group having 7 to 9 carbon atoms, $R_{65}$ and $R_{66}$ each independently represent an alkyl group having 1 to 6 carbon atoms or a phenyl group, and $R_6$ and An⁻ are the same as $R_6$ and An⁻ described above.)

Examples of the alkyl group having 1 to 12 carbon atoms represented by $R_{61}$ and $R_{62}$ in the general formula (1') are the same as the examples of the alkyl group having 1 to 12 carbon atoms represented by $R_{10}$ in $A_3$ in the general formulae (2) and (2-4), and preferred examples thereof are also the same.

The phenyl group which has an alkyl group having 1 to 6 carbon atoms represented by $R_{61}$ and $R_{62}$ in the general formula (1') generally has 1 to 5 alkyl groups, preferably has 1 to 3 alkyl groups, and more preferably has 1 alkyl group. Among the alkyl groups having 1 to 6 carbon atoms, an alkyl group having 1 to 3 carbon atoms is preferable. Specific examples of the alkyl groups having 1 to 6 carbon atoms are the same as the specific examples of the alkyl group having 1 to 6 carbon atoms represented by $R_{32}$ and $R_{33}$ in the general formula (1). Among these, a methyl group, an ethyl group, a n-propyl group, and an isopropyl group are preferable.

As the phenyl group which has an alkyl group having 1 to 6 carbon atoms represented by $R_{61}$ and $R_{62}$ in the general formula (1'), a phenyl group having an alkyl group having 1 to 3 carbon atoms is preferable. Specific examples thereof include an o-tolyl group, a m-tolyl group, a p-tolyl group, an o-ethylphenyl group, a m-ethylphenyl group, a p-ethylphenyl group, an o-propylphenyl group, a m-propylphenyl group, a p-propylphenyl group, an o-butylphenyl group, a m-butylphenyl group, a p-butylphenyl group, an o-pentylphenyl group, a m-pentylphenyl group, a p-pentylphenyl group, an o-hexylphenyl group, a m-hexylphenyl group, a p-hexylphenyl group, a 2,3-xylyl group, a 2,4-xylyl group, a 2,5-xylyl group, a 2,6-xylyl group, a 3,4-xylyl group, a 3,5-xylyl group, a mesityl group, and the like. Among these, the p-tolyl group, the p-ethylphenyl group, the p-propylphenyl group, the p-butylphenyl group, the p-pentylphenyl group, the p-hexylphenyl group, the 2,4-xylyl group, the 2,6-xylyl group, the 3,5-xylyl group, and the mesityl group are preferable, and the p-tolyl group, the p-ethylphenyl group, and the p-propylphenyl group are more preferable. It should be noted that the alkyl group in the specific examples is not limited to a normal-isomer and includes all the branched alkyl groups such as a sec-isomer, a tert-isomer, an iso-isomer, and a neo-isomer. Among these, the normal-isomer and the iso-isomer are preferable, and the normal-isomer is more preferable.

As $R_{61}$ and $R_{62}$ in the general formula (1'), an alkyl group having 1 to 6 carbon atoms and a phenyl group which has an alkyl group having 1 to 3 carbon atoms or is unsubstituted are preferable, and an alkyl group having 1 to 4 carbon atoms is more preferable. Specifically, examples thereof include a methyl group, an ethyl group, a propyl group, a butyl group, a pentyl group, a hexyl group, a phenyl group, a p-tolyl group, a p-ethylphenyl group, a p-propylphenyl group, a p-butylphenyl group, a p-pentylphenyl group, a p-hexylphenyl group, a 2,4-xylyl group, a 2,6-xylyl group, a 3,5-xylyl group, a mesityl group, and the like. It should be noted that the alkyl group in the specific examples is not limited to a normal-isomer and includes all the branched alkyl groups such as a sec-isomer, a tert-isomer, an iso-isomer, and a neo-isomer.

Among these, the methyl group, the ethyl group, the n-propyl group, the isopropyl group, the n-butyl group, the isobutyl group, the sec-butyl group, the tert-butyl group, the n-pentyl group, the isopentyl group, the n-hexyl group, the phenyl group, the p-tolyl group, the p-ethylphenyl group, the p-(n-propyl)phenyl group, and the p-isopropylphenyl group, are preferable, the methyl group, the ethyl group, the n-propyl group, the isopropyl group, the n-butyl group, the isobutyl group, the sec-butyl group, and the tert-butyl group are more preferable, and the methyl group and the ethyl group are particularly preferable.

Examples of the alkyl group having 1 to 6 carbon atoms represented by $R_{63}$ and $R_{64}$ in the general formula (1') are the same as the examples of the alkyl group having 1 to 6 carbon atoms represented by $R_{32}$ and $R_{33}$ in the general formula (1), and preferred examples thereof are also the same.

Specific examples of the phenylalkyl group having 7 to 9 carbon atoms represented by $R_{63}$ and $R_{64}$ in the general formula (1') include a benzyl group, a phenethyl group, a 1-phenylethyl group, a hydrocinnamyl group, a 2-phenylpropyl group, a 1-phenylpropyl group, a cumyl group, and the like. Among these, the benzyl group, the phenethyl group, and the hydrocinnamyl group are preferable, and the benzyl group is more preferable.

As $R_{63}$ and $R_{64}$ in the general formula (1'), an alkyl group having 1 to 4 carbon atoms is preferable.

Specifically, examples of $R_{63}$ and $R_{64}$ in the general formula (1') include a methyl group, an ethyl group, a n-propyl group, an isopropyl group, a n-butyl group, an isobutyl group, a sec-butyl group, a tert-butyl group, a n-pentyl group, an isopentyl group, a n-hexyl group, a phenyl group, a benzyl group, a phenethyl group, a hydrocinnamyl group, and the like. Among these, the methyl group, the ethyl group, the n-propyl group, the isopropyl group, the n-butyl group, the isobutyl group, the sec-butyl group, the tert-butyl group, the phenyl group, and the benzyl group are preferable, the methyl group, the ethyl group, the n-propyl group, the isopropyl group, the n-butyl group, the isobutyl group, the sec-butyl group, and the tert-butyl group are more preferable, and the methyl group and the ethyl group are particularly preferable.

Examples of the alkyl group having 1 to 6 carbon atoms represented by $R_{65}$ and $R_{66}$ in the general formula (1') are the same as the examples of the alkyl group having 1 to 6 carbon atoms represented by $R_{32}$ and $R_{33}$ in the general formula (1), and preferred examples thereof are also the same.

As $R_{65}$ and $R_{66}$ in the general formula (1'), an alkyl group having 1 to 4 carbon atoms is preferable.

Specifically, examples of $R_{65}$ and $R_{66}$ in the general formula (1') include a methyl group, an ethyl group, a n-propyl group, an isopropyl group, a n-butyl group, an isobutyl group, a sec-butyl group, a tert-butyl group, a n-pentyl group, an isopentyl group, a n-hexyl group, a phenyl group, and the like. Among these, the methyl group, the ethyl group, the n-propyl group, the isopropyl group, the n-butyl group, the isobutyl group, the sec-butyl group, and the tert-butyl group are preferable, and the methyl group and the ethyl group are more preferable.

Preferred specific examples of the compound represented by the general formula (1') include a compound represented by the following general formula (1'-1).

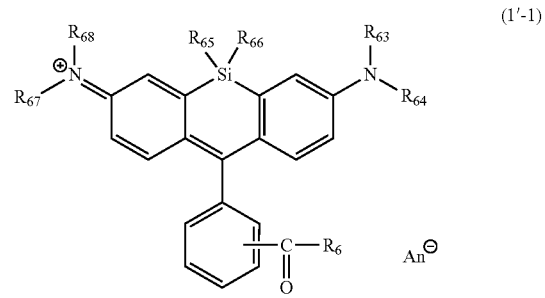

(1'-1)

(In the formula, $R_{67}$ and $R_{68}$ each independently represent an alkyl group having 1 to 6 carbon atoms or a phenyl group which has an alkyl group having 1 to 3 carbon atoms or is unsubstituted, and $R_6$, $R_{63}$ to $R_{66}$, and $An^-$ are the same as $R_6$, $R_{63}$ to $R_{66}$, and $An^-$ described above.)

Examples of the alkyl group having 1 to 6 carbon atoms represented by $R_{67}$ and $R_{68}$ in the general formula (1'-1) are the same as the examples of the alkyl group having 1 to 6 carbon atoms represented by $R_{32}$ and $R_{33}$ in the general formula (1), and preferred examples thereof are also the same.

The phenyl group which has an alkyl group having 1 to 3 carbon atoms represented by $R_{67}$ and $R_{68}$ in the general formula (1'-1) generally has 1 to 5 alkyl groups, preferably has 1 to 3 alkyl groups, and more preferably has 1 alkyl group. Examples of the alkyl group include a methyl group, an ethyl group, a n-propyl group, and an isopropyl group.

Specifically, examples of the phenyl group which has an alkyl group having 1 to 3 carbon atoms represented by $R_{67}$ and $R_{68}$ in the general formula (1'-1) include an o-tolyl group, a m-tolyl group, a p-tolyl group, an o-ethylphenyl group, a m-ethylphenyl group, a p-ethylphenyl group, an o-(n-propyl)phenyl group, an o-isopropylphenyl group, a m-(n-propyl)phenyl group, a m-isopropylphenyl group, a p-(n-propyl)phenyl group, a p-isopropylphenyl group, a 2,3-xylyl group, a 2,4-xylyl group, a 2,5-xylyl group, a 2,6-xylyl group, a 3,4-xylyl group, a 3,5-xylyl group, a mesityl group, and the like. Among these, the p-tolyl group, the p-ethylphenyl group, the p-(n-propyl)phenyl group, the p-isopropylphenyl group, the 2,4-xylyl group, the 2,6-xylyl group, the 3,5-xylyl group, and the mesityl group are preferable, and the p-tolyl group, the p-ethylphenyl group, the p-(n-propyl)phenyl group, and the p-isopropylphenyl group are more preferable.

As $R_{67}$ and $R_{68}$ in the general formula (1'-1), an alkyl group having 1 to 4 carbon atoms is preferable.

Specifically, examples of $R_{67}$ and $R_{68}$ in the general formula (1'-1) include a methyl group, an ethyl group, a n-propyl group, an isopropyl group, a n-butyl group, an isobutyl group, a sec-butyl group, a tert-butyl group, a n-pentyl group, an isopentyl group, a n-hexyl group, a phenyl group, a p-tolyl group, a p-ethylphenyl group, a p-(n-propyl)phenyl group, a p-isopropylphenyl group, a 2,4-xylyl group, a 2,6-xylyl group, a 3,5-xylyl group, a mesityl group, and the like. Among these, the methyl group, the ethyl group, the n-propyl group, the isopropyl group, the n-butyl group, the isobutyl group, the sec-butyl group, the tert-butyl group, the n-pentyl group, the isopentyl group, the n-hexyl group, the phenyl group, the p-tolyl group, the p-ethylphenyl group, the p-(n-propyl)phenyl group, and the p-isopropylphenyl group are preferable, the methyl group, the ethyl group, the n-propyl group, the isopropyl group, the n-butyl group, the isobutyl group, the sec-butyl group, and the tert-butyl group are more preferable, and the methyl group and the ethyl group are particularly preferable.

Preferred specific examples of the compound represented by the general formula (1'-1) include a compound represented by the following general formula (1'-2).

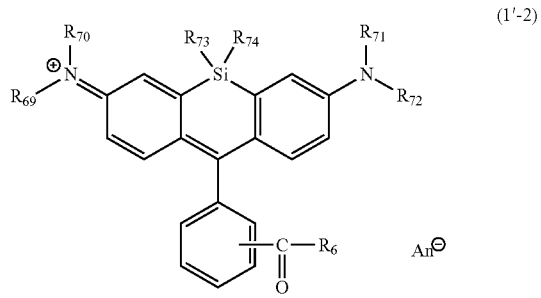

(1'-2)

(In the formula, $R_{69}$ to $R_{74}$ each independently represent an alkyl group having 1 to 4 carbon atoms, and $R_6$ and $An^-$ are the same as $R_6$ and $An^-$ described above.)

Specifically, examples of the alkyl group having 1 to 4 carbon atoms represented by $R_{69}$ to $R_{74}$ in the general formula (1'-2) include a methyl group, an ethyl group, a n-propyl group, an isopropyl group, a n-butyl group, an isobutyl group, a sec-butyl group, a tert-butyl group, and the like. Among these, the methyl group and the ethyl group are preferable.

$R_{69}$ to $R_{72}$ in the general formula (1'-2) may be the same as or different from each other. $R_{69}$ and $R_{70}$ and $R_{71}$ and $R_{72}$ are preferably the same as each other respectively. It is more preferable that all of $R_{69}$ to $R_{72}$ are the same as each other.

$R_{73}$ and $R_{74}$ in the general formula (1'-2) may be the same as or different from each other, but it is preferable that $R_{73}$ and $R_{74}$ are the same as each other.

Among the compounds represented by the general formula (1'-2), a compound represented by a general formula (3-5), which will be described later, can be exemplified as a preferred specific example.

In addition, as one of the preferred specific examples of the quencher of the present invention, a quencher formed of a compound represented by the following general formula (3) can be exemplified.

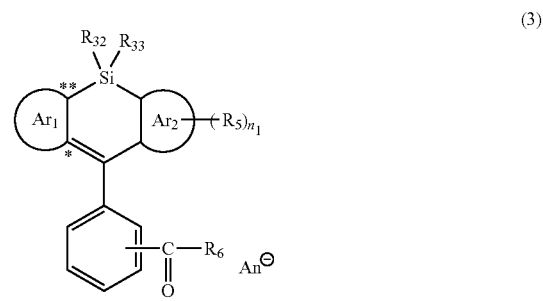

(3)

(In the formula, * and ** each represent a position of bonding to the ring structures represented by any of the general formulae (1-1) to (1-7), and $n_1$ pieces of $R_5$, $R_6$, $R_{32}$, $R_{33}$, $An^-$, $Ar_1$, $Ar_2$, and $n_1$ are the same as $n_1$ pieces of $R_5$, $R_6$, $R_{32}$, $R_{33}$, $An^-$, $Ar_1$, $Ar_2$, and $n_1$ in the general formula (1). Here, at least one of $R_2$, $R_3$, $n_1$ pieces of $R_5$, $R_6$, and $R_{31}$ is a group having a polymerizable unsaturated group.)

The compound represented by the general formula (3) is a compound in which at least one of $R_2$, $R_3$, $n_1$ pieces of $R_5$, $R_6$, and $R_{31}$ in the formula has a group having a polymerizable unsaturated group. As such a compound, a compound having 1 or 2 groups having a polymerizable unsaturated group is preferable, and a compound having 1 group having a polymerizable unsaturated group is more preferable. Specifically, a compound in which at least one of $R_2$, $R_3$, $n_1$ pieces of $R_5$, $R_6$, and $R_{31}$ in the formula has a group having a polymerizable unsaturated group or a compound in which any one of $R_2$, $R_3$, and $R_{31}$ in the formula and at least one of $n_1$ pieces of $R_5$ in the formula have a group having a polymerizable unsaturated group is preferable, and a compound in which $R_6$ has a group having a polymerizable unsaturated group is more preferable. It should be noted that the "compound in which at least one of $R_2$, $R_3$, $n_1$ pieces of $R_5$, $R_6$, and $R_{31}$ has a group having a polymerizable unsaturated group" is not limited as long as one of $n_1$ pieces of $R_5$ has a group having a polymerizable unsaturated group. For example, such a compound includes a compound in which one $R_5$ is a group having a polymerizable unsaturated group and the remaining ($n_1$–1) pieces of $R_5$ are functional groups other than the group having a polymerizable unsaturated group.

The quencher formed of the compound represented by the general formula (3) exerts a quenching effect on fluorescent compounds. In addition, the quencher less undergoes heating-induced fading, and brings about a high heat resistant effect. Furthermore, a quencher formed of a polymer having a monomer unit derived from the compound represented by the general formula (3) has high elution resistance and weather fastness.

Among the compounds represented by the general formula (3), a compound represented by the following general formula (3-1) can be exemplified as a preferred specific example.

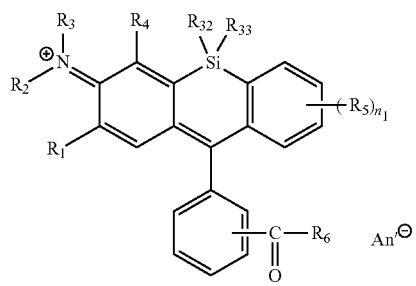

(3-1)

{In the formula, An'− represents an aryl group having an electron-withdrawing substituent, a sulfonyl group having an electron-withdrawing substituent, an anion containing a halogenated alkyl group or a halogeno group, a halogen oxoacid anion, or a sulfonate anion, $R_1$ to $R_4$ are the same as $R_1$ to $R_4$ in the general formula (1-1), and $n_1$ pieces of $R_5$, $R_6$, $R_{32}$, $R_{33}$, and $n_1$ are the same as $n_1$ pieces of $R_5$, $R_6$, $R_{32}$, $R_{33}$, and $n_1$ in the general formula (1). Here, at least one of $R_2$, $R_3$, $n_1$ pieces of $R_5$, and $R_6$ is a group having a polymerizable unsaturated group.)

Examples of the aryl group having an electron-withdrawing substituent, the sulfonyl group having an electron-withdrawing substituent, the anion containing a halogenated alkyl group or a halogeno group, or the halogen oxoacid anion, the sulfonate anion represented by An'− in the general formula (3-1) are the same as the examples of the anions according to the present invention in the general formula (1), and preferred examples thereof are also the same.

Among the compounds represented by the general formula (3-1), a compound represented by the following general formula (3-2) can be exemplified as a preferred specific example.

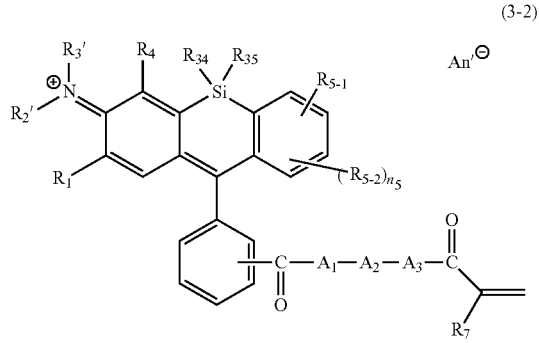

(3-2)

(In the formula, $R_2'$ and $R_3'$ each independently represent an alkyl group having 1 to 12 carbon atoms or a phenyl group which has an alkyl group having 1 to 6 carbon atoms or is unsubstituted, $R_1$ and $R_2'$ may form an alkylene group having 2 to 4 carbon atoms together, $R_3'$ and $R_4$ may form an alkylene group having 2 to 4 carbon atoms together, $R_{5-1}$ represents an amino group having an alkyl group having 1 to 6 carbon atoms, a phenyl group, or a phenylalkyl group having 7 to 9 carbon atoms, $n_5$ pieces of $R_{5-2}$ each independently represent a halogeno group, an alkyl group having 1 to 20 carbon atoms, an alkoxy group having 1 to 20 carbon atoms, an alkylthio group having 1 to 20 carbon atoms, a hydroxy group, an aryl group having 6 to 14 carbon atoms, an aryloxy group having 6 to 14 carbon atoms, or an arylalkyl group having 7 to 20 carbon atoms, $n_5$ represents an integer of 0 to 3, and $R_1$, $R_4$, $R_7$, $R_{34}$, $R_{35}$, $A_1$ to $A_3$, and An'− are the same as $R_1$, $R_4$, $R_7$, $R_{34}$, $R_{35}$, $A_1$ to $A_3$, and An'− described above.)

Examples of the alkyl group having 1 to 12 carbon atoms represented by $R_2'$ and $R_3'$ in the general formula (3-2) are the same as the examples of the alkyl group having 1 to 12 carbon atoms represented by $R_{10}$ in $A_3$ in the general formulae (2) and (2-4), and preferred examples thereof are also the same.

Examples of the phenyl group which has an alkyl group having 1 to 6 carbon atoms represented by $R_2'$ and $R_3'$ in the general formula (3-2) are the same as the examples of the phenyl group which has an alkyl group having 1 to 6 carbon atoms represented by $R_{61}$ and $R_{62}$ in the general formula (1'), and preferred examples thereof are also the same.

In a case where $R_1$ and $R_2'$ in the general formula (3-2) form an alkylene group having 2 to 4 carbon atoms together and in a case where $R_3'$ and $R_4$ in the general formula (3-2) form an alkylene group having 2 to 4 carbon atoms together, examples of the alkylene group having 2 to 4 carbon atoms are the same as the examples of the alkylene group having 2 to 4 carbon atoms that are exemplified above in a case where $R_1$ and $R_2$ in the general formula (1-1) form an alkylene group having 2 to 4 carbon atoms together and in a case where $R_3$ and $R_4$ in the general formula (1-1) form an alkylene group having 2 to 4 carbon atoms together, and preferred examples thereof are also the same.

In a case where $R_1$ and $R_2'$ in the general formula (3-2) form an alkylene group having 2 to 4 carbon atoms together and/or in a case where $R_3'$ and $R_4$ in the general formula (3-2) form an alkylene group having 2 to 4 carbon atoms together, specific examples of the resulting structure include the following structures.

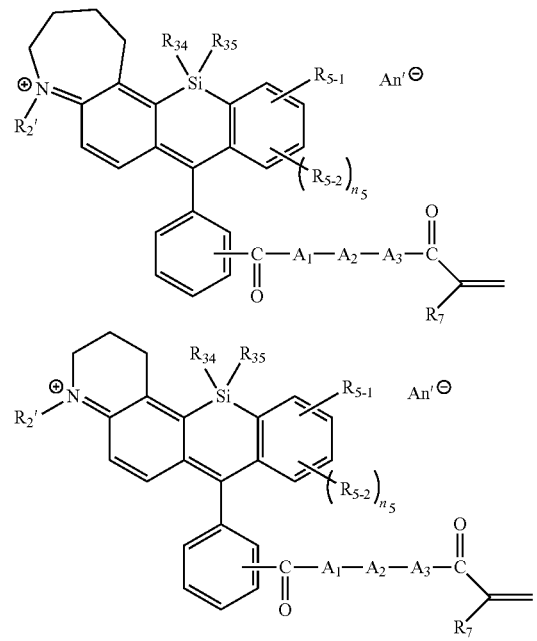

-continued
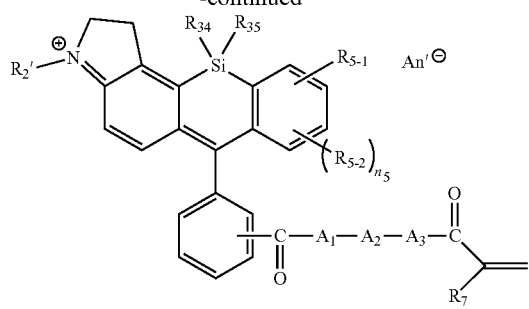
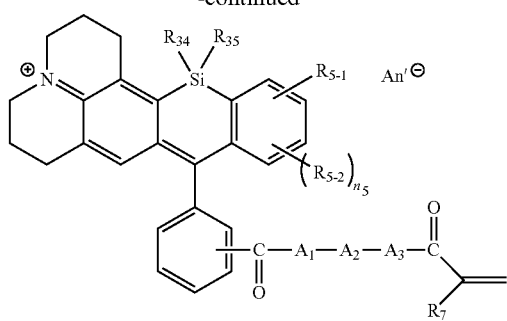
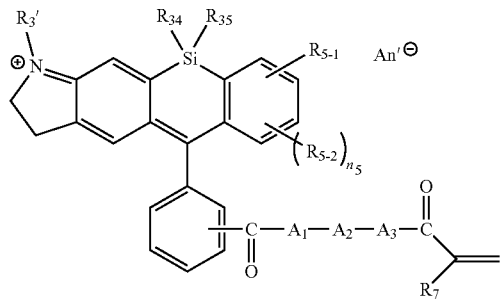
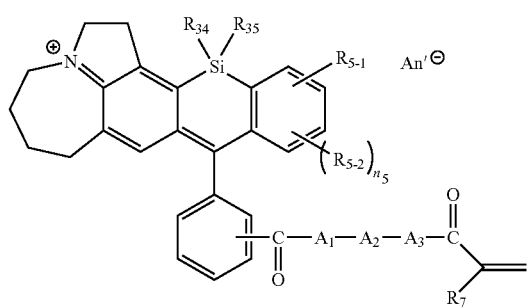
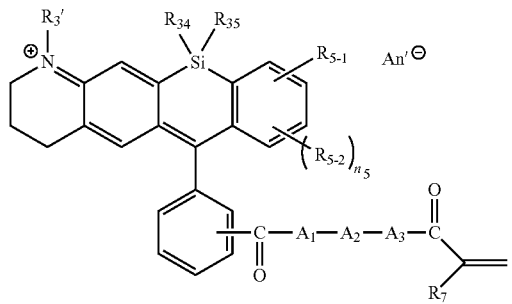
(In the formulae, $R_2'$, $R_3'$, $R_{5-1}$, $n_5$ pieces of $R_{5-2}$, $R_7$, $R_{34}$, $R_{35}$, $A_1$ to $A_3$, $n_5$, and $An'^-$ are the same as $R_2'$, $R_3'$, $R_{5-1}$, $n_5$ pieces of $R_{5-2}$, $R_7$, $R_{34}$, $R_{35}$, $A_1$ to $A_3$, $n_5$, and $An'^-$ described above.)
Among the specific examples, the following structures are preferable.
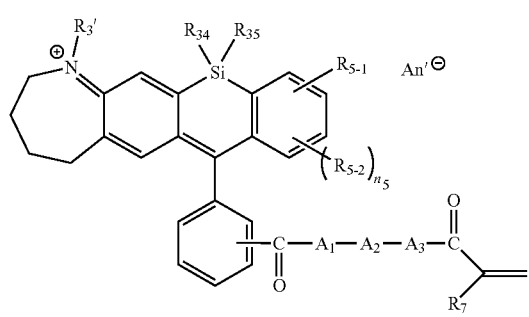
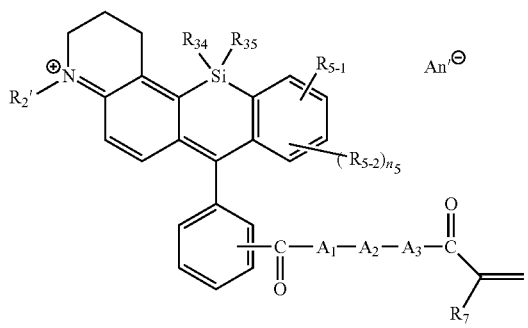
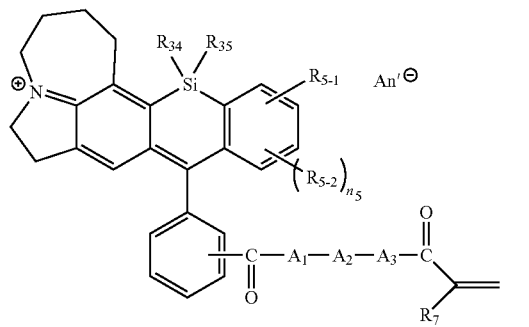
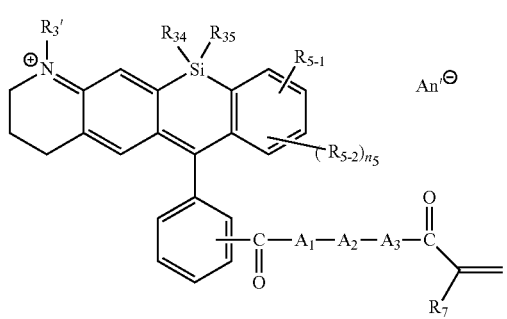

-continued

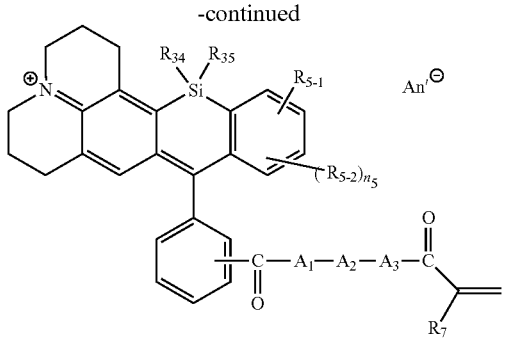

(In the formulae, $R_2'$, $R_3'$, $R_{5-1}$, $n_5$ pieces of $R_{5-2}$, $R_7$, $R_{34}$, $R_{35}$, $A_1$ to $A_3$, $n_5$, and $An'^-$ are the same as $R_2'$, $R_3'$, $R_{5-1}$, $n_5$ pieces of $R_{5-2}$, $R_7$, $R_{34}$, $R_{35}$, $A_1$ to $A_3$, $n_5$, and $An'^-$ described above.)

Among the specific examples, the following structure is preferable.

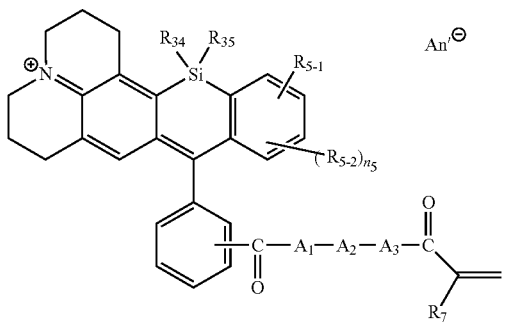

(In the formula, $R_{5-1}$, $n_5$ pieces of $R_{5-2}$, $R_7$, $R_{34}$, $R_{35}$, $A_1$ to $A_3$, $n_5$, and $An'^-$ are the same as $R_{5-1}$, $n_5$ pieces of $R_{5-2}$, $R_7$, $R_{34}$, $R_{35}$, $A_1$ to $A_3$, $n_5$, and $An'^-$ described above.)

As $R_2'$ in the general formula (3-2), an alkyl group having 1 to 6 carbon atoms, a phenyl group which has an alkyl group having 1 to 3 carbon atoms or is unsubstituted, and a group forming a linear alkylene group having 2 to 4 carbon atoms together with $R_1$ are preferable. Specifically, examples thereof include a methyl group, an ethyl group, a propyl group, a butyl group, a pentyl group, a hexyl group, a phenyl group, a p-tolyl group, a p-ethylphenyl group, a p-propylphenyl group, a p-butylphenyl group, a p-pentylphenyl group, a p-hexylphenyl group, a 2,4-xylyl group, a 2,6-xylyl group, a 3,5-xylyl group, a mesityl group, a group forming an ethylene group together with $R_1$, a group forming a trimethylene group together with $R_1$, a group forming a tetramethylene group together with $R_1$, and the like. Among these, the methyl group, the ethyl group, the propyl group, the butyl group, the pentyl group, the hexyl group, the phenyl group, the p-tolyl group, the p-ethylphenyl group, the p-propylphenyl group, and the group forming a trimethylene group together with $R_1$ are preferable. It should be noted that the alkyl group in the specific examples is not limited to a normal-isomer, and includes all the branched alkyl groups such as a sec-isomer, a tert-isomer, an iso-isomer, and a neo-isomer.

Among these, the alkyl group having 1 to 6 carbon atoms and the phenyl group which has an alkyl group having 1 to 3 carbon atoms or is unsubstituted are preferable, and the alkyl group having 1 to 4 carbon atoms is particularly preferable. Specifically, a methyl group, an ethyl group, a n-propyl group, an isopropyl group, a n-butyl group, an isobutyl group, a sec-butyl group, a tert-butyl group, a n-pentyl group, an isopentyl group, a n-hexyl group, a phenyl group, a p-tolyl group, a p-ethylphenyl group, a p-(n-propyl)phenyl group, and a p-isopropylphenyl group are preferable, the methyl group, the ethyl group, the n-propyl group, the isopropyl group, the n-butyl group, the isobutyl group, the sec-butyl group, and the tert-butyl group are more preferable, and the methyl group and the ethyl group are particularly preferable.

As $R_3'$ in the general formula (3-2), an alkyl group having 1 to 6 carbon atoms, a phenyl group which has an alkyl group having 1 to 3 carbon atoms and is unsubstituted, and a group forming a linear alkylene group having 2 to 4 carbon atoms together with $R_4$ are preferable. Specifically, examples thereof include a methyl group, an ethyl group, a propyl group, a butyl group, a pentyl group, a hexyl group, a phenyl group, a p-tolyl group, a p-ethylphenyl group, a p-propylphenyl group, a p-butylphenyl group, a p-pentylphenyl group, a p-hexylphenyl group, a 2,4-xylyl group, a 2,6-xylyl group, a 3,5-xylyl group, a mesityl group, a group forming an ethylene group together with $R_4$, a group forming a trimethylene group together with $R_4$, a group forming a tetramethylene group together with $R_4$, and the like. Among these, the methyl group, the ethyl group, the propyl group, the butyl group, the pentyl group, the hexyl group, the phenyl group, the p-tolyl group, the p-ethylphenyl group, the p-propylphenyl group, and the group forming a trimethylene group together with $R_4$ are preferable. It should be noted that the alkyl group in the specific examples is not limited to a normal-isomer, and includes all the branched alkyl groups such as a sec-isomer, a tert-isomer, an iso-isomer, and a neo-isomer.

Among these, the alkyl group having 1 to 6 carbon atoms and the phenyl group which has an alkyl group having 1 to 3 carbon atoms or is unsubstituted are more preferable, and the alkyl group having 1 to 4 carbon atoms is even more preferable. Specifically, a methyl group, an ethyl group, a n-propyl group, an isopropyl group, a n-butyl group, an isobutyl group, a sec-butyl group, a tert-butyl group, a n-pentyl group, an isopentyl group, a n-hexyl group, a phenyl group, a p-tolyl group, a p-ethylphenyl group, a p-(n-propyl)phenyl group, and a p-isopropylphenyl group are preferable, the methyl group, the ethyl group, the n-propyl group, the isopropyl group, the n-butyl group, the isobutyl group, the sec-butyl group, and the tert-butyl group are more preferable, and the methyl group and the ethyl group are particularly preferable.

Specifically, examples of the amino group having an alkyl group having 1 to 6 carbon atoms, a phenyl group, or a phenylalkyl group having 7 to 9 carbon atoms represented by $R_{5-1}$ in the general formula (3-2) include a methylamino group, an ethylamino group, a n-propylamino group, an isopropylamino group, a n-butylamino group, an isobutylamino group, a sec-butylamino group, a tert-butylamino group, a n-pentylamino group, an isopentylamino group, a n-hexylamino group, a phenylamino group, a benzylamino group, a dimethylamino group, a diethylamino group, a di-n-propylamino group, a diisopropylamino group, a di-n-butylamino group, a diisobutylamino group, a di-sec-butylamino group, a di-tert-butylamino group, a di-n-pentylamino group, a diisopentylamino group, a di-n-hexylamino group, a diphenylamino group, a dibenzylamino group, and the like.

Among these, an amino group having an alkyl group having 1 to 4 carbon atoms is preferable, and an amino group having two alkyl groups each having 1 to 4 carbon atoms is more preferable. Specifically, a methylamino group, a ethylamino group, a n-propylamino group, an isopropylamino group, a n-butylamino group, an isobutylamino group, a sec-butylamino group, a tert-butylamino group, a dimethylamino group, a diethylamino group, a di-n-propylamino group, a diisopropylamino group, a di-n-butylamino group, a diisobutylamino group, a di-sec-butylamino group, and a di-tert-butylamino group are preferable, the dimethylamino group, the diethylamino group, the di-n-propylamino group, the diisopropylamino group, the di-n-butylamino group, the diisobutylamino group, the di-sec-butylamino group, and the di-tert-butylamino group are more preferable, and the dimethylamino group and the diethylamino group are even more preferable.

Examples of the halogeno group, the alkyl group having 1 to 20 carbon atoms, the alkoxy group having 1 to 20 carbon atoms, the alkylthio group having 1 to 20 carbon atoms, the hydroxy group, the aryl group having 6 to 14 carbon atoms, the aryloxy group having 6 to 14 carbon atoms, and the arylalkyl group having 7 to 20 carbon atoms represented by $R_{5-2}$ in the general formula (3-2) are the same as the examples of those represented by $R_5$ in the general formula (1), and preferred examples thereof are also the same.

As $R_{5-2}$ in the general formula (3-2), a halogeno group, an alkyl group having 1 to 12 carbon atoms, an alkoxy group having 1 to 12 carbon atoms, an alkylthio group having 1 to 12 carbon atoms, a hydroxy group, an aryl group having 6 to 14 carbon atoms, an aryloxy group having 6 to 14 carbon atoms, and an arylalkyl group having 7 to 20 carbon atoms are preferable, the halogeno group, the alkyl group having 1 to 12 carbon atoms, the alkoxy group having 1 to 12 carbon atoms, the alkylthio group having 1 to 12 carbon atoms, the hydroxy group, a phenyl group, a phenoxy group, and a phenylalkyl group having 1 to 12 carbon atoms are more preferable, and the halogeno group, the alkyl group having 1 to 6 carbon atoms, the alkoxy group having 1 to 6 carbon atoms, the alkylthio group having 1 to 6 carbon atoms, the hydroxy group, the phenyl group, the phenoxy group, and the phenylalkyl group having 7 to 9 carbon atoms are even more preferable. Specifically, a fluoro group, a methyl group, an ethyl group, a n-propyl group, an isopropyl group, a n-butyl group, an isobutyl group, a sec-butyl group, a tert-butyl group, a n-pentyl group, an isopentyl group, a n-hexyl group, a methoxy group, an ethoxy group, a n-propoxy group, an isopropoxy group, a n-butoxy group, an isobutoxy group, a sec-butoxy group, a tert-butoxy group, a methylthio group, an ethylthio group, a n-propylthio group, an isopropylthio group, a n-butylthio group, an isobutylthio group, a sec-butylthio group, a tert-butylthio group, a hydroxy group, a phenyl group, a phenoxy group, a benzyl group, a phenethyl group, a 1-phenylethyl group, a hydrocinnamyl group, a 2-phenylpropyl group, a 1-phenylpropyl group, and a cumyl group are preferable, the fluoro group, the methyl group, the ethyl group, the n-propyl group, the isopropyl group, the n-butyl group, the isobutyl group, the sec-butyl group, the tert-butyl group, the methoxy group, the ethoxy group, the methylthio group, the ethylthio group, the hydroxy group, the phenyl group, the phenoxy group, the benzyl group, the phenethyl group, the hydrocinnamyl group, and the cumyl group are more preferable.

As $n_5$ in the general formula (3-2), 0 or 1 is preferable, and 0 is more preferable.

In the general formula (3-2), the bonding positions of $R_{5-1}$ and $n_5$ pieces of $R_{5-2}$ are represented as below.

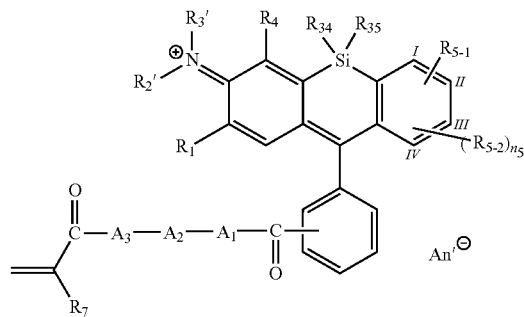

(In the formula, I to IV represent positions which can be substituted with $R_{5-1}$ and $R_{5-2}$, and $R_1$, $R_2'$, $R_3'$, $R_4$, $R_{5-1}$, $n_5$ pieces of $R_{5-2}$, $R_7$, $R_{34}$, $R_{35}$, $A_1$ to $A_3$, $n_5$, and $An'^-$ are the same as $R_1$, $R_2'$, $R_3'$, $R_4$, $R_{5-1}$, $n_5$ pieces of $R_{5-2}$, $R_7$, $R_{34}$, $R_{35}$, $A_1$ to $A_3$, $n_5$, and $An'^-$ described above.)

$R_{5-1}$ in the general formula (3-2) may be located at any of positions I to IV in the benzene ring, and is preferably located at position II or position III and more preferably located at position II. In addition, $n_5$ pieces of $R_{5-2}$ in the general formula (3-2) may be located at any of positions I to IV as long as $R_{5-2}$ is located at a position other than the bonding position of $R_{5-1}$. $R_{5-2}$ is preferably located at any of positions II to IV, and more preferably located at position II or position III.

Among the compounds represented by the general formula (3-2), a compound represented by the following general formula (3-3) can be exemplified as a preferred specific example.

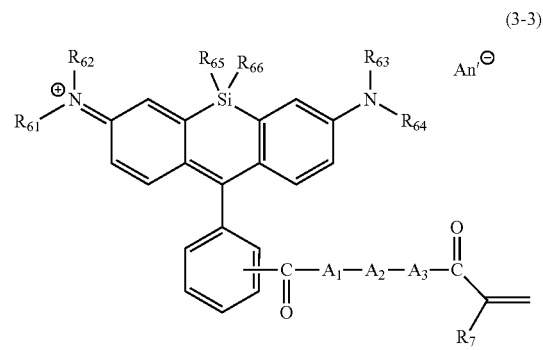

(3-3)

(In the formula, $R_7$, $R_{61}$ to $R_{66}$, $A_1$ to $A_3$, and $An'^-$ are the same as $R_7$, $R_{61}$ to $R_{66}$, $A_1$ to $A_3$, and $An'^-$ described above.)

Among the compounds represented by the general formula (3-3), a compound represented by the following general formula (3-4) can be exemplified as a preferred specific example.

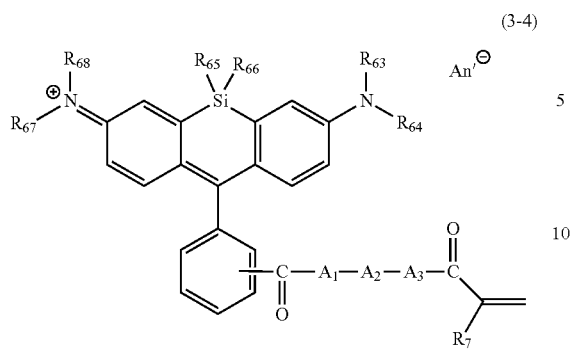

(3-4)

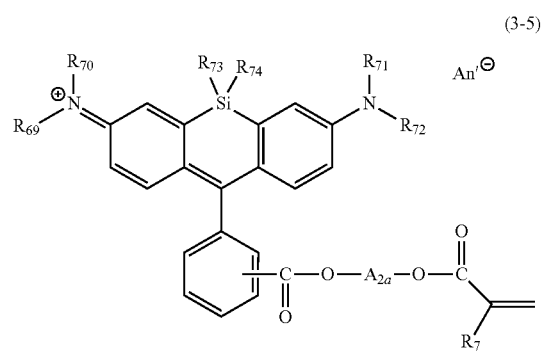

(3-5)

(In the formula, $R_7$, $R_{63}$ to $R_{68}$, $A_1$ to $A_3$, and $An'^{-}$ are the same as $R_7$, $R_{63}$ to $R_{68}$, $A_1$ to $A_3$, and $An'^{-}$ described above.)

Among the compounds represented by the general formula (3-4), a compound represented by the following general formula (3-5) can be exemplified as a preferred specific example.

(In the formula, $R_7$, $R_{69}$ to $R_{74}$, $A_{2a}$, and $An'^{-}$ are the same as $R_7$, $R_{69}$ to $R_{74}$, $A_{2a}$, and $An'^{-}$ described above.)

Examples of the preferred combination of $R_7$, $R_{69}$ to $R_{74}$, and $A_{2a}$ in the general formula (3-5) include combinations described in the following table.

| $R_{69}$ | $R_{70}$ | $R_{71}$ | $R_{72}$ | $R_{73}$ | $R_{74}$ | $R_7$ | $A_{2a}$ |
|---|---|---|---|---|---|---|---|
| Methyl group | Methyl group | Methyl group | Methyl group | Methyl group | Methyl group | Hydrogen atom or methyl group | Methylene group, ethylene group, trimethylene group, tetramethylene group, pentamethylene group or hexaniethylene group |
| Methyl group | Methyl group | Methyl group | Methyl group | Ethyl group | Ethyl group | | |
| Methyl group | Methyl group | Ethyl group | Ethyl group | Methyl group | Methyl group | | |
| Methyl group | Methyl group | Ethyl group | Ethyl group | Ethyl group | Ethyl group | | |
| Ethyl group | Ethyl group | Methyl group | Methyl group | Methyl group | Methyl group | | |
| Ethyl group | Ethyl group | Methyl group | Methyl group | Ethyl group | Ethyl group | | |
| Ethyl group | Ethyl group | Ethyl group | Ethyl group | Methyl group | Methyl group | | |
| Ethyl group | Ethyl group | Ethyl group | Ethyl group | Ethyl group | Ethyl group | | |
| n-Propyl group | n-Propyl group | n-Propyl group | n-Propyl group | Methyl group | Methyl group | | |
| n-Propyl group | n-Propyl group | n-Propyl group | n-Propyl group | Ethyl group | Ethyl group | | |
| Isopropyl group | Isopropyl group | Isopropyl group | Isopropyl group | Methyl group | Methyl group | | |
| Isopropyl group | Isopropyl group | Isopropyl group | Isopropyl group | Ethyl group | Ethyl group | | |
| n-Butyl group | n-Butyl group | n-Butyl group | n-Butyl group | Methyl group | Methyl group | | |
| n-Butyl group | n-Butyl group | n-Butyl group | n-Butyl group | Ethyl group | Ethyl group | | |
| Isobutyl group | Isobutyl group | Isobutyl group | Isobutyl group | Methyl group | Methyl group | | |
| Isobutyl group | Isobutyl group | Isobutyl group | Isobutyl group | Ethyl group | Ethyl group | | |
| sec-Butyl group | sec-Butyl group | sec-Butyl group | sec-Butyl group | Methyl group | Methyl group | | |
| sec-Butyl group | sec-Butyl group | sec-Butyl group | sec-Butyl group | Ethyl group | Ethyl group | | |
| tert-Butyl group | tert-Butyl group | tert-Butyl group | tert-Butyl group | Methyl group | Methyl group | | |
| tert-Butyl group | tert-Butyl group | tert-Butyl group | tert-Butyl group | Ethyl group | Ethyl group | | |

Among the preferred combinations, combinations 1 to 8 described in the following table can be exemplified as more preferred combinations. Among these, the combinations 1 to 4 are preferable, the combinations 3 and 4 are more preferable, and the combination 3 is particularly preferable.

| Combination | $R_{69}$ | $R_{70}$ | $R_{71}$ | $R_{72}$ | $R_{73}$ | $R_{74}$ | $R_7$ | $A_{2a}$ |
|---|---|---|---|---|---|---|---|---|
| 1 | Methyl group | Methyl group | Methyl group | Methyl group | Methyl group | Methyl group | Hydrogen atom | Ethylene group |
| 2 | Methyl group | Methyl group | Methyl group | Methyl group | Methyl group | Methyl group | Methyl group | |
| 3 | Ethyl group | Ethyl group | Ethyl group | Ethyl group | Methyl group | Methyl group | Hydrogen atom | |
| 4 | Ethyl group | Ethyl group | Ethyl group | Ethyl group | Methyl group | Methyl group | Methyl group | |
| 5 | Methyl group | Methyl group | Methyl group | Methyl group | Ethyl group | Ethyl group | Hydrogen atom | |
| 6 | Methyl group | Methyl group | Methyl group | Methyl group | Ethyl group | Ethyl group | Methyl group | |
| 7 | Ethyl group | Ethyl group | Ethyl group | Ethyl group | Ethyl group | Ethyl group | Hydrogen atom | |
| 8 | Ethyl group | Ethyl group | Ethyl group | Ethyl group | Ethyl group | Ethyl group | Methyl group | |

Examples of An'⁻ used together with the combination described in the table include a tetrakis(pentafluorophenyl)boron (IV) anion and a bis(trifluoromethanesulfonyl)imide anion. Between these, the tetrakis(pentafluorophenyl)boron (IV) anion is preferable.

Specifically, combinations of the combinations 1 to 8 with a tetrakis(pentafluorophenyl)boron (IV) anion or a bis(trifluoromethanesulfonyl)imide anion can be exemplified. Among these, combinations of the combinations 1 to 8 with the tetrakis(pentafluorophenyl)boron (IV) anion are preferable, combinations of the combinations 1 to 4 with the tetrakis(pentafluorophenyl)boron (IV) anion are more preferable, a combination of the combination 3 or 4 with the tetrakis(pentafluorophenyl)boron (IV) anion is even more preferable, and the combination of the combination 3 with the tetrakis(pentafluorophenyl)boron (IV) anion is particularly preferable.

The quencher of the present invention can quench the fluorescence emitted from fluorescent compounds.

The object to be quenched by the quencher of the present invention (hereinafter, simply described as compound to be quenched in some cases) is not limited as long as it is a fluorescent compound. Specifically, examples thereof include fluorescent compounds such as a compound having an anthracene skeleton, a compound having a xanthene skeleton, a compound having a coumarin skeleton, a compound having a stilbene skeleton, a compound having a naphthalimide skeleton, a compound having a perylene skeleton, a compound having a pyridine skeleton, a compound having an oxazine skeleton, a compound having a cyanine skeleton, a compound having an olefin skeleton, a compound having an azole skeleton, a thiazine-based dye, a phthalocyanine-based dye, an anthraquinone-based dye, an acridone-based dye, a quinacridone-based dye, an isoindolinone-based dye, a thioflavin-based dye, a thioindigo-based dye, a fluorene-based dye, an azo-based dye, a diphenylmethane-based dye, a triphenylmethane-based dye, a terphenyl-based dye, a chrysene-based dye, and a pyrene-based dye.

Examples of the compound having an anthracene skeleton include anthracene-based dyes such anthracene, 9,10-bis(phenylethynyl)anthracene, and 1-chloro-9,10-bis(phenylethynyl)anthracene, and the like.

Examples of the compound having a xanthene skeleton include rhodamine-based dyes such as rhodamine B, rhodamine 6G, rhodamine 3B, rhodamine 101, rhodamine 110, sulforhodamine 101, basic violet 11, and basic red 2; eosin-based dyes such as eosin Y and eosin B; fluorescein-based dyes such as fluorescein and fluorescein isothiocyanate; and the like.

Examples of the compound having a coumarin skeleton include coumarin-based dyes such as coumarin 6, coumarin 7, coumarin 153, coumarin 314, coumarin 334, coumarin 545, coumarin 545T, coumarin 545P, and 7-hydroxy-4-methyl coumarin, and the like.

Examples of the compound having a stilbene skeleton include stilbene-based dyes such as 1,4-bis(2-methylstyryl)benzene and trans-4,4'-diphenylstilbenzene, and the like.

Examples of the compound having a naphthalimide skeleton include naphthalimide-based dyes such as basic yellow 51, solvent yellow 11, solvent yellow 98, solvent yellow 116, solvent yellow 43, and solvent yellow 44, and the like.

Examples of the compound having a perylene skeleton include perylene-based dyes such as perylene, Lumogen yellow, Lumogen green, Lumogen orange, Lumogen pink, Lumogen red, solvent orange 5, and solvent green 5, and the like.

Examples of the compound having a pyridine skeleton include a pyridine-based dye such as 1-ethyl-2-[4-(p-dimethylaminophenyl)-1,3-butadienyl]-pyridinium-perchlorate (pyridine 1), an acridine-based dye, and the like.

Examples of the compound having an oxazine skeleton include an oxazine-based dye such as cresyl violet acetate, a dioxazine-based dye, and the like.

Examples of the compound having a cyanine skeleton include a cyanine-based dye such as 4-dicyanomethylene-2-methyl-6-(p-dimethylaminostyryl)-4H-pyran, and the like.

Examples of the compound having an olefin skeleton include an ethene-based dye, a butadiene-based dye, a hexatriene-based dye, and the like.

Examples of the compound having an azole skeleton include an oxazole-based dye, a thiazole-based dye, and the like.

Among the compounds to be quenched, the compounds having an anthracene skeleton, a xanthene skeleton, a coumarin skeleton, or an oxazine skeleton are preferable, the compound having a xanthene skeleton is more preferable, and a rhodamine-based dye is particularly preferable. Specifically, for example, anthracene, 9,10-bis(phenylethynyl)anthracene, 1-chloro-9,10-bis(phenylethynyl)anthracene, the rhodamine B, rhodamine 6G, rhodamine 3B, rhodamine 101, rhodamine 110, sulforhodamine, basic violet 11, basic red 2, eosin Y, eosin B, fluorescein, fluorescein isothiocyanate, coumarin 6, coumarin 7, coumarin 153, coumarin 314, coumarin 334, coumarin 545, coumarin 545T, coumarin 545P, and 7-hydroxy-4-methyl coumarin are preferable, the rhodamine B, the rhodamine 6G, the rhodamine 3B, the rhodamine 101, the rhodamine 110, the sulforhodamine, the basic violet 11, the basic red 2, the eosin Y, the eosin B, the fluorescein, and the fluorescein isothiocyanate are more preferable, and the rhodamine B, the rhodamine 6G, the rhodamine 3B, the rhodamine 101, the rhodamine 110, the sulforhodamine, the basic violet 11, and the basic red 2 are particularly preferable.

In addition, the compound to be quenched also contains the compound to be quenched that has a polymerizable group, that is, a fluorescent monomer having a polymerizable unsaturated group (hereinafter, simply described as polymerizable compound to be quenched in some cases) and a polymer thereof.

Examples of the polymerizable unsaturated group in the polymerizable compound to be quenched include an acryloyl group, a methacryloyl group, a vinyl aryl group, a vinyloxy group, an allyl group, and the like.

The polymer of the polymerizable compound to be quenched is a fluorescent polymer which comprises, as a constituent component, a monomer unit derived from the polymerizable compound to be quenched.

The polymerizable compound to be quenched or the polymer thereof may be those described in JP1993-271567A (JP-H05-271567A), JP1997-272814A (JP-H09-272814A), JP2001-011336A, JP2013-045088A, WO2014/126167A, WO2015/098999A, WO2015/133578A, WO2015/147285A, WO2015/182680A, and the like, or may be commercial products, for example.

As the compound to be quenched, a polymerizable compound to be quenched or a polymer thereof is preferable, and the polymerizable compound to be quenched is more preferable.

In order to quench the fluorescence emitted from the compound to be quenched by using the quencher of the present invention, for example, the quencher of the present invention may be used in a solvent which is generally used if necessary in the field of the related art, generally in 0.5 to 300 equivalents and preferably in 100 to 200 equivalents with respect to the mol number of the compound to be quenched. The amount of the solvent used in the quenching reaction and the reaction conditions such as a temperature and a pressure may be appropriately selected in consideration of the general technical knowledge in the field of organic chemistry.

Method for Manufacturing Quencher of Present Invention

Among the quenchers of the present invention, for example, the quencher represented by the general formula (1) in which a group having a polymerizable unsaturated group is absent, $R_6$ represents a hydroxy group, and $Ar_1$ is a ring structure represented by the general formula (1-1) {compound represented by the following general formula (36)} can be manufactured by a series of methods represented by the following reactions [I] to [III].

That is, first, a compound represented by the following general formula (31) and a compound represented by the following general formula (32) are allowed to react with each other in the presence of formaldehyde to afford a compound represented by the following general formula (33) (reaction [I]). Then, the obtained compound represented by the general formula (33) and a compound represented by the following general formula (34) are allowed to react with each other in the presence of an organic metal reagent, and an oxidation reaction is performed to afford a compound represented by the following general formula (35) (reaction [II]). Thereafter, the obtained compound represented by the general formula (35) and tert-butyl iodobenzoate may be allowed to react with each other in the presence of an organic metal reagent, and then a salt-forming reaction may be performed (reaction [III]).

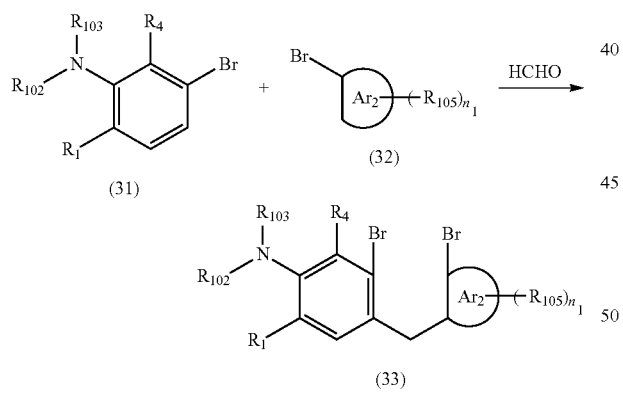

(In the formulae, $R_{102}$ and $R_{103}$ each independently represent an alkyl group having 1 to 20 carbon atoms or an aryl group having 6 to 14 carbon atoms that has a substituent or is unsubstituted, $R_1$ and $R_{102}$ may form an alkylene group having 2 to 4 carbon atoms together, $R_{103}$ and $R_4$ may form an alkylene group having 2 to 4 carbon atoms together, $n_1$ pieces of $R_{105}$ each independently represent a halogeno group, an alkyl group having 1 to 20 carbon atoms, an alkoxy group having 1 to 20 carbon atoms, an alkylthio group having 1 to 20 carbon atoms, an amino group which has a substituent or is unsubstituted, a hydroxy group, an aryl group having 6 to 14 carbon atoms, an aryloxy group having 6 to 14 carbon atoms, or an arylalkyl group having 7 to 20 carbon atoms, and $R_1$, $R_4$, $Ar_2$, and $n_1$ are the same as $R_1$, $R_4$, $Ar_2$, and $n_1$ described above.)

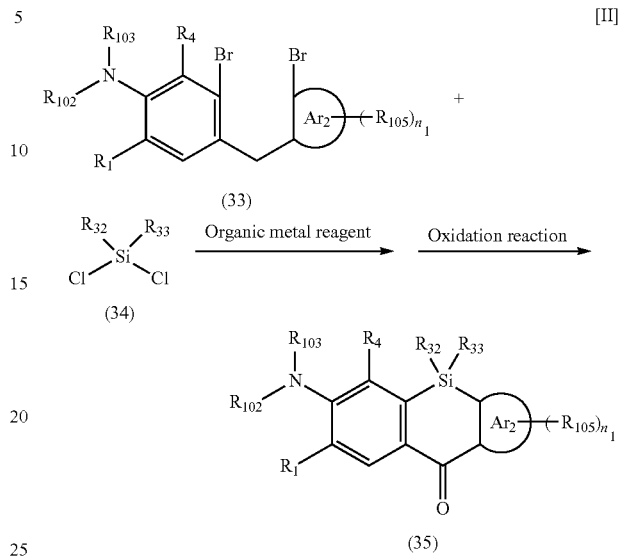

(In the formulae, $R_1$, $R_{32}$, $R_{33}$, $R_{102}$, $R_{103}$, $R_4$, $n_1$ pieces of $R_{105}$, $Ar_2$, and $n_1$ are the same as $R_1$, $R_{32}$, $R_{33}$, $R_{102}$, $R_{103}$, $R_4$, $n_1$ pieces of $R_{105}$, $Ar_2$, and $n_1$ described above.)

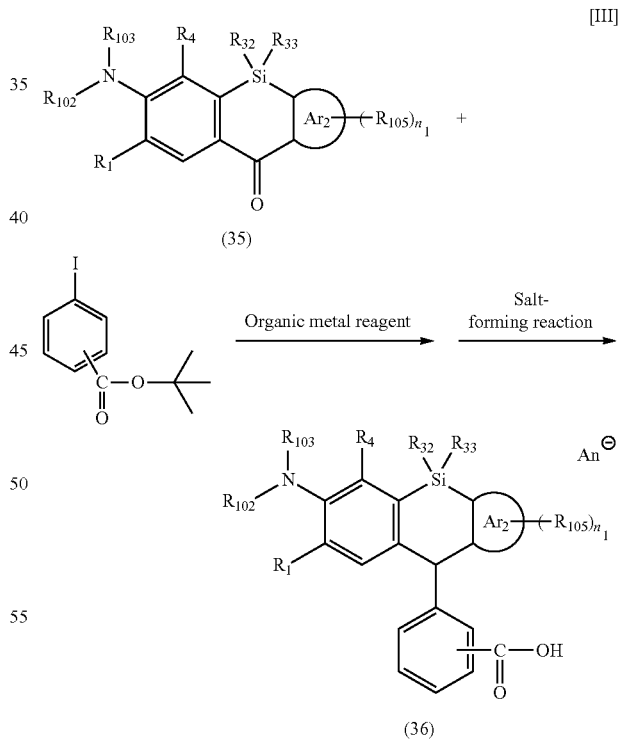

(In the formulae, $R_1$, $R_{32}$, $R_{33}$, $R_{102}$, $R_{103}$, $R_4$, $n_1$ pieces of $R_{105}$, $Ar_2$, and $n_1$ are the same as $R_1$, $R_{32}$, $R_{33}$, $R_{102}$, $R_{103}$, $R_4$, $n_1$ pieces of $R_{105}$, $Ar_2$, and $n_1$ described above.)

Examples of the alkyl group having 1 to 20 carbon atoms and the aryl group having 6 to 14 carbon atoms that has a substituent or is unsubstituted represented by $R_{102}$ and $R_{103}$ in the general formula (31) are the same as the examples of those represented by $R_2$ and $R_3$ in the general formula (1-1), and preferred examples thereof are also the same.

In a case where $R_1$ and $R_{102}$ in the general formula (31) form an alkylene group having 2 to 4 carbon atoms together and in a case where $R_{103}$ and $R_4$ in the general formula (31) form an alkylene group having 2 to 4 carbon atoms together, examples of the alkylene group having 2 to 4 carbon atoms are the same as the examples of the alkylene group having 2 to 4 carbon atoms exemplified above in a case where $R_1$ and $R_2$ in the general formula (1-1) form an alkylene group having 2 to 4 carbon atoms together and in a case where $R_3$ and $R_4$ in the general formula (1-1) form an alkylene group having 2 to 4 carbon atoms together, and preferred examples thereof are also the same.

In a case where $R_1$ and $R_{102}$ in the general formula (31) form an alkylene group having 2 to 4 carbon atoms together and/or in a case where $R_{103}$ and $R_4$ in the general formula (31) form an alkylene group having 2 to 4 carbon atoms together, specific examples of the resulting structure include the following structures.

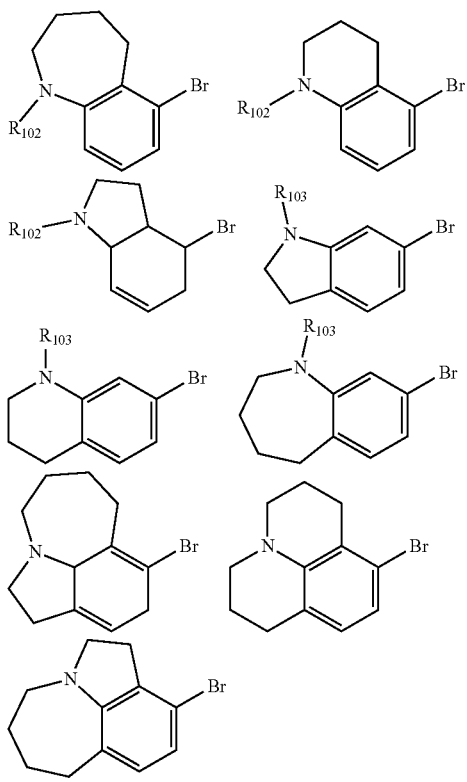

(In the formulae, $R_{102}$ and $R_{103}$ are the same as $R_{102}$ and $R_{103}$ described above.)

Among the specific examples, the following structures are preferable.

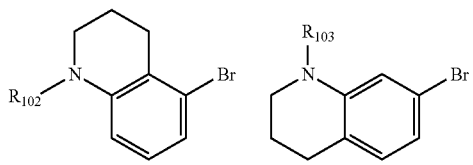

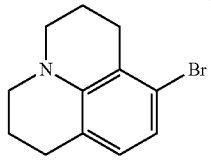

(In the formulae, $R_{102}$ and $R_{103}$ are the same as $R_{102}$ and $R_{103}$ described above.)

Among the specific examples, 8-bromo-2,3,6,7-tetrahydro-1H, 5H-benzo[ij]quinolizine is particularly preferable.

As $R_{102}$ in the general formula (31), an alkyl group having 1 to 12 carbon atoms, a phenyl group which has an alkyl group having 1 to 6 carbon atoms or is unsubstituted, and a group forming an alkylene group having 2 to 4 carbon atoms together with $R_1$ are preferable, and an alkyl group having 1 to 6 carbon atoms, a phenyl group which has an alkyl group having 1 to 3 carbon atoms or is unsubstituted, and a group forming a linear alkylene group having 2 to 4 carbon atoms together with $R_1$ are more preferable. Specifically, examples of $R_{102}$ include a methyl group, an ethyl group, a propyl group, a butyl group, a pentyl group, a hexyl group, a phenyl group, a p-tolyl group, a p-ethylphenyl group, a p-propylphenyl group, a p-butylphenyl group, a p-pentylphenyl group, a p-hexylphenyl group, a 2,4-xylyl group, a 2,6-xylyl group, a 3,5-xylyl group, a mesityl group, a group forming an ethylene group together with $R_1$, a group forming a trimethylene group together with $R_1$, a group forming a tetramethylene group together with $R_1$, and the like. Among these, the methyl group, the ethyl group, the propyl group, the butyl group, the pentyl group, the hexyl group, the phenyl group, the p-tolyl group, the p-ethylphenyl group, the p-propylphenyl group, and the group forming a trimethylene group together with $R_1$ are preferable. It should be noted that the alkyl group in the specific examples is not limited to a normal-isomer, and includes all the branched alkyl groups such as a sec-isomer, a tert-isomer, an iso-isomer, and a neo-isomer.

Among these, the alkyl group having 1 to 6 carbon atoms and the phenyl group which has an alkyl group having 1 to 3 carbon atoms or is unsubstituted are preferable, and the alkyl group having 1 to 4 carbon atoms is particularly preferable. Specifically, a methyl group, an ethyl group, a n-propyl group, an isopropyl group, a n-butyl group, an isobutyl group, a sec-butyl group, a tert-butyl group, a n-pentyl group, an isopentyl group, a n-hexyl group, a phenyl group, a p-tolyl group, a p-ethylphenyl group, a p-(n-propyl)phenyl group, and a p-isopropylphenyl group are preferable, the methyl group, the ethyl group, the n-propyl group, the isopropyl group, the n-butyl group, the isobutyl group, the sec-butyl group, and the tert-butyl group are more preferable, and the methyl group and the ethyl group are particularly preferable.

As $R_{103}$ in the general formula (31), an alkyl group having 1 to 12 carbon atoms, a phenyl group which has an alkyl group having 1 to 6 carbon atoms or is unsubstituted, and a group forming an alkylene group having 2 to 4 carbon atoms together with $R_4$ are preferable, and an alkyl group having 1 to 6 carbon atoms, a phenyl group which has an alkyl group having 1 to 3 carbon atoms or is unsubstituted, and a group forming a linear alkylene group having 2 to 4 carbon atoms together with $R_4$ are more preferable. Specifically, examples of $R_{103}$ include a methyl group, an ethyl group, a propyl group, a butyl group, a pentyl group, a hexyl group, a phenyl group, a p-tolyl group, a p-ethylphenyl group, a p-propylphenyl group, a p-butylphenyl group, a p-pentylphenyl group, a p-hexylphenyl group, a 2,4-xylyl group, a 2,6-xylyl group, a 3,5-xylyl group, a mesityl group, a group forming an ethylene group together with $R_4$, a group forming a trimethylene group together with $R_4$, a group forming a tetramethylene group together with $R_4$, and the like. Among these, the methyl group, the ethyl group, the propyl group, the butyl group, the pentyl group, the hexyl group, the phenyl group, the p-tolyl group, the p-ethylphenyl group, the p-propylphenyl group, and the group forming a trimethylene group together with $R_4$ are preferable. It should be noted that the alkyl group in the specific examples is not limited to a normal-isomer, and includes all the branched alkyl groups such as a sec-isomer, a tert-isomer, an iso-isomer, and a neo-isomer.

Among these, the alkyl group having 1 to 6 carbon atoms and the phenyl group which has an alkyl group having 1 to 3 carbon atoms or is unsubstituted are preferable, and the alkyl group having 1 to 4 carbon atoms is particularly preferable. Specifically, a methyl group, an ethyl group, a n-propyl group, an isopropyl group, a n-butyl group, an isobutyl group, a sec-butyl group, a tert-butyl group, a n-pentyl group, an isopentyl group, a n-hexyl group, a phenyl group, a p-tolyl group, a p-ethylphenyl group, a p-(n-propyl)phenyl group, and a p-isopropylphenyl group are preferable, the methyl group, the ethyl group, the n-propyl group, the isopropyl group, the n-butyl group, the isobutyl group, the sec-butyl group, and the tert-butyl group are more preferable, and the methyl group and the ethyl group are particularly preferable.

Specific examples of the compound represented by the general formula (31) include the following compounds. As the compound represented by the general formula (31), commercial products or compounds appropriately synthesized by known methods may be used.

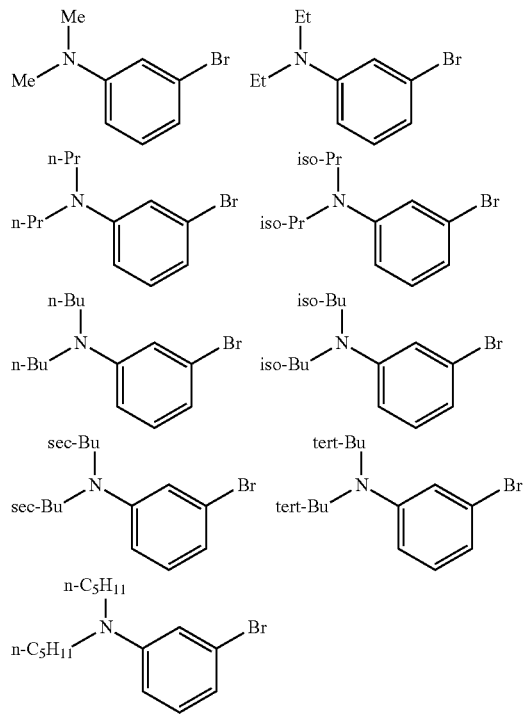

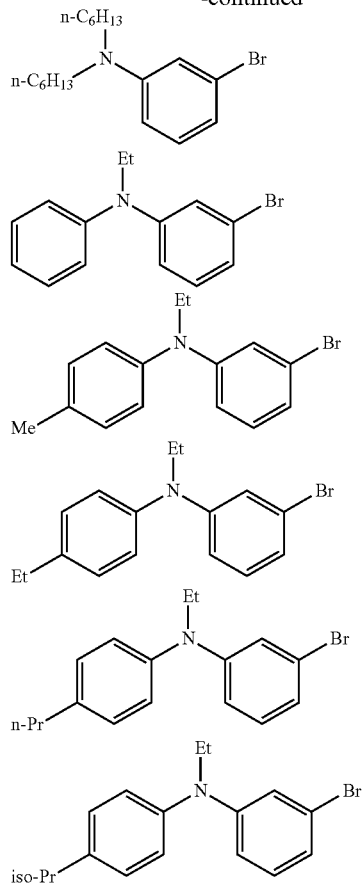

Examples of the halogeno group, the alkyl group having 1 to 20 carbon atoms, the alkoxy group having 1 to 20 carbon atoms, the alkylthio group having 1 to 20 carbon atoms, the amino group which has a substituent or is unsubstituted, the hydroxy group, the aryl group having 6 to 14 carbon atoms, the aryloxy group having 6 to 14 carbon atoms, or the arylalkyl group having 7 to 20 carbon atoms represented by $R_{105}$ in the general formula (32) are the same as the examples of those represented by $R_5$ in the general formula (1), and preferred examples thereof are also the same.

As $R_{105}$ in the general formula (32), a halogeno group; an alkyl group having 1 to 12 carbon atoms; an alkoxy group having 1 to 12 carbon atoms; an alkylthio group having 1 to 12 carbon atoms; an amino group having an alkyl group having 1 to 20 carbon atoms, a halogenated alkyl group having 1 to 20 carbon atoms, an aryl group having 6 to 10 carbon atoms, or an arylalkyl group having 7 to 13 carbon atoms; a hydroxy group; an aryl group having 6 to 14 carbon atoms; an aryloxy group having 6 to 14 carbon atoms; and an arylalkyl group having 7 to 20 carbon atoms are preferable, the halogeno group; the alkyl group having 1 to 12 carbon atoms; the alkoxy group having 1 to 12 carbon atoms; the alkylthio group having 1 to 12 carbon atoms; the amino group having an alkyl group having 1 to 6 carbon atoms, a phenyl group, or a phenylalkyl group having 7 to 9 carbon atoms; the hydroxy group; a phenyl group; a phenoxy group; and a phenylalkyl group having 7 to 12 carbon atoms are more preferable, the halogeno group; the alkyl group having 1 to 6 carbon atoms; an alkoxy group having 1 to 6 carbon atoms; an alkylthio group having 1 to 6 carbon atoms; the amino group having an alkyl group having 1 to 6 carbon atoms, a phenyl group, or a phenylalkyl group having 7 to 9 carbon atoms; the hydroxy group; the phenyl group; the phenoxy group; and a phenylalkyl group having 7 to 9 carbon atoms are even more preferable; an amino group having an alkyl group having 1 to 4 carbon atoms is still more preferable; and an amino group having 2 alkyl groups each having 1 to 4 carbon atoms is particularly preferable.

Specifically, a fluoro group, a methyl group, an ethyl group, a n-propyl group, an isopropyl group, a n-butyl group, an isobutyl group, a sec-butyl group, a tert-butyl group, a n-pentyl group, an isopentyl group, a n-hexyl group, a methoxy group, an ethoxy group, a n-propoxy group, an isopropoxy group, a n-butoxy group, an isobutoxy group, a sec-butoxy group, a tert-butoxy group, a methylthio group, an ethylthio group, a n-propylthio group, an isopropylthio group, a n-butylthio group, an isobutylthio group, a sec-butylthio group, a tert-butylthio group, a methylamino group, an ethylamino group, a n-propylamino group, an isopropylamino group, a n-butylamino group, an isobutylamino group, a sec-butylamino group, a tert-butylamino group, a n-pentylamino group, an isopentylamino group, a n-hexylamino group, a phenylamino group, a benzylamino group, a dimethylamino group, a diethylamino group, a di-n-propylamino group, a diisopropylamino group, a di-n-butylamino group, a diisobutylamino group, a di-sec-butylamino group, a di-tert-butylamino group, a di-n-pentylamino group, a diisopentylamino group, a di-n-hexylamino group, a diphenylamino group, a dibenzylamino group, a hydroxy group, a phenyl group, a phenoxy group, a benzyl group, a phenethyl group, a 1-phenylethyl group, a hydrocinnamyl group, a 2-phenylpropyl group, a 1-phenylpropyl group, and a cumyl group are preferable, the fluoro group, the methyl group, the ethyl group, the n-propyl group, the isopropyl group, the n-butyl group, the isobutyl group, the sec-butyl group, the tert-butyl group, the methoxy group, the ethoxy group, the methylthio group, the ethylthio group, the methylamino group, the ethylamino group, the n-propylamino group, the isopropylamino group, the n-butylamino group, the isobutylamino group, the sec-butylamino group, the tert-butylamino group, the phenylamino group, the benzylamino group, the dimethylamino group, the diethylamino group, the di-n-propylamino group, the diisopropylamino group, the di-n-butylamino group, the diisobutylamino group, the di-sec-butylamino group, the di-tert-butylamino group, the diphenylamino group, the dibenzylamino group, the hydroxy group, the phenyl group, the phenoxy group, the benzyl group, the phenethyl group, the hydrocinnamyl group, and the cumyl group are more preferable.

Among these, the methylamino group, the ethylamino group, the n-propylamino group, the isopropylamino group, the n-butylamino group, the isobutylamino group, the sec-butylamino group, the tert-butylamino group, the phenylamino group, the benzylamino group, the dimethylamino group, the diethylamino group, the di-n-propylamino group, the diisopropylamino group, the di-n-butylamino group, the diisobutylamino group, the di-sec-butylamino group, the di-tert-butylamino group, the diphenylamino group, and the dibenzylamino group are preferable, the methylamino group, the ethylamino group, the n-propylamino group, the isopropylamino group, the n-butylamino group, the isobutylamino group, the sec-butylamino group, the tert-butylamino group, the dimethylamino group, the diethylamino group, the di-n-propylamino group, the diisopropylamino group, the di-n-butylamino group, the diisobutylamino group, the di-sec-butylamino group, and the di-tert-butylamino group are more preferable, the dimethylamino group, the diethylamino group, the di-n-propylamino group, the diisopropylamino group, the di-n-butylamino group, the diisobutylamino group, the di-sec-butylamino group, and the di-tert-butylamino group are even more preferable, and the dimethylamino group and the diethylamino group are particularly preferable.

Specific examples of the compound represented by the general formula (32) include the following compounds. As the compound represented by the general formula (32), commercial products or compounds appropriately synthesized by known methods may be used.

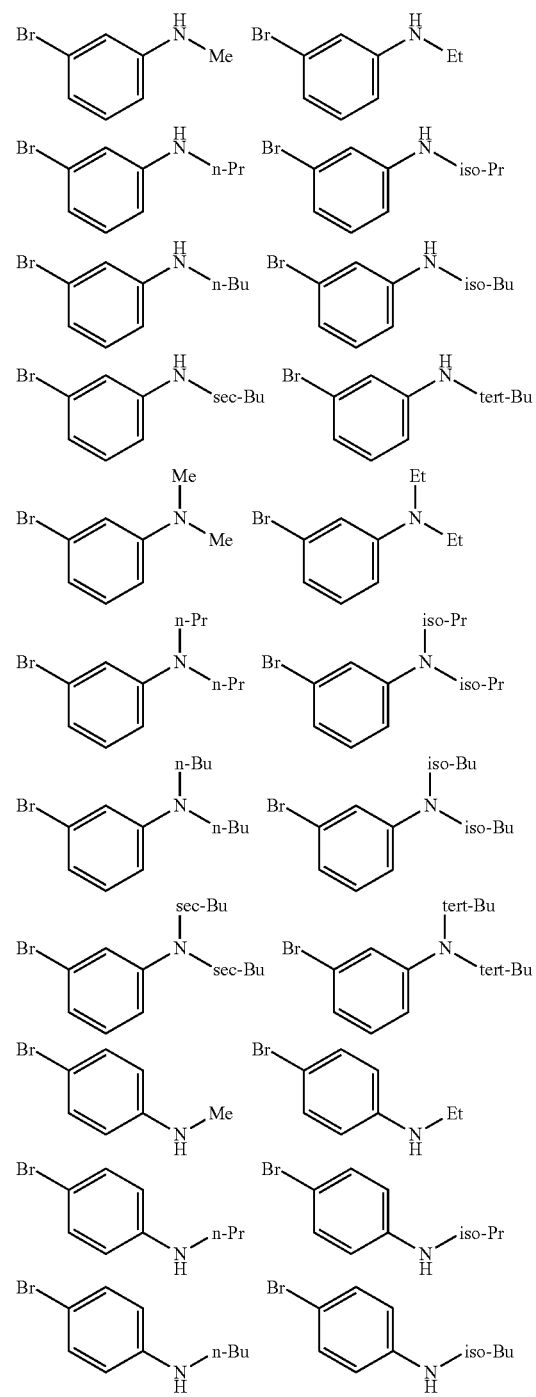

-continued

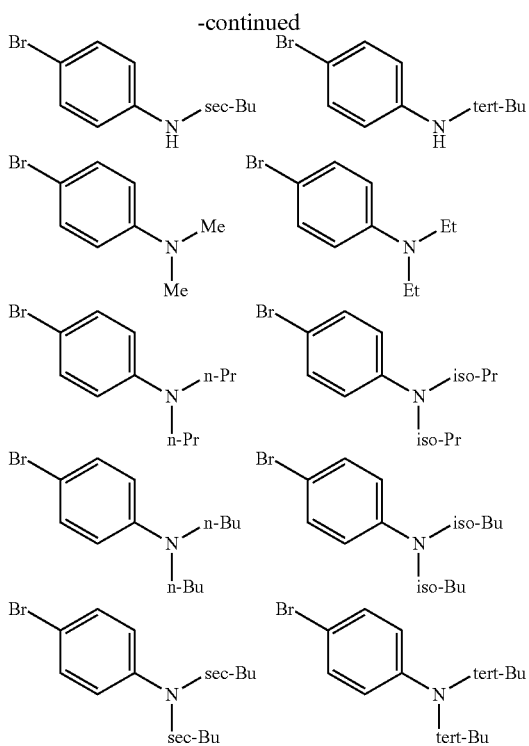

In the reaction [I], the compound represented by the general formula (31) and the compound represented by the general formula (32) may be allowed to react with each other in an acid catalyst in the presence of formaldehyde, generally at a temperature of 20° C. to 100° C. and preferably at a temperature of 40° C. to 80° C. generally for 1 to 24 hours and preferably for 1 to 12 hours.

Examples of the acid catalyst include acetic acid, sulfuric acid, methanesulfonic acid, trifluoromethanesulfonic acid, and the like. Among these, the acetic acid is preferable. One kind of these catalysts may be used singly, or two or more kinds of these catalysts may be used by being appropriately combined. The amount of the solvent used is generally 0.1 to 50 ml and preferably 0.5 to 10 ml with respect to 1 mmol of the compound represented by the general formula (31).

The amount of the compound represented by the general formula (32) used is generally 1 to 10 equivalents and preferably 1 to 3 equivalents with respect to the mol number of the compound represented by the general formula (31).

The amount of the formaldehyde used is generally 1 to 20 equivalents and preferably 2 to 5 equivalents with respect to the mol number of the compound represented by the general formula (31). As the formaldehyde, a formalin solution may be used.

Specific examples of the compound represented by the general formula (34) include dichlorodimethylsilane, dichlorodiethyl silane, dichloro di-n-propylsilane, dichlorodiisopropylsilane, dichloro di-n-butylsilane, dichlorodiisobutylsilane, dichloro di-sec-butylsilane, dichloro di-tert-butylsilane, dichlorodiphenylsilane, and the like. As the compound represented by the general formula (34), commercial products or compounds appropriately synthesized by known methods may be used.

In the reaction [II], first, the compound represented by the general formula (33) obtained by the reaction [I] and an organic metal reagent may be allowed to react with each other in advance in a solvent (reaction [II-I]), the compound represented by the general formula (34) may be added thereto and allowed to react (reaction [II-II]), and the obtained compound may be subjected to an oxidation reaction.

The reaction [II-I] may be performed generally at a temperature of −80° C. to 40° C. and preferably at a temperature of −70° C. to −40° C. generally for 10 minutes to 6 hours and preferably for 30 minutes to 3 hours. The reaction [II-II] may be performed generally at a temperature of −80° C. to 80° C. and preferably at a temperature of −70° C. to 50° C. generally for 1 to 24 hours and preferably for 1 to 12 hours.

Examples of the solvent in the reaction [II-I] and the reaction [II-II] include ethers such as diethyl ether, diisopropyl ether, ethyl methyl ether, tetrahydrofuran, 1,4-dioxane, and dimethoxyethane; ketones such as acetone, dimethyl ketone, methyl ethyl ketone, diethyl ketone, 2-hexanone, tert-butylmethyl ketone, cyclopentanone, and cyclohexanone; halogenated hydrocarbons such as chloromethane, chloroform, dichloromethane, dichloroethane, trichloroethane, carbon tetrachloride, and chlorobenzene; hydrocarbons such as n-hexane, benzene, toluene, and xylene; esters such as ethyl acetate, butyl acetate, and methyl propionate; nitriles such as acetonitrile; amides such as N,N-dimethylformamide; and the like. Among these, the ethers are preferable, and the tetrahydrofuran is more preferable. One kind of these solvents may be used singly, or two or more kinds of these solvents may be used by being appropriately combined. The amount of the reaction solvent used is generally 0.1 to 100 ml and preferably 1 to 50 ml with respect to 1 mmol of the compound represented by the general formula (33).

The amount of the compound represented by the general formula (34) used is generally 1 to 5 equivalents and preferably 1 to 3 equivalents with respect to the mol number of the compound represented by the general formula (33).

Examples of the organic metal reagent in the reaction [II-I] and the reaction [II-II] include an organic lithium compound, the Grignard reagent, an organic alkaline earth metal compound, an organic aluminum compound, an organic zinc compound, and the like. Among these, the organic lithium compound is preferable. Specifically, examples thereof include n-butyllithium, sec-butyllithium, tert-butyllithium, n-hexyllithium, and the like. Among these, the sec-butyllithium is preferable. One kind of these compounds may be used singly, or two or more kinds of these compounds may be used by being appropriately combined. In addition, as the organic metal reagent, commercial products may be used, or a solution of the organic metal reagent and an aliphatic hydrocarbon-based solvent such as hexane, cyclohexane, or pentane may be used.

The amount of the organic metal reagent used in the reaction [II-I] and the reaction [II-II] is generally 1 to 10 equivalent and preferably 2 to 4 equivalents with respect to the mol number of the compound represented by the general formula (33).

The oxidation reaction is carried out by adding an oxidant to the compound obtained by the reaction [II-II] and performing a reaction in a solvent generally at a temperature of −30° C. to 50° C. and preferably at a temperature of −20° C. to 30° C. generally for 1 to 24 hours and preferably for 2 to 18 hours.

Examples of the solvent in the oxidation reaction are the same as the examples of the solvent in the reaction [II-I] and the reaction [II-II]. Among these, ketones are preferable, and acetone is more preferable. One kind of these solvents may be used singly, or two or more kinds of these solvents may be used by being appropriately combined. The amount of the solvent used is generally 0.1 to 100 ml and preferably 1 to 50 ml with respect to 1 mmol of the compound represented by the general formula (33).

Examples of the oxidant in the oxidation reaction include a permanganate and the like. Specifically, examples thereof include potassium permanganate, sodium permanganate, magnesium permanganate, calcium permanganate, and the like. Among these, the potassium permanganate is preferable. As the oxidant, commercial products may be used.

The amount of the oxidant used is generally 1 to 10 equivalents and preferably 2 to 5 equivalents with respect to the mol number of the compound represented by the general formula (33).

In the reaction [III], first, tert-butyl iodobenzoate and an organic metal reagent may be allowed to react with each other in advance in a solvent (reaction [III-I]), the compound represented by the general formula (35) obtained by the reaction [II] may be added thereto and allowed to react (reaction [III-II]), and the obtained compound may be subjected to a salt-forming reaction.

The reaction [III-I] may be performed generally at a temperature of −80° C. to 40° C. and preferably at a temperature of −70° C. to −40° C. generally for 10 minutes to 6 hours and preferably for 30 minutes to 3 hours. The reaction [III-II] may be performed generally at a temperature of −80° C. to 80° C. and preferably at a temperature of −70° C. to 50° C. generally for 1 to 24 hours and preferably for 1 to 12 hours.

As the solvent and the organic metal reagent in the reaction [III-I] and the reaction [III-II], the same ones as the solvent and the organic metal reagent in the reaction [II-I] and the reaction [II-II] may be used. The amount of the solvent used is generally 0.1 to 100 ml and preferably 1 to 50 ml with respect to 1 mmol of the tert-butyl iodobenzoate. The amount of the organic metal reagent used is generally 1 to 5 equivalents and preferably 1 to 3 equivalents with respect to the mol number of the tert-butyl iodobenzoate.

The amount of the tert-butyl iodobenzoate used is generally 1 to 5 equivalents and preferably 1 to 3 equivalents with respect to the mol number of the compound represented by the general formula (35). As the tert-butyl iodobenzoate, commercial products or compounds appropriately synthesized by known methods may be used.

The salt-forming reaction is carried out by adding a salt of an anion represented by An⁻ to the compound obtained by the reaction [II-II] and performing a reaction in a solvent generally at a temperature of 0° C. to 80° C. and preferably at a temperature of 10° C. to 50° C. generally for 1 to 24 hours and preferably for 2 to 10 hours.

Examples of the solvent in the salt-forming reaction include organic solvents such as methanol, ethanol, isopropyl alcohol, tetrahydrofuran, dioxane, N,N-dimethylformamide, dichloromethane, dichloroethane, and ethyl acetate. Among these, the ethanol, the dichloromethane, and the ethyl acetate are preferable. One kind of these solvents may be used singly, or two or more kinds of these solvents may be used by being appropriately combined. The amount of the reaction solvent used is generally 0.1 to 100 ml and preferably 1 to 50 ml with respect to 1 mmol of the compound represented by the general formula (35).

Examples of the salt of the anion represented by An⁻ in the salt-forming reaction include an alkali metal salt of the anion represented by An⁻ or an inorganic acid {salt of the anion represented by An⁻ and a proton (H⁺)}. Among these, the alkali metal salt of the anion represented by An⁻ is preferable.

Examples of the alkali metal salt of the anion represented by An⁻ include salts formed of the anion represented by An⁻ and an alkali metal such as sodium, potassium, or lithium. Among these, a salt formed of the anion represented by An⁻, potassium, or lithium is preferable. The amount of the alkali metal salt of the anion represented by An⁻ used is generally 1 to 2 equivalents and preferably 1 to 1.5 equivalents with respect to the mol number of the compound represented by the general formula (35).

Examples of the inorganic acid include inorganic acids such as hydrochloric acid, hydrogen bromide, hydrogen iodide, hypochlorous acid, chlorous acid, chloric acid, perchloric acid, hexafluorophosphoric acid, and hexafluoroantimonic acid. Among these, the hydrochloric acid, the perchloric acid, the hexafluorophosphoric acid, and the hexafluoroantimonic acid are preferable. The amount of the inorganic acid used is generally 1 to 50 equivalents and preferably 1 to 10 equivalents with respect to the mol number of the compound represented by the general formula (35).

In a case where the salt of the anion represented by An⁻ in the salt-forming reaction is an alkali metal salt of the anion represented by An⁻, after the reaction between the compound represented by the general formula (35) and the tert-butyl iodobenzoate, it is preferable that the alkali metal salt of the anion represented by An⁻ is allowed to react with the coexistent hydrochloric acid in the solvent such that the alkali metal salt goes through the state of a chloro salt. The amount of the hydrochloric acid used is generally 1 to 50 equivalents and preferably 1 to 10 equivalents with respect to the mol number of the compound represented by the general formula (35).

In addition, in a case where the salt of the anion represented by An⁻ in the salt-forming reaction is an inorganic acid, the compound obtained by the reaction [III-II] and the inorganic acid may be allowed to react with each other in a solvent.

Among the quenchers of the present invention, for example, the quencher represented by the general formula (1) in which a group having a polymerizable unsaturated group is absent, $R_6$ represents a hydroxy group, and $Ar_1$ is a ring structure represented by any of the general formulae (1-2) to (1-7) {compound represented by the following general formula (36')} can be manufactured by a series of methods represented by the following reactions [I'] to [III'].

That is, first, a compound represented by the following general formula (31') and the compound represented by the following general formula (32) are allowed to react with each other in the presence of formaldehyde to afford a compound represented by the following general formula (33') (reaction [I']). Then, the obtained compound represented by the general formula (33') and the compound represented by the general formula (34) are allowed to react with each other in the presence of an organic metal reagent, and an oxidation reaction is performed to afford a compound represented by the following general formula (35') (reaction [II']). Thereafter, the obtained compound represented by the general formula (35') and tert-butyl iodobenzoate may be allowed to react with each other in the presence of an organic metal reagent, a compound represented a general formula (39) may be added thereto and allowed to react, and then a salt-forming reaction may be performed (reaction [III']).

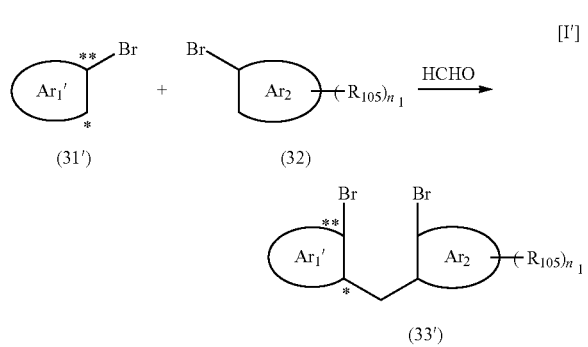

(31')   (32)   (33')

{In the formulae, Ar$_1$' represents a ring structure represented by any of the following general formulae (1-2') to (1-7'), and * and ** each represent a position of bonding to the ring structure represented by any of the general formulae (1-2') to (1-7');

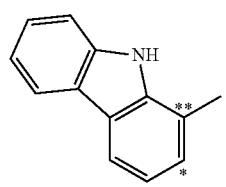

(1-2')

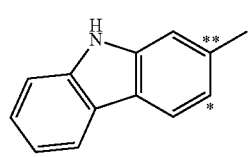

(1-3')

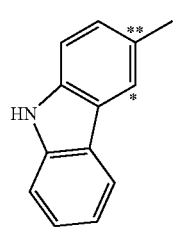

(1-4')

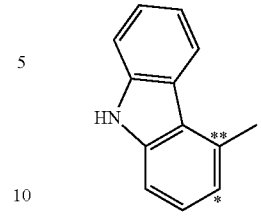

(1-5')

(1-6')

(1-7')

(in the formulae, * and ** each represent the same position as the position represented by each of * and ** in the general formula (31') or (33').), and n$_1$ pieces of R$_{105}$, Ar$_2$, and n$_1$ are the same as n$_1$ pieces of R$_{105}$, Ar$_2$, and n$_1$ described above.}

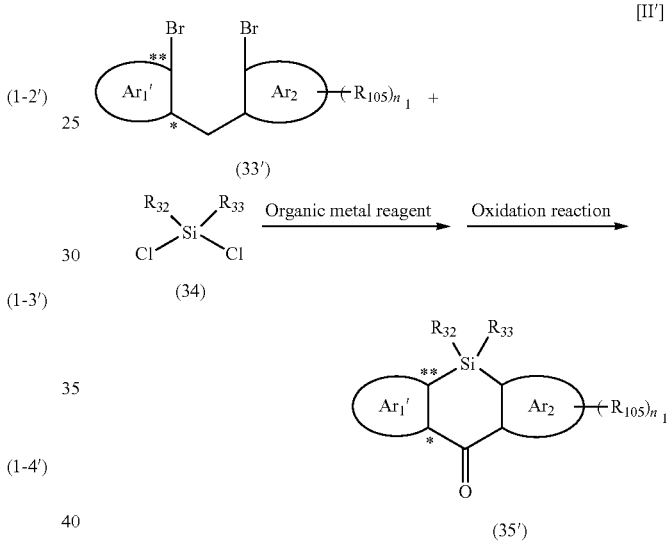

[II']

(33')

(34)

(35')

(In the formulae, * and ** each represent a position of bonding to the ring structure represented by any of the general formulae (1-2') to (1-7'), and R$_{32}$, R$_{33}$, n$_1$ pieces of R$_{105}$, Ar$_1$', Ar$_2$, and n$_1$ are the same as R$_{32}$, R$_{33}$, n$_1$ pieces of R$_{105}$, Ar$_1$', Ar$_2$, and n$_1$ described above.)

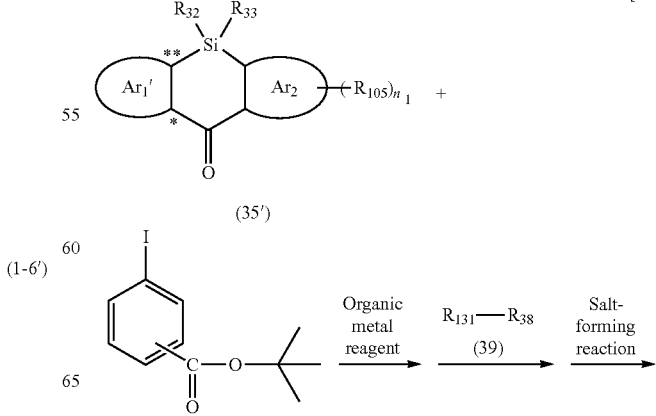

[III']

(35')

(39)

-continued

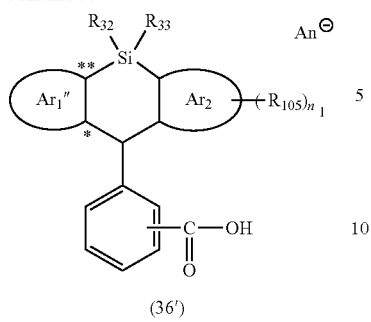

(36')

{In the formulae, $R_{131}$ represents an alkyl group having 1 to 20 carbon atoms, $R_{38}$ represents a halogeno group, a trifluoromethylsulfonyloxy group, a mesyloxy group (methylsulfonyloxy group), or a tosyloxy group (p-toluenesulfonyloxy group), $Ar_1''$ represents a ring structure represented by any of the following general formulae (1-2") to (1-7"), * and ** each represent a position of bonding to the ring structure represented by any of the general formulae (1-2") to (1-7");

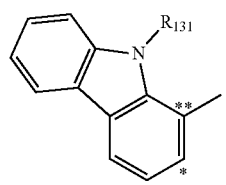
(1-2")

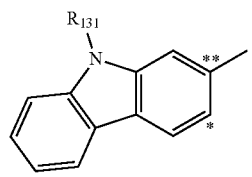
(1-3")

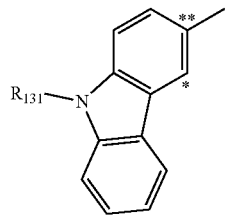
(1-4")

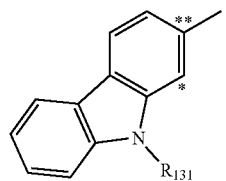
(1-5")

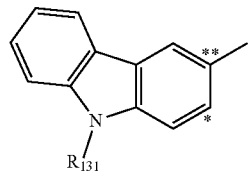
(1-6")

-continued

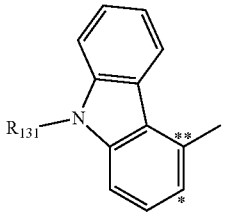
(1-7")

(in the formulae, * and ** each represent the same position as the position represented by each of * and ** in the general formula (35') and (36'), and $R_{131}$ is the same as $R_{131}$ described above.), and $R_{32}$, $R_{33}$, $n_1$ pieces of $R_{105}$, $Ar_1'$, $Ar_2$, and $n_1$ are the same as $R_{32}$, $R_{33}$, $n_1$ pieces of $R_{105}$, $Ar_1'$, $Ar_2$, and $n_1$ described above.}

As $Ar_1'$ in the general formula (31'), the ring structure represented by any of the general formulae (1-3') and (1-5') is preferable.

Examples of the compound represented by the general formula (31') include 1-bromocarbazole, 2-bromocarbazole, 3-bromocarbazole, 4-bromocarbazole, and the like. As the compound represented by the general formula (31'), commercial products or compounds appropriately synthesized by known methods may be used.

Examples of the alkyl group having 1 to 20 carbon atoms represented by $R_{131}$ in the general formula (39) are the same as the examples of the alkyl group having 1 to 20 carbon atoms represented by $R_5$ in the general formula (1), and preferred examples thereof are also the same.

Examples of the halogeno group represented by $R_{38}$ in the general formula (39) include a fluoro group, a chloro group, a bromo group, an iodo group, and the like. Among these, the iodo group is preferable.

As $R_{38}$ in the general formula (39), a halogeno group is preferable, and an iodo group is more preferable.

Specific examples of the compound represented by the general formula (39) include fluoromethane, fluoroethane, 1-fluoropropane, 2-fluoropropane, chloromethane, chloroethane, 1-chloropropane, 2-chloropropane, bromomethane, bromoethane, 1-bromopropane, 2-bromopropane, iodomethane, iodoethane, 1-iodopropane, 2-iodopropane, methyl trifluoromethanesulfonate, ethyl trifluoromethanesulfonate, propyl trifluoromethanesulfonate, methyl mesylate, ethyl mesylate, n-propylmesylate, isopropyl mesylate, methyl tosylate, ethyl tosylate, n-propyltosylate, isopropyl tosylate, and the like. Among these, the fluoromethane, the chloromethane, the bromomethane, the iodomethane, the methyl trifluoromethanesulfonate, the methyl mesylate, and the methyl tosylate are preferable, and the iodomethane is more preferable. As the compound represented by the general formula (39), commercial products or compounds appropriately synthesized by known methods may be used.

As $Ar_1''$ in the general formula (36'), the ring structure represented by any of the general formulae (1-3") and (1-5") is preferable.

The reaction [I'] and the reaction [II'] may be performed under the same reaction conditions (the reaction solvent, the reaction temperature, the reaction time, and amount of each compound used) as those in the reaction [I] and the reaction [II], except that the compound represented by the general formula (31') is used instead of the compound represented by the general formula (31) in the reaction [I] and the reaction [II].

In the reaction [III'], first, tert-butyl iodobenzoate and an organic metal reagent may be allowed to react with each other in advance in a solvent (reaction [III-I']), the compound represented by the general formula (35') obtained by the reaction [II'] may be added thereto and allowed to react (reaction [III-II']), the obtained compound and the compound represented by the general formula (39) may be allowed to react with each other in a solvent in the presence of a base catalyst (reaction [III-III']), and finally the obtained compound may be subjected to a salt-forming reaction.

The reaction [III-I'], the reaction [III-II'], and the salt-forming reaction may be performed under the same conditions (the reaction solvent, the reaction temperature, the reaction time, and the amount of each compound used) as those in the reaction [III], except that the compound represented by the general formula (35') is used instead of the compound represented by the general formula (35) in the reaction [III].

The reaction [III-III'] may be performed in a solvent in the presence of a base catalyst, generally at a temperature of 0° C. to 100° C. and preferably at a temperature of 10° C. to 80° C. generally for 1 to 24 hours and preferably for 2 to 10 hours.

Examples of the base catalyst include an alkali metal such as potassium or sodium, a hydroxide of an alkali metal or an alkaline earth metal such as lithium hydroxide, potassium hydroxide, sodium hydroxide, calcium hydroxide, or barium hydroxide, amines such as triethylenediamine, pyridine, ethylenediamine, diethylenetriamine, pyrrolidone, and tetrahydroquinoline, and the like. One kind of these catalysts may be used singly, or two or more kinds of these catalysts may be used in combination. The amount of the base catalyst used is generally 100% to 5,000% and preferably 300% to 1,000% of the total weight of the compound obtained by the reaction [III-II'] and the compound represented by the general formula (39).

Examples of the solvent include organic solvents such as methanol, ethanol, isopropyl alcohol, tetrahydrofuran, dioxane, N,N-dimethylformamide, dichloromethane, dichloroethane, and ethyl acetate. Among these, the ethanol, the dichloromethane, and the ethyl acetate are preferable. One kind of these solvents may be used singly, or two or more kinds of these solvents may be used by being appropriately combined. The amount of the reaction solvent used is generally 100% to 5,000% and preferably 100% to 1,500% of the total weight of the compound obtained by the reaction [III-II'] and the compound represented by the general formula (39).

The amount of the compound represented by the general formula (39) used is generally 1 to 10 equivalents and preferably 1 to 5 equivalents with respect to the mol number of the compound obtained by the reaction [III-II'].

Among the quenchers of the present invention, for example, the quencher represented by the general formula (1) in which a group having a polymerizable unsaturated group is absent, $R_6$ represents an alkoxy group having 1 to 20 carbon atoms, and $Ar_1$ is a ring structure represented by the general formula (1-1) {compound represented by the following general formula (38-1)} can be manufactured by a method represented by the following reaction [IV-I]. That is, by reacting the compound represented by the general formula (36) obtained by the reaction [III] with a compound represented by the following general formula (37-1), the compound represented by the following general formula (38-1) can be obtained.

Among the quenchers of the present invention, for example, the quencher represented by the general formula (1) in which a group having a polymerizable unsaturated group is absent, $R_6$ is an amino group which has a substituent or is unsubstituted, and $Ar_1$ is a ring structure represented by the general formula (1-1) {compound represented by the following general formula (38-2)} can be manufactured by a method represented by the following reaction [IV-II]. That is, by reacting the compound represented by the general formula (36) obtained by the reaction [III] with a compound represented by the following general formula (37-2), the compound represented by the following general formula (38-2) can be obtained.

Among the quenchers of the present invention, for example, the quencher represented by the general formula (1) in which a group having a polymerizable unsaturated group is absent, $R_6$ is a heterocyclic amino group, and $Ar_1$ is a ring structure represented by the general formula (1-1) {compound represented by the following general formula (38-3)} can be manufactured by a method represented by the following reaction [IV-III]. That is, by reacting the compound represented by the general formula (36) obtained by the reaction [III] with a compound represented by the following general formula (37-3), the compound represented by the following general formula (38-3) can be obtained.

Among the quenchers of the present invention, for example, the quencher represented by the general formula (1) in which functional groups ($R_2$, $R_3$, $n_1$ pieces of $R_5$, and $R_{31}$) other than $R_6$ do not have a group having a polymerizable unsaturated group, $R_6$ is a group having a polymerizable unsaturated group represented by the general formula (2), and $Ar_1$ is a ring structure represented by the general formula (1-1) {compound represented by the following general formula (38-4)} can be manufactured by a method represented by the following reaction [IV-IV]. That is, by reacting the compound represented by the general formula (36) obtained by the reaction [III] with a compound represented by the following general formula (37-4), the compound represented by the following general formula (38-4) can be obtained.

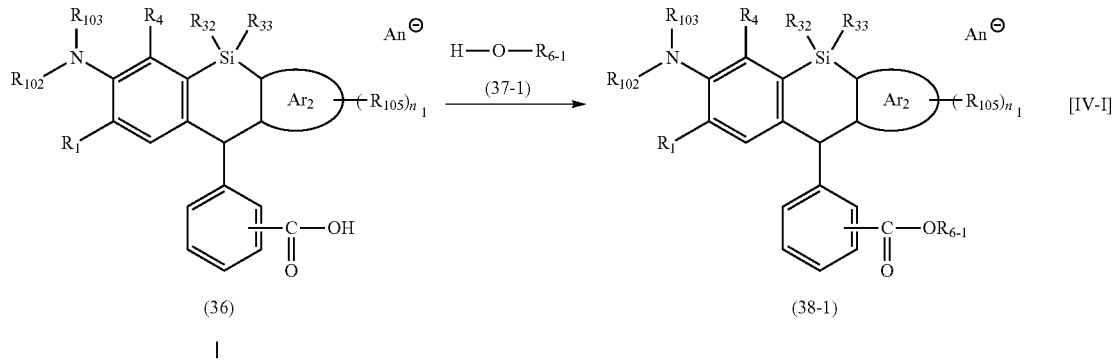

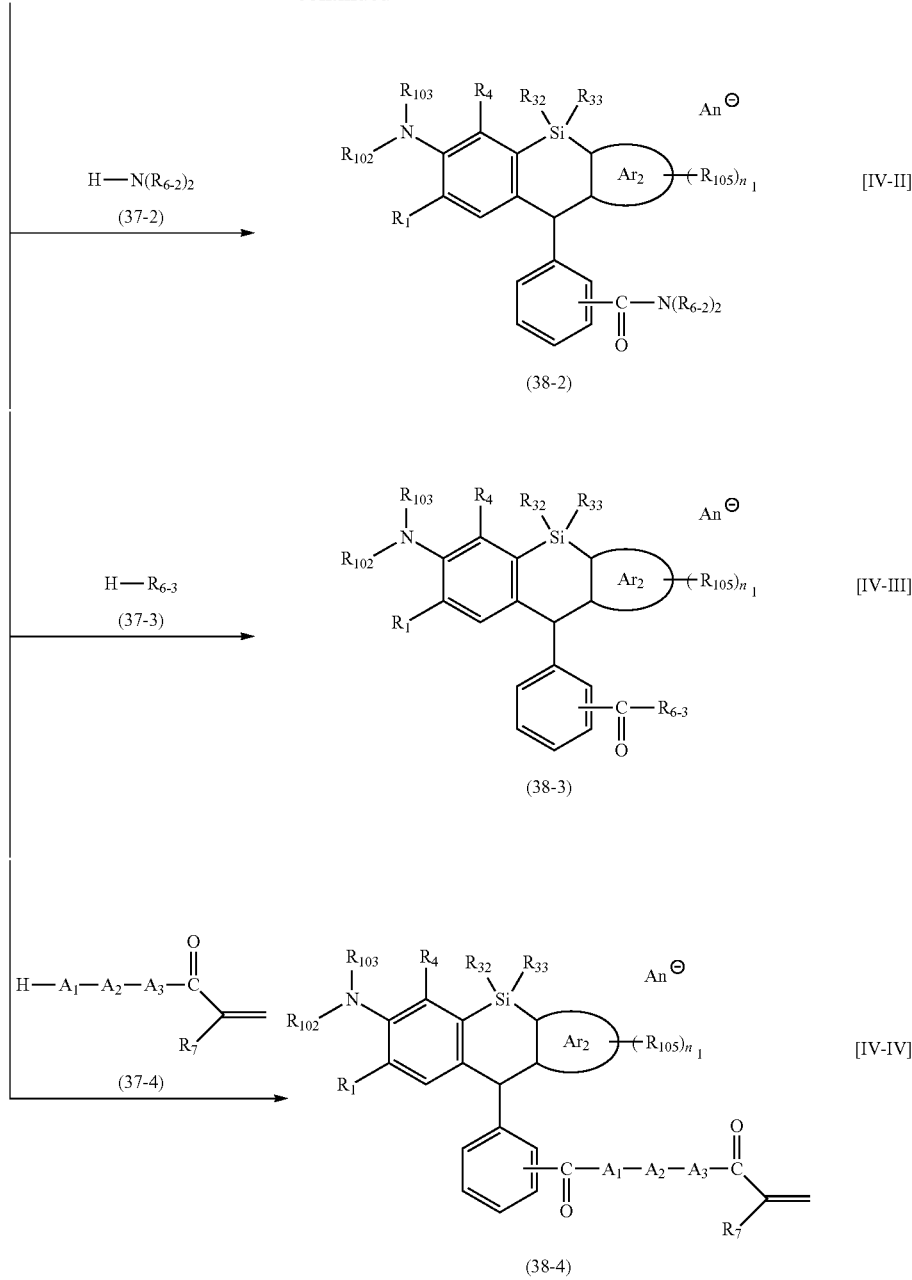

(In the formulae, $R_{6-1}$ represents an alkyl group having 1 to 20 carbon atoms, two $R_{6-2}$'s each independently represent a hydrogen atom, an alkyl group having 1 to 20 carbon atoms, or a halogenated alkyl group having 1 to 20 carbon atoms, $R_{6-3}$ represents a heterocyclic amino group, and $R_1$, $R_{32}$, $R_{33}$, $R_{102}$, $R_{103}$, $R_4$, $n_1$ pieces of $R_{105}$, $R_7$, $A_1$ to $A_3$, $An^-$, $Ar_2$, and $n_1$ are the same as $R_1$, $R_{32}$, $R_{33}$, $R_{102}$, $R_{103}$, $R_4$, $n_1$ pieces of $R_{105}$, $R_7$, $A_1$ to $A_3$, $An^-$, $Ar_2$, and $n_1$ described above.)

Examples of the alkyl group having 1 to 20 carbon atoms represented by $R_{6-1}$ in the general formula (37-1) are the same as the examples of the alkyl group having 1 to 20 carbon atoms represented by $R_5$ in the general formula (1), and preferred examples thereof are also the same.

As the compound represented by the general formula (37-1), commercial products may be used. Examples thereof include methanol, ethanol, 1-propanol, 2-propanol, and the like.

Examples of the alkyl group having 1 to 20 carbon atoms represented by $R_{6-2}$ in the general formula (37-2) are the same as the examples of the alkyl group having 1 to 20 carbon atoms represented by $R_5$ in the general formula (1), and preferred examples thereof are also the same.

Examples of the halogenated alkyl group having 1 to 20 carbon atoms represented by $R_{6-2}$ in the general formula (37-2) are the same as the examples of the halogenated alkyl group having 1 to 20 carbon atoms as the substituent of the amino group which has a substituent represented by $R_5$ in the general formula (1), and preferred examples thereof are also the same.

As $R_{6-2}$ in the general formula (37-2), a hydrogen atom and an alkyl group having 1 to 20 carbon atoms are preferable, the hydrogen atom and an alkyl group having 1 to 12 carbon atoms are more preferable, an alkyl group having 1 to 6 carbon atoms is even more preferable, and an alkyl group having 1 to 3 carbon atoms is particularly preferable. Specifically, examples of $R_{6-2}$ include a methyl group, an ethyl group, a n-propyl group, an isopropyl group, and the like.

As the compound represented by the general formula (37-2), commercial products or compounds appropriately synthesized by known methods may be used. Specifically, examples thereof include ammonia, trifluoromethylamine, pentafluoroethylamine, heptafluoropropylamine, methylamine, ethylamine, n-propylamine, isopropylamine, dimethylamine, diethylamine, di(n-propyl)amine, N-ethylmethylamine, N-ethylpropylamine, N-methylpropylamine, and the like.

Examples of the heterocyclic amino group represented by $R_{6-3}$ in the general formula (37-3) are the same as the examples of the heterocyclic amino group represented by $R_6$ in the general formula (1), and preferred examples thereof are also the same.

As the compound represented by the general formula (37-3), commercial products or compounds appropriately synthesized by known methods may be used. Specifically, examples thereof include pyrrolidine, pyrrole, pyrazole, imidazole, oxazole, thiazole, piperidine, piperazine, morpholine, pyridine, pyridazine, pyrimidine, pyrazine, and the like. Among these, the pyrrolidine, the pyrrole, the piperidine, and the pyridine are preferable, and the piperidine is more preferable.

As the compound represented by the general formula (37-4), commercial products or compounds appropriately synthesized by known methods may be used. Specifically, examples thereof include compounds shown below.

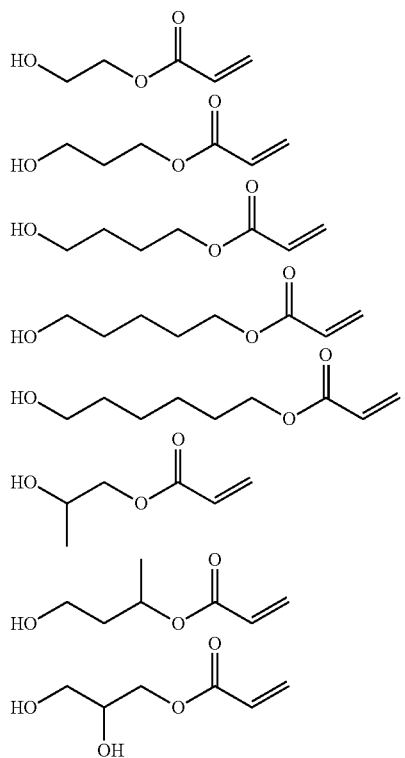

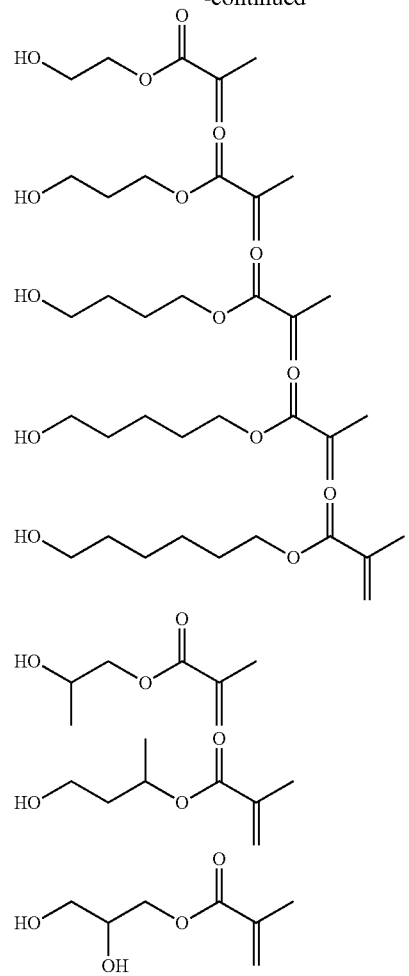

In the reaction [IV-I], the compound represented by the general formula (36) and the compound represented by the general formula (37-1) may be allowed to react with each other in a solvent in the presence of a dehydrocondensation agent, generally at a temperature of 10° C. to 150° C. and preferably at a temperature of 20° C. to 100° C. generally for 1 to 50 hours and preferably for 5 to 40 hours.

The amount of the compound represented by the general formula (37-1) used is generally 100% to 5,000% and preferably 100% to 1,500% of the weight of the compound represented by the general formula (36).

In the reaction [IV-II], the compound represented by the general formula (36) and the compound represented by the general formula (37-2) may be allowed to react with each other in a solvent in the presence of a dehydrocondensation agent, generally at a temperature of 0° C. to 150° C. and preferably at a temperature of 10° C. to 80° C. generally for 1 to 24 hours and preferably for 3 to 18 hours.

The amount of the compound represented by the general formula (37-2) used is generally 1 to 20 equivalents and preferably 1 to 5 equivalents with respect to the mol number of the compound represented by the general formula (36).

In the reaction [IV-III], the compound represented by the general formula (36) and the compound represented by the general formula (37-3) may be allowed to react with each other in a solvent in the presence of a dehydrocondensation agent, generally at a temperature of 0° C. to 150° C. and preferably at a temperature of 10° C. to 80° C. generally for 1 to 24 hours and preferably for 2 to 18 hours.

The amount of the compound represented by the general formula (37-3) used is generally 1 to 20 equivalents and preferably 1 to 5 equivalents with respect to the mol number of the compound represented by the general formula (36).

In the reaction [IV-IV], the compound represented by the general formula (36) and the compound represented by the general formula (37-4) may be allowed to react with each other in a solvent in the presence of a dehydrocondensation agent, generally at a temperature of 0° C. to 150° C. and preferably at a temperature of 10° C. to 80° C. generally for 1 to 24 hours and preferably for 2 to 18 hours.

The amount of the compound represented by the general formula (37-4) used is generally 1 to 20 equivalents and preferably 1 to 5 equivalents with respect to the mol number of the compound represented by the general formula (36).

Examples of the solvent used in the reactions [IV-I] to [IV-IV] are the same as the examples of the solvent used in the reaction [II-I] and the reaction [II-II]. Among these, ethers, halogenated hydrocarbons, and hydrocarbons are preferable, and tetrahydrofuran, dichloromethane, and toluene are more preferable. One kind of these solvents may be used singly, or two or more kinds of these solvents may be used by being appropriately combined. The amount of the reaction solvent used is generally 100% to 5,000% and preferably 200% to 1,500% of the total weight of the compound represented by the general formula (36) and the compound represented by the general formula (37-1), (37-2), (37-3), or (37-4).

The dehydrocondensation agent used in the reactions [IV-I] to [IV-IV] is not limited as long as it is a generally used dehydrocondensation agent. Examples thereof include inorganic dehydration agents such as diphosphorus pentoxide and anhydrous zinc chloride; carbodiimides such as dicyclohexyl carbodiimide, diisopropyl carbodiimide, and 1-ethyl-3-(3-dimethylaminopropylcarbodiimide)hydrochloride; polyphosphoric acid, acetic anhydride, sulfuric acid, carbonyl diimidazole, p-toluenesulfonic acid, and the like. Among these, the carbodiimides are preferable. The amount of the dehydrocondensation agent used is generally 1 to 20 equivalents and preferably 1 to 10 equivalents with respect to the mol number of the compound represented by the general formula (36). In the reactions [IV-I] to [IV-IV], in order to improve the efficiency of the dehydrocondensation agent, a catalyst such as dimethylaminopyridine may be used. The amount of the catalyst used is generally 0.1 to 10 equivalents with respect to the mol number of the compound represented by the general formula (36).

Examples of the method for manufacturing the compound represented by the general formula (1), in which functional groups ($R_2$, $R_3$, $n_1$ pieces of $R_5$, and/or $R_{31}$) other than $R_6$ have a group having a polymerizable unsaturated group, include a method of reacting compounds represented by the general formulae (36), (36'), and (38-1) to (38-4) (hereinafter, simply described as a compound having a hydroxy terminal in some cases), in which $R_{102}$, $R_{103}$, $n_1$ pieces of $R_{105}$, and/or $R_{131}$ each represent a group represented by the following general formula (2-5) or (2-6), with acryloyl chloride, methacryloyl chloride, acrylic anhydride, or methacrylic anhydride so as to manufacture the compound represented by the general formula (2) that has a group having a polymerizable unsaturated group.

-$A_1$-$A_2$-OH       (2-5)

$A_2$-OH       (2-6)

(In the formulae, $A_1$ and $A_2$ are the same as $A_1$ and $A_2$ described above.)

Specific examples of the group represented by the general formula (2-5) include the following groups.

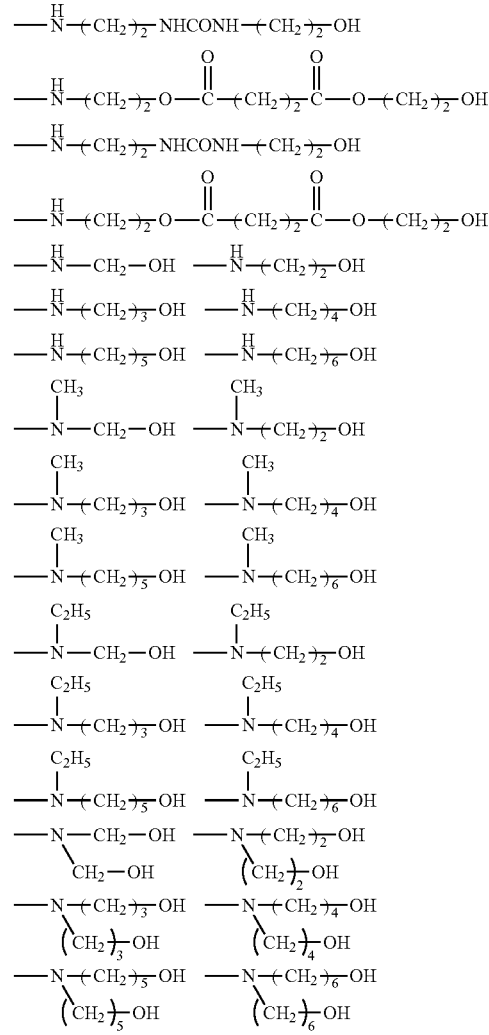

Among the specific examples, the following groups are preferable.

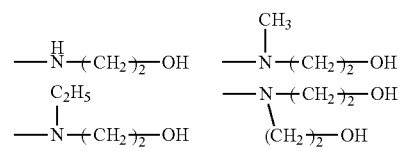

Specific examples of the group represented by the general formula (2-6) include the following groups.

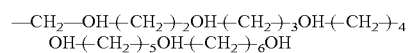

In the manufacturing method, the compound having a hydroxy terminal and acryloyl chloride, methacryloyl chloride, acrylic anhydride, or methacrylic anhydride may be allowed to react with each other in a solvent in the presence of a polymerization inhibitor which is used if necessary, generally at a temperature of 0° C. to 80° C. and preferably at a temperature of 10° C. to 50° C. generally for 1 to 72 hours and preferably for 2 to 48 hours.

Examples of the solvent in the manufacturing method include acetonitrile, tetrahydrofuran, dioxane, N,N-dimethylformamide, methylene chloride, chloroform, methacrylic acid, acrylic acid, and the like. One kind of these solvents may be used singly, or two or more kinds of these solvents may be used by being appropriately combined. The amount of the reaction solvent used is generally 100% to 5,000% and preferably 100% to 2,000% of the total volume of the reaction between the compound having a hydroxy terminal and the methacrylic anhydride or the acrylic anhydride.

The amount of the acryloyl chloride, the methacryloyl chloride, the acrylic anhydride, or the methacrylic anhydride used is generally 1 to 20 equivalents and preferably 1 to 10 equivalents with respect to the mol number of the compound having a hydroxy terminal.

In the manufacturing method, in a case where the acryloyl chloride or the acrylic anhydride is used, the hydroxy terminal in the compound having a hydroxy terminal becomes an acryloyl group. In addition, in the manufacturing method, in a case where the methacryloyl chloride or the methacrylic anhydride is used, the hydroxy terminal in the compound having a hydroxy terminal becomes a methacryloyl group.

Examples of the polymerization inhibitor in the manufacturing method include p-methoxyphenol and the like.

The compound having a hydroxy terminal in the manufacturing method can be manufactured by using compounds represented by the following general formulae (40-1) to (40-3) instead of the compound represented by the general formula (31), by using a compound represented by the following general formula (40-4) instead of the compound represented by the general formula (32), or by using a compound represented by the following general formula (40-5) instead of the compound represented by the general formula (39), in the reactions [I] to [IV-IV] or [I'] to [III'].

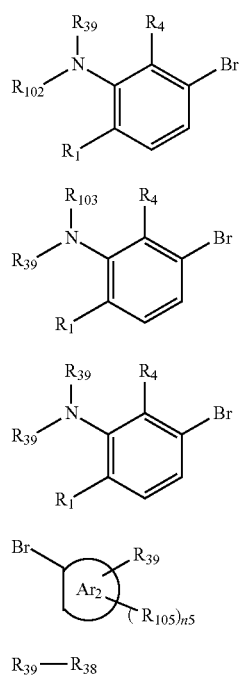

{In the formulae, $R_{39}$ represents the group represented by the general formula (2-5) or (2-6), and $R_1$, $R_{102}$, $R_{103}$, $R_4$, $n_5$ pieces of $R_{105}$, $R_{38}$, and $n_5$ are the same as $R_1$, $R_{102}$, $R_{103}$, $R_4$, $n_5$ pieces of $R_{105}$, $R_{38}$, and $n_5$ described above.}

In the general formulae (40-1) to (40-3) and (40-5), $R_{39}$ is preferably the group represented by the general formula (2-6).

In the general formula (40-4), $R_{39}$ is preferably the group represented by the general formula (2-5).

Specific examples of the compounds represented by the general formulae (40-1) to (40-4) include the following compounds. As the compounds represented by the general formulae (40-1) to (40-4), commercial products or compounds appropriately synthesized by known methods may be used.

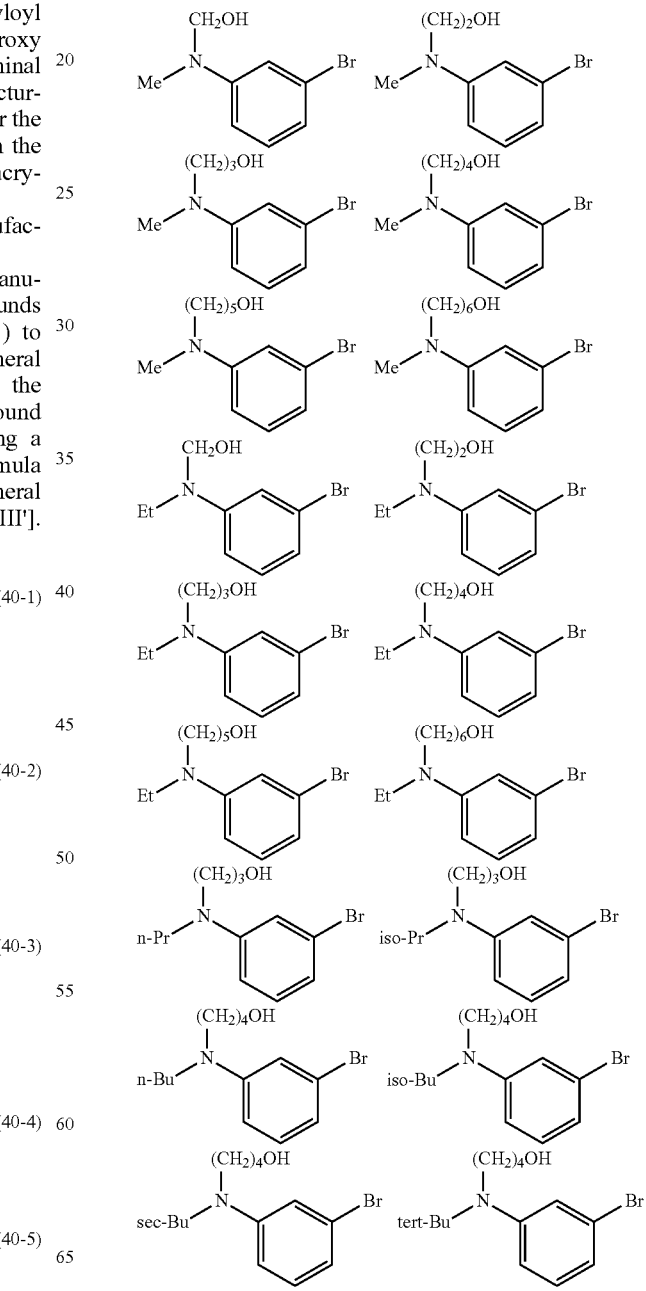

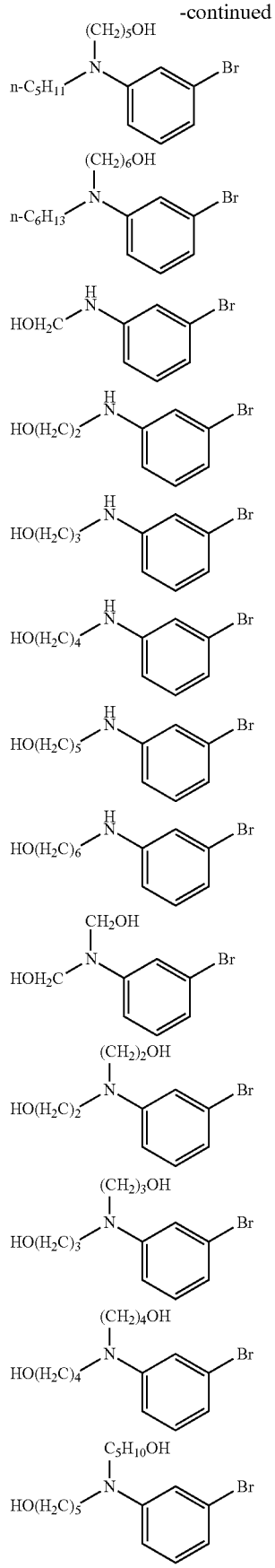

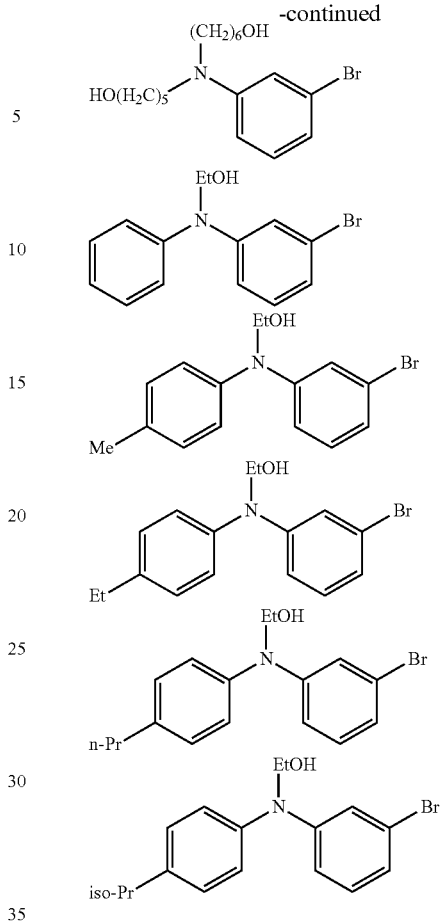

Specific examples of the compound represented by the general formula (40-5) include fluoromethanol, fluoroethanol, 1-fluoropropanol, 2-fluoropropanol, chloromethanol, chloroethanol, 1-chloropropanol, 2-chloropropanol, bromomethanol, bromoethanol, 1-bromopropanol, 2-bromopropanol, iodomethanol, iodoethanol, 1-iodopropanol, 2-iodopropanol, and the like. As the compound represented by the general formula (40-5), commercial products or compounds appropriately synthesized by known methods may be used.

The reaction for obtaining the compound having a hydroxy terminal may be performed under the same reaction conditions (the reaction solvent, the reaction temperature, the reaction time, and the amount of each compound used) as those in the reactions [I] to [IV-IV] or [I'] to [III'], except that the compounds represented by the general formulae (40-1) to (40-5) are used.

The pressure at the time of each of the reactions relating to the method for manufacturing the quencher of the present invention is not particularly limited as long as the series of reactions can be smoothly performed. For example, the reactions may be performed under normal pressure.

If necessary, the reactants and the products obtained after each of the reactions relating to the method for manufacturing the quencher of the present invention may be isolated by general post-treatment operations or purification operations that are usually carried out in the field of the related art. Specifically, for example, the obtained reactants and products may be isolated by performing filtration, washing, extraction, concentration under reduced pressure, recrystallization, distillation, column chromatography, and the like.

Compound of Present Invention

The compound of the present invention is the compound represented by the general formula (3) described in the section of Quencher of present invention. Specific examples of each of the functional groups and preferred scopes thereof are the same as those described above in the section of Quencher of present invention.

As the compound of the present invention, among the compounds represented by the general formula (3), the compound represented by the general formula (3-1) is preferable, the compound represented by the general formula (3-2) is more preferable, the compound represented by the general formula (3-3) is even more preferable, the compound represented by the general formula (3-4) is still more preferable, and the compound represented by the general formula (3-5) is particularly preferable.

The compound of the present invention exerts a quenching effect on fluorescent compounds, less undergoes heating-induced fading, and has a high heat resistant effect. Therefore, the compound of the present invention can be used as a quencher. In addition, the compound of the present invention can be directly used as a dye.

Method for Manufacturing Compound of Present Invention

Among the compounds of the present invention, for example, the compound represented by the general formula (3) in which functional groups ($R_2$, $R_3$, $n_1$ pieces of $R_5$, and $R_{31}$) other than $R_6$ do not have a group having a polymerizable unsaturated group, $R_6$ is a group having a polymerizable unsaturated group represented by the general formula (2), and $Ar_1$ is a ring structure represented by the general formula (1-1) {compound represented by the general formula (38-4)} can be manufactured by the same methods as the series of methods represented by the reactions [I] to [III] and [IV-IV] in the aforementioned method for manufacturing the quencher of the present invention.

In addition, among the compounds of the present invention, the compound represented by the general formula (3) in which functional groups ($R_2$, $R_3$, $n_1$ pieces of $R_5$, and $R_{31}$) other than $R_6$ are groups each having a polymerizable unsaturated group can be manufactured by the same method as the method for manufacturing the compound represented by the general formula (2) that has a group having a polymerizable unsaturated group by means of reacting the compound having a hydroxy terminal with the acryloyl chloride, the methacryloyl chloride, the acrylic anhydride, or the methacrylic anhydride in the method for manufacturing the quencher of the present invention.

Polymer of Present Invention

The polymer of the present invention is a polymer having a monomer unit derived from the compound of the present invention.

The weight-average molecular weight (Mw) of the polymer of the present invention is generally 2,000 to 100,000, preferably 2,000 to 50,000, and more preferably 2,000 to 30,000. In addition, the dispersity (Mw/Mn) of the polymer of the present invention is generally 1.00 to 5.00, and preferably 1.00 to 3.00.

The polymer of the present invention may be a homopolymer or a copolymer as long as it has a monomer unit derived from the compound of the present invention. It is preferable that the polymer of the present invention is a copolymer because it has a high heat resistant effect.

Examples of the copolymer include a copolymer comprises, as constituent components, the monomer unit derived from the compound represented by the general formula (3) and a monomer unit derived from a fluorescent dye having a polymerizable unsaturated group and/or 1 or 2 kinds of monomer unit derived from a compound represented by the following general formula (4), general formula (5), general formula (6), or general formula (7) (hereinafter, the copolymer will be simply described as copolymer of the present invention in some cases).

(4)

[In the formula, $R_{11}$ represents a hydrogen atom or a methyl group, $R_{12}$ represents a hydrogen atom, an alkyl group having 1 to 20 carbon atoms, a hydroxyalkyl group having 1 to 10 carbon atoms, an aryl group having 6 to 10 carbon atoms, an arylalkyl group having 7 to 13 carbon atoms, an alkoxyalkyl group having 2 to 9 carbon atoms, an alkoxyalkoxyalkyl group having 3 to 9 carbon atoms, an aryloxyalkyl group having 7 to 13 carbon atoms, a morpholinoalkyl group having 5 to 7 carbon atoms, a trialkylsilyl group having 3 to 9 carbon atoms, an alicyclic hydrocarbon group having 6 to 12 carbon atoms that has an oxygen atom, a dialkylaminoalkyl group having 3 to 9 carbon atoms, a fluoroalkyl group having 1 to 18 carbon atoms, a N-alkylenephthalimide group having 9 to 14 carbon atoms, a group represented by the following general formula (4-1)

(4-1)

(in the formula, q pieces of $R_{21}$ each independently represent an alkylene group having 1 to 3 carbon atoms that has a hydroxy group as a substituent or is unsubstituted, $R_{22}$ represents a phenyl group which has a hydroxy group as a substituent or is unsubstituted or represents an alkyl group having 1 to 3 carbon atoms, and q represents an integer of 1 to 3), a group represented by the following general formula (4-2)

(4-2)

(in the formula, $R_{23}$ to $R_{25}$ each independently represent an alkyl group having 1 to 3 carbon atoms, and $R_{26}$ represents an alkylene group having 1 to 3 carbon atoms), or a group represented by the following general formula (4-3)

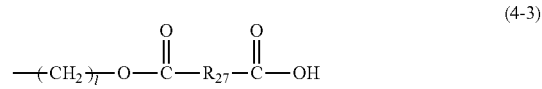

(4-3)

(in the formula, $R_{27}$ represents a phenylene group or a cyclohexylene group, and l represents an integer of 1 to 6).],

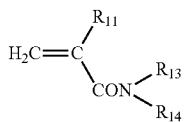

(5)

(in the formula, $R_{13}$ represents a hydrogen atom or an alkyl group having 1 to 3 carbon atoms, $R_{14}$ represents a hydrogen atom, an alkyl group having 1 to 3 carbon atoms, a dialkylaminoalkyl group having 3 to 9 carbon atoms, or a hydroxyalkyl group having 1 to 10 carbon atoms, and $R_{11}$ is the same as $R_{11}$ described above. $R_{13}$ and $R_{14}$ may form a morpholino group together with a nitrogen atom adjacent thereto.),

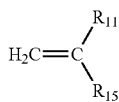

(6)

(in the formula, $R_{15}$ represents a phenyl group or a pyrrolidino group, and $R_{11}$ is the same as $R_{11}$ described above.),

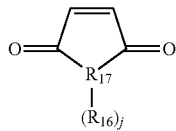

(7)

(in the formula, $R_{17}$ represents a nitrogen atom or an oxygen atom, $R_{16}$ represents a hydrogen atom, an alkyl group having 1 to 20 carbon atoms, a hydroxyalkyl group having 1 to 10 carbon atoms, a halogenated alkyl group having 1 to 10 carbon atoms, an aryl group having 6 to 10 carbon atoms, or an aryl group having 6 to 10 carbon atoms that has a halogeno group or an alkyl group having 1 to 6 carbon atoms as a substituent, and j represents 0 in a case where $R_{17}$ is an oxygen atom and represents 1 in a case where $R_{17}$ is a nitrogen atom.)

The monomer unit derived from a fluorescent dye having a polymerizable unsaturated group is not limited as long as it is a monomer unit derived from the polymerizable compound to be quenched, that is, a monomer unit which has a polymerizable unsaturated group, is derived from a fluorescent compound, and can form a copolymer by being polymerized with the compound represented by the general formula (3).

Specific examples of the polymerizable unsaturated group include an acryloyl group, a methacryloyl group, a vinylaryl group, a vinyloxy group, an allyl group, and the like.

Examples of the fluorescent dye having a polymerizable unsaturated group are the same as those exemplified above as the polymerizable compound to be quenched, and preferred examples thereof are also the same.

The fluorescent dye having a polymerizable unsaturated group may be those described in JP1993-271567A (JP-H05-271567A), JP1997-272814A (JP-H09-272814A), JP2001-011336A, JP2013-045088A, WO2014/126167A, WO2015/098999A, WO2015/133578A, WO2015/147285A, WO2015/182680A, and the like or may be commercial products, for example.

As $R_{11}$ in the general formula (4), a methyl group is preferable.

Examples of the alkyl group having 1 to 20 carbon atoms represented by $R_{12}$ in the general formula (4) and $R_{16}$ in the general formula (7) are the same as the examples of the alkyl group having 1 to 20 carbon atoms represented by $R_5$ in the general formula (1), and preferred examples thereof are also the same.

Examples of the hydroxyalkyl group having 1 to 10 carbon atoms represented by $R_{12}$ in the general formula (4), $R_{14}$ in the general formula (5), and $R_{16}$ in the general formula (7) include a hydroxymethyl group, a hydroxyethyl group, a hydroxypropyl group, a hydroxybutyl group, a hydroxypentyl group, a hydroxyhexyl group, a hydroxyheptyl group, a hydroxyoctyl group, a hydroxynonyl group, a hydroxydecyl group, and the like.

Examples of the aryl group having 6 to 10 carbon atoms represented by $R_{12}$ in the general formula (4) and $R_{16}$ in the general formula (7) include a phenyl group, a naphthyl group, and the like.

Examples of the arylalkyl group having 7 to 13 carbon atoms represented by $R_{12}$ in the general formula (4) include a benzyl group, a phenylethyl group, a phenylpropyl group, a naphthylmethyl group, a naphthylethyl group, a naphthylpropyl group, and the like. Among these, the benzyl group is preferable.

Examples of the alkoxyalkyl group having 2 to 9 carbon atoms represented by $R_{12}$ in the general formula (4) include a methoxymethyl group, a methoxyethyl group, a methoxypropyl group, a methoxybutyl group, a methoxypentyl group, a methoxyhexyl group, a methoxyheptyl group, a methoxyoctyl group, an ethoxymethyl group, an ethoxyethyl group, an ethoxypropyl group, an ethoxybutyl group, an ethoxypentyl group, an ethoxyhexyl group, an ethoxyheptyl group, a propoxymethyl group, a propoxyethyl group, a propoxypropyl group, a propoxybutyl group, a propoxypentyl group, a propoxyhexyl group, and the like.

Examples of the alkoxyalkoxyalkyl group having 3 to 9 carbon atoms represented by $R_{12}$ in the general formula (4) include a methoxymethoxymethyl group, a methoxymethoxyethyl group, a methoxymethoxypropyl group, an ethoxymethoxymethyl group, an ethoxymethoxyethyl group, an ethoxymethoxypropyl group, a propoxymethoxymethyl group, a propoxymethoxyethyl group, a propoxymethoxypropyl group, an ethoxyethoxymethyl group, an ethoxyethoxyethyl group, an ethoxyethoxypropyl group, a propoxyethoxymethyl group, a propoxyethoxyethyl group, a propoxyethoxypropyl group, a propoxypropoxymethyl group, a propoxypropoxyethyl group, a propoxypropoxypropyl group, and the like.

Examples of the aryloxyalkyl group having 7 to 13 carbon atoms represented by $R_{12}$ in the general formula (4) include a phenoxymethyl group, a phenoxyethyl group, a phenoxypropyl group, a naphthyloxymethyl group, a naphthyloxyethyl group, a naphthyloxypropyl group, and the like.

Examples of the morpholinoalkyl group having 5 to 7 carbon atoms represented by $R_{12}$ in the general formula (4) include a morpholinomethyl group, a morpholinoethyl group, a morpholinopropyl group, and the like.

Examples of the trialkylsilyl group having 3 to 9 carbon atoms represented by $R_{12}$ in the general formula (4) include a trimethylsilyl group, a triethylsilyl group, a tripropylsilyl group, a dimethylethylsilyl group, a diethylmethylsilyl group, and the like.

Examples of the alicyclic hydrocarbon group having 6 to 12 carbon atoms that has an oxygen atom represented by $R_{12}$ in the general formula (4) include a dicyclopentenyloxyethyl group, and the like.

Examples of the dialkylaminoalkyl group having 3 to 9 carbon atoms represented by $R_{12}$ in the general formula (4) and $R_{14}$ in the general formula (5) include a N,N-dimethylaminomethyl group, a N,N-dimethylaminoethyl group, a N,N-dimethylaminopropyl group, a N,N-diethylaminomethyl group, a N,N-diethylaminoethyl group, a N,N-diethylaminopropyl group, a N,N-dipropylaminomethyl group, a N,N-dipropylaminoethyl group, a N,N-dipropylaminopropyl group, and the like.

Examples of the fluoroalkyl group having 1 to 18 carbon atoms represented by $R_{12}$ in the general formula (4) include a 2,2,2-trifluoroethyl group, a 2,2,3,3-trifluoropropyl group, a 2,2,3,3,4,4-hexafluorobutyl group, a 2,2,3,3,4,4,5,5-octafluoropentyl group, 3,3,4,4,5,5,6,6,7,7,8,8,9,9,10,10,10-heptadecafluorodecyl group, a 2-(heptadecafluorooctyl) ethyl group, and the like.

Examples of the N-alkylenephthalimide group having 9 to 14 carbon atoms represented by $R_{12}$ in the general formula (4) include a 2-phthalimidoethyl group, a 2-tetrahydrophthalimidoethyl group, and the like.

Examples of the alkylene group having 1 to 3 carbon atoms that has a hydroxy group as a substituent or is unsubstituted represented by $R_{21}$ in the general formula (4-1) include a methylene group, an ethylene group, a trimethylene group, a hydroxymethylene group, a hydroxyethylene group, a 1-hydroxytrimethylene group, a 2-hydroxytrimethylene group, and the like. Among these, the ethylene group, the trimethylene group, and the 2-hydroxytrimethylene group are preferable.

Examples of the phenyl group which has a hydroxy group as a substituent or is unsubstituted represented by $R_{22}$ in the general formula (4-1) include a hydroxyphenyl group, a phenyl group, and the like.

Examples of the alkyl group having 1 to 3 carbon atoms represented by $R_{22}$ in the general formula (4-1), $R_{23}$ to $R_{25}$ in the general formula (4-2), and $R_{13}$ and $R_{14}$ in the general formula (5) include a methyl group, an ethyl group, a n-propyl group, an isopropyl group, and the like.

Specific examples of the group represented by the general formula (4-1) include a (4-hydroxyphenoxy)methyl group, a (4-hydroxyphenoxy)ethyl group, a (4-hydroxyphenoxy)propyl group, a 1-hydroxy-1-phenoxymethyl group, a 1-hydroxy-2-phenoxyethyl group, a 2-hydroxy-3-phenoxypropyl group, a methyl trimethylene glycol group, a methyl triethylene glycol group, a methyl tripropylene glycol group, and the like. Among these, the (4-hydroxyphenoxy)propyl group, the 2-hydroxy-3-phenoxypropyl group, the methyl tripropylene glycol group, and the methyl triethylene glycol group are preferable.

Examples of the alkylene group having 1 to 3 carbon atoms represented by $R_{26}$ of the general formula (8) include a methylene group, an ethylene group, a trimethylene group, and the like.

Specific examples of the group represented by the general formula (4-2) include a trimethylammonium methyl group, a trimethylammonium ethyl group, a triethylammonium methyl group, a triethylammonium ethyl group, and the like.

Preferred specific examples of the group represented by the general formula (4-3) include the following groups.

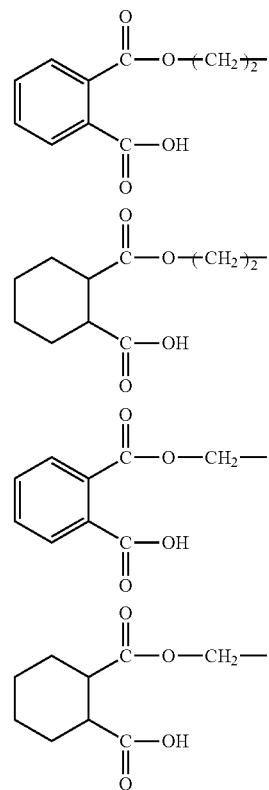

As $R_{12}$ in the general formula (4), a hydrogen atom, an alkyl group having 1 to 20 carbon atoms, a hydroxyalkyl group having 1 to 10 carbon atoms, an aryl group having 6 to 10 carbon atoms, an arylalkyl group having 7 to 13 carbon atoms, an alkoxyalkyl group having 2 to 9 carbon atoms, an aryloxyalkyl group having 7 to 13 carbon atoms, the group represented by the general formula (4-1), and the group represented by the general formula (4-3) are preferable. Among these, the hydrogen atom, the alkyl group having 1 to 20 carbon atoms, the hydroxyalkyl group having 1 to 10 carbon atoms, the aryl group having 6 to 10 carbon atoms, the arylalkyl group having 7 to 13 carbon atoms, and the alkoxyalkyl group having 2 to 9 carbon atoms are more preferable, the hydrogen atom, the alkyl group having 1 to 12 carbon atoms, and the arylalkyl group having 7 to 13 carbon atoms are even more preferable, and the alkyl group having 1 to 4 carbon atoms is particularly preferable.

Preferred specific examples of the general formula (4) include an acrylic acid, benzyl acrylate, a methacrylic acid, benzyl methacrylate, hydroxyethyl methacrylate, methyl methacrylate, and the like. Among these, the methacrylic acid, the benzyl acrylate, and the methyl methacrylate are preferable, and the methyl methacrylate is more preferable.

Preferred specific examples of the general formula (5) include acrylamide, methacrylamide, N,N-dimethylacrylamide, N,N-dimethylmethacrylamide, N,N-diethylacrylamide, N,N-diethylmethacrylamide, hydroxyethylacrylamide, hydroxyethylmethacrylamide, 4-acryloylmorpholine, 4-methacryloylorpholine, and the like. Among these, the acrylamide, the methacrylamide, the N,N-dimethylacrylamide, and the N,N-diethylacrylamide are preferable, and the N,N-diethylacrylamide is more preferable.

Preferred specific examples of the general formula (6) include styrene, α-methylstyrene, N-vinylpyrrolidone, and the like. Among these, the styrene and the α-methylstyrene are preferable, and the styrene is more preferable.

Examples of the halogenated alkyl group having 1 to 10 carbon atoms represented by $R_{16}$ in the general formula (7) include a chloromethyl group, a chloroethyl group, a chloro-n-propyl group, a chloroisopropyl group, a chloro-n-butyl group, a chloro-tert-butyl group, a chloro-n-pentyl group, a chloro-n-hexyl group, a chloro-n-heptyl group, a chloro-n-octyl group, a chloro-n-nonyl group, a chloro-n-decyl group, a chlorocyclohexyl group, a chlorocycloheptyl group, a fluoromethyl group, a fluoroethyl group, a fluoro-n-propyl group, a fluoroisopropyl group, a fluoro-n-butyl group, a fluoro-tert-butyl group, a fluoro-n-pentyl group, a fluoro-n-hexyl group, a fluoro-n-heptyl group, a fluoro-n-octyl group, a fluoro-n-nonyl group, a fluoro-n-decyl group, a fluorocyclohexyl group, a fluorocycloheptyl group, and the like.

Examples of the aryl group having 6 to 10 carbon atoms that has a halogeno group or an alkyl group having 1 to 6 carbon atoms as a substituent represented by $R_{16}$ in the general formula (7) include a chlorophenyl group, a fluorophenyl group, a methyl phenyl group, an ethyl phenyl group, a n-propylphenyl group, a n-butylphenyl group, a n-pentylphenyl group, a n-hexylphenyl group, a chloronaphthyl group, a fluoronaphthyl group, a methyl naphthyl group, an ethyl naphthyl group, a n-propylnaphthyl group, and the like.

Preferred specific examples of the general formula (7) include maleic anhydride, maleimide, N-methylmaleimide, N-ethylmaleimide, N-butylmaleimide, N-octylmaleimide, N-dodecylmaleimide, N-(2-ethylhexyl)maleimide, N-(2-hydroxyethyl)maleimide, N-(2-chlorohexyl)maleimide, N-cyclohexylmaleimide, N-(2-methylcyclohexyl)maleimide, N-(2-ethylcyclohexyl)maleimide, N-(2-chlorocyclohexyl)maleimide, N-phenylmaleimide, N-(2-methylphenyl)maleimide, N-(2-ethyphenyl)maleimide, N-(2-chlorophenyl)maleimide, and the like. Among these, the N-phenylmaleimide is preferable.

The copolymer of the present invention may comprise, in addition to the monomer unit, monomer units derived from various dyes. Here, the dyes are different from the compound represented by the general formula (3) and the fluorescent dye having a polymerizable unsaturated group. Specifically, examples of the copolymer of the present invention include combinations of monomer units described in the following table. Among these, the combinations 1, 2, and 6 to 12 are preferable, the combinations 1, 2, and 6 to 9 are more preferable, and the combinations 1, 2, and 6 are particularly preferable. In addition, between the combinations 2 and 6, a combination of the compound represented by the general formula (3) and one kind of compound represented by the general formula (4) is preferable.

| | Compound from which monomer unit is derived | |
|---|---|---|
| Combination 1 | General formula (3) | Fluorescent dye having polymerizable unsaturated group | — |
| Combination 2 | | General formula (4) | — |
| Combination 3 | | General formula (5) | — |
| Combination 4 | | General formula (6) | — |
| Combination 5 | | General formula (7) | — |
| Combination 6 | | Fluorescent dye having polymerizable unsaturated group | General formula (4) |
| Combination 7 | | Fluorescent dye having polymerizable unsaturated group | General formula (5) |
| Combination 8 | | Fluorescent dye having polymerizable unsaturated group | General formula (6) |
| Combination 9 | | Fluorescent dye having polymerizable unsaturated group | General formula (7) |
| Combination 10 | | General formula (4) | General formula (5) |
| Combination 11 | | General formula (4) | General formula (6) |
| Combination 12 | | General formula (4) | General formula (7) |

The weight ratio between the monomer unit derived from the compound represented by the general formula (3) and the monomer unit derived from a fluorescent dye having a polymerizable unsaturated group and/or the monomer unit derived from the compound represented by the general formula (4), the general formula (5), the general formula (6), or the general formula (7) may be appropriately set according to the type of the monomer units used. The proportion of the monomer unit derived from the compound represented by the general formula (3) is generally 1% to 90% by weight and preferably 5% to 85% by weight with respect to the total weight of the obtained polymer.

Preferred specific examples of the copolymer of the present invention include a polymer comprising the monomer unit derived from the compound represented by the general formula (3) and the monomer unit derived from a fluorescent dye having a polymerizable unsaturated group and/or 1 or 2 kinds of the monomer unit derived from a compound represented by the following general formula (4').

(4')

(In the formula, $R'_{12}$ represents a hydrogen atom, an alkyl group having 1 to 20 carbon atoms, a hydroxyalkyl group having 1 to 10 carbon atoms, an aryl group having 6 to 10 carbon atoms, an arylalkyl group having 7 to 13 carbon atoms, or an alkoxyalkyl group having 2 to 9 carbon atoms, and $R_{11}$ is the same as $R_{11}$ described above.)

Specific examples of the alkyl group having 1 to 20 carbon atoms, the hydroxyalkyl group having 1 to 10 carbon atoms, the aryl group having 6 to 10 carbon atoms, the arylalkyl group having 7 to 13 carbon atoms, and the alkoxyalkyl group having 2 to 9 carbon atoms represented by $R'_{12}$ in the general formula (4') are the same as the examples of those represented by $R_{12}$ in the general formula (4).

As $R'_{12}$ in the general formula (4'), a hydrogen atom, an alkyl group having 1 to 12 carbon atoms, and an arylalkyl group having 7 to 13 carbon atoms are preferable, and an alkyl group having 1 to 4 carbon atoms is more preferable.

Preferred specific examples of the general formula (4') include an acrylic acid, benzyl acrylate, a methacrylic acid, benzyl methacrylate, methyl methacrylate, and the like. Among these, the methacrylic acid, the benzyl methacrylate, and the methyl methacrylate are preferable, and the methyl methacrylate is more preferable.

The polymer of the present invention exerts a quenching effect on fluorescent compounds, less undergoes heating-induced fading, and has a high heat resistant effect. In addition, the polymer of the present invention has excellent elution resistance and weather fastness. Therefore, the polymer of the present invention can be used as a quencher. Furthermore, the polymer of the present invention can be directly used as a dye.

In a case where the polymer of the present invention comprises the monomer unit derived from a fluorescent dye having a polymerizable unsaturated group, the compound (monomer) of the present invention comprised in the polymer can inhibit the fluorescence emitted from the fluorescent dye comprised in the polymer in the polymer molecule. That is, the polymer further inhibits the emission of fluorescence compared to a polymer formed only of a fluorescent dye having a polymerizable unsaturated group, and can be more suitably used as a dye.

Even in a case where one kind of polymer of the present invention comprising a fluorescent dye having a polymerizable unsaturated group is used alone, it is possible to obtain the effect which is obtained by mixing together two kinds of polymers including a polymer (polymer 1) comprising a monomer unit derived from the compound of the present invention and a polymer (polymer 2) comprising a monomer unit derived from a fluorescent dye having a polymerizable unsaturated group. That is, for example, in a case where colored pixels of a color filter or the like are formed using the polymer 2, in order to inhibit the emission of fluorescence from the polymer 2, a double-layered filter layer needs to be formed by using two kinds of polymers including the polymer 1 and the polymer 2. In contrast, in a case where the polymer of the present invention comprising a fluorescent dye having a polymerizable unsaturated group is used for forming colored pixels, it is possible to easily form the colored pixels, in which the fluorescence is inhibited as in the double-layered filter layer formed of the polymer 1 and the polymer 2, by using a single-layered filter layer, and the total thickness of the filter layer can be reduced.

It should be noted that in a case where the polymer of the present invention is used as a quencher, examples of the compound to be quenched include those exemplified above in the section of Quencher of present invention. The amount of the polymer of the present invention used, the method of using the polymer of the present invention, and the like may be based on the amount, the method, and the like described above in the section of Quencher of present invention.

Method for Manufacturing Polymer of Present Invention

The polymer of the present invention is manufactured as below, for example. That is, by performing a known polymerization reaction on the compound of the present invention obtained as above, the polymer of the present invention can be obtained. In a case where the polymer of the present invention is a copolymer, the compound represented by the general formula (3) may be mixed with the fluorescent dye having a polymerizable unsaturated group and/or 1 or 2 kinds of the compound represented by the general formula (4), the general formula (5), the general formula (6), or the general formula (7) at the time of the polymerization reaction such that the proportion of the monomer unit derived from each monomer in the finally obtained polymer becomes as described above, and then the mixture may be polymerized.

The polymerization reaction is performed as below, for example. That is, the compound represented by the general formula (3) or the compound represented by the general formula (3) and the fluorescent dye having a polymerizable unsaturated group and/or 1 or 2 kinds of the compound represented by the general formula (4), the general formula (5), the general formula (6), or the general formula (7) are dissolved in an appropriate solvent such as toluene, 1,4-dioxane, tetrahydrofuran, isopropanol, methyl ethyl ketone, or propylene glycol monomethyl ether acetate having a volume which is 100% to 1,000% of the total volume of the compounds. Then, in the presence of a polymerization initiator such as azobisisobutyronitrile, 2,2'-azobis(2,4-dimethylvaleronitrile), 2,2'-azobis(2-methylpropionate), 2,2'-azobis(2-methylbutyronitrile), benzoyl peroxide, or lauroyl peroxide in an amount of 0.01% to 30% by weight with respect to the total amount of the dissolved compounds, a reaction is carried out at a temperature of 50° C. to 150° C. for 1 to 48 hours to perform the polymerization reaction. After the reaction, the reaction product may be treated according to a method generally performed for obtaining a polymer.

Colored Composition 1

As described above, the compound or the polymer of the present invention can be used as a quencher. Furthermore, the compound or the polymer of the present invention can be directly used as a dye. Therefore, a colored composition containing at least one kind of the compound or the polymer of the present invention (hereinafter, simply described as colored composition 1 of the present invention in some cases) is a colored composition which less undergoes heating-induced fading and can form a colored cured film having excellent heat resistance. Accordingly, the colored composition 1 of the present invention can be used for forming colored pixels of color filters used in liquid crystal display (LCD) or a solid-state imaging device (CCD, CMOS, or the like), and can used in printing ink, ink jet ink, paint, and the like. Particularly, the colored composition 1 of the present invention is suitable for color filters of a liquid crystal display. Furthermore, the colored composition 1 of the present invention can be used as a colored resin molded material by being molded into a sheet, a film, a bottle, a cup, and the like by means of molding methods known in the related art. Consequently, the colored composition 1 of the present invention can also be used for eyeglasses, colored contact lenses, and the like. By being made into a multilayer structure with a known resin, the colored composition 1 of the present invention can also be used for the same uses. In addition, for example, the colored composition 1 of the present invention can be used for optical films, hair coloring agents, labeling substances for compounds or biological substances, materials for organic solar cells, and the like. The colored composition 1 of the present invention may contain, in addition to the compound or the polymer of the present invention, additives and the like generally used in the field of the related art, according to the use.

For example, in a case where the colored composition 1 of the present invention is used as a colored resin, the colored composition 1 of the present invention preferably contains at least one or more kinds of the compound or the polymer of the present invention and is preferably mixed with another resin, and more preferably contains one or more kinds of the polymer of the present invention and is more preferably mixed with another resin. Another resin described above is not particularly limited, and examples thereof include a polyolefin resin, a polystyrene resin, a polyester resin, a polyamide resin, a polyurethane resin, a polycarbonate resin, an epoxy resin, an acryl resin, an acrylonitrile resin, and the like. As more specific examples of another resin described above, a homopolymer derived from one kind of compound selected from the fluorescent dye having a polymerizable unsaturated group, the compound represented by the general formula (4), the compound represented by the general formula (5), the compound represented by the general formula (6), and the compound represented by the general formula (7) or a copolymer derived from two or more kinds of compounds selected from the above is preferable, and the homopolymer is more preferable. As the homopolymer, a homopolymer derived from the fluorescent dye having a polymerizable unsaturated group and a homopolymer derived from the compound represented by the general formula (4) are preferable, and the homopolymer derived from the fluorescent dye having a polymerizable unsaturated group and a homopolymer derived from the compound represented by the general formula (4') are more preferable. In addition, in a case where the colored composition 1 of the present invention is mixed with another resin, the mixing ratio may be appropriately set according to the color of the colored resin required. In a case where the colored composition 1 of the present invention is used as a colored resin, the composition may be used by being molded by a known molding method. Furthermore, the colored composition 1 of the present invention may contain, in addition to the compound or the polymer of the present invention and another resin which is used if necessary, additives generally used in the field of the related art, such as a lubricant, an antistatic agent, an anti-ultraviolet agent, an antioxidant, a light stabilizer, a dispersant, a processing stabilizer, a processing aid, an impact resistance enhancer, a filler, a stiffener, a flame retardant, a plasticizer, and a foaming agent, within a range that does not impair the object and the effect of the present invention. In a case where the colored composition 1 of the present invention is used as a colored resin, the dye is hardly eluted even though the resin is brought into contact with a solvent, and the resin has excellent weather fastness.

For example, in a case where the colored composition 1 of the present invention is used for forming colored pixels, the colored composition 1 of the present invention preferably contains at least one or more kinds of the compound or the polymer of the present invention, a polymerization initiator, a binder resin, and a radically polymerizable monomer or oligomer. If necessary, the colored composition 1 of the present invention may contain a pigment, a solvent, a silane coupling agent, a crosslinking agent, and the like. In the colored composition 1 of the present invention, the content of the compound or the polymer of the present invention is 1% to 50% by weight and preferably 5% to 30% by weight with respect to the weight of the colored composition 1 of the present invention. It should be noted that the weight of the colored composition 1 of the present invention means the weight of the solid components except for the solvent. In the present invention, the same is true for the following description.

As the polymerization initiator, it is possible to use a thermal polymerization initiator or a photopolymerization initiator known in the related art that are generally used in the field of the related art. Among these, the photopolymerization initiator is preferable. Specifically, examples thereof include an acetophenone-based photopolymerization initiator such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-2-morpholino(4-thiomethylphenyl)propan-1-one, or 2-benzyl-2-dimethylamino-1-(4-morpholinophenyl)-butanone; a benzoin-based photopolymerization initiator such as benzoin, benzoin isopropyl ether, or benzoin isobutyl ether; an acylphosphine oxide-based photopolymerization initiator such as 2,4,6-trimethylbenzoyldiphenylphosphine oxide; a photopolymerization initiator based on benzyl or methyphenyl glyoxyester; a benzophenone-based photopolymerization initiator such as benzophenone, methyl o-benzoylbenzoate, 4-phenylbenzophenone, 4,4'-dichlorobenzophenone, hydroxybenzophenone, 4-benzoyl-4'-methyl-diphenylsulfide, acrylated benzophenone, 3,3',4,4'-tetra(tert-butylperoxycarbonyl)benzophenone, or 3,3'-dimethyl-4-methoxybenzophenone; a thioxanthone-based photopolymerization initiator such as 2-isopropylthioxanthone, 2,4-dimethylthioxanthone, 2,4-diethylthioxanthone, or 2,4-dichlorothioxanthone; an aminobenzophenone-based photopolymerization initiator such as Michler's ketone or 4,4'-diethylaminobenzophenone; an oxime ester-based photopolymerization initiator such as 1-[4-(phenylthio)phenyl]-1,2-octanedione-2-(o-benzoyloxime) or 1-[6-(2-methylbenzoyl)-9-ethyl-9H-carbazol-3-yl]ethanone-o-acetyloxime; 10-butyl-2-chloroacridone, 2-ethylanthraquinone, 9,10-phenanthrenequinone, camphorquinone, and the like.

The colored composition 1 of the present invention may contain one kind of the polymerization initiator or two or more kinds of the polymerization initiators. The content of the polymerization initiator with respect to the weight of the colored composition 1 of the present invention is 1% to 50% by weight and preferably 5% to 30% by weight.

Examples of the binder resin include an ethylenically unsaturated monomer having at least one carboxy group or hydroxy group, a copolymer of an ethylenically unsaturated monomer and an ethylenically unsaturated monomer having an aromatic hydrocarbon group or an aliphatic hydrocarbon group, a resin formed of the copolymer having an epoxy group on a side chain or a terminal thereof or the like, a resin formed of the copolymer to which acrylate is added, and the like. One kind of these resins may be used singly, or two or more kinds of these resins may be used in combination.

Specific examples of the ethylenically unsaturated monomer having a carboxy group include unsaturated monocarboxylic acids such as an acrylic acid, a methacrylic acid, benzyl methacrylate, a crotonic acid, an c-chloroacrylic acid, an ethacrylic acid, and a cinnamic acid; unsaturated dicarboxylic acids (anhydrides) such as a maleic acid, maleic anhydride, a fumaric acid, an itaconic acid, itaconic anhydride, a citraconic acid, citraconic anhydride, and a mesaconic acid; unsaturated polyvalent carboxylic acids (anhydrides) having a valency equal to or higher than 3, 2-acryloyloxyethylhexahydrophthalic acid, 2-methacryloyloxyethylhexahydrophthalic acid, 2-methacryloyloxyethyl 2-hydroxypropylphthalic acid, 2-acryloyloxyethyl 2-hydroxyethylphthalic acid, and the like.

The content of the binder resin with respect to the weight of the colored composition 1 of the present invention is 10% to 50% by weight, and preferably 20% to 50% by weight.

Examples of the radically polymerizable monomer or oligomer include polyethylene glycol diacrylate (having 2 to 14 ethylene groups), polyethylene glycol dimethacrylate (having 2 to 14 ethylene groups), trimethylolpropane diacrylate, trimethylolpropane dimethacrylate, trimethylolpropane triacrylate, trimethylolpropane trimethacrylate, trimethylolpropane ethoxytriacrylate, trimethylolpropane ethoxytrimethacrylate, trimethylolpropane propoxytriacrylate, trimethylolpropane propoxytrimethacrylate, tetramethylolmethane triacrylate, tetramethylolmethane trimethacrylate, tetramethylolmethane tetraacrylate, tetramethylolmethane tetramethacrylate, polypropylene glycol diacrylate (having 2 to 14 propylene groups), polypropylene glycol dimethacrylate (having 2 to 14 propylene groups), dipentaerythritol pentaacrylate, dipentaerythritol pentamethacrylate, dipentaerythritol hexaacrylate, dipentaerythritol hexamethacrylate, ethoxylated pentaerythritol tetraacrylate (having 40 or less epoxy groups), propoxylated pentaerythritol tetraacrylate (having 40 or less propoxy groups), ethoxylated trimethylolpropane triacrylate (having 40 or less epoxy groups), propoxylated trimethylolpropane triacrylate (having 40 or less propoxy groups), bisphenol A polyoxyethylene diacrylate, bisphenol A polyoxyethylene dimethacrylate, bisphenol A dioxyethylene diacrylate, bisphenol A dioxyethylene dimethacrylate, bisphenol A trioxyethylene diacrylate, bisphenol A trioxyethylene dimethacrylate, bisphenol A decaoxyethylene diacrylate, bisphenol A decaoxyethylene dimethacrylate, ethoxy-modified isocyanurate triacrylate, an esterified compound of a polyvalent carboxylic acid (phthalic anhydride or the like) and a compound having a hydroxy group and an ethylenically unsaturated group (β-hydroxyethylacrylate, β-hydroxyethylmethacrylate, or the like), an alkyl ester of an acrylic acid or a methacrylic acid (an acrylic acid methyl ester, a methacrylic acid methyl ester, an acrylic acid ethyl ester, a methacrylic acid ethyl ester, an acrylic acid butyl ester, a methacrylic acid butyl ester, an acrylic acid 2-ethylhexyl ester, a methacrylic acid 2-ethylhexyl ester, or the like), 2-hydroxyethylacrylate, 2-hydroxyethylmethacrylate, phenoxyethyl acrylate, phenoxyethyl methacrylate, a quaternary chloride by methyl chloride such as N,N-dimethylacrylamide, N,N-dimethylaminoethylacrylate, or N,N-dimethylaminoethylacrylate, a quaternary chloride by methyl chloride such as N,N-dimethylaminopropylacrylamide, acryloyl morpholine, N-isopropylacrylamide, N,N-diethylacrylamide, and the like. Among these, the dipentaerythritol pentaacrylate, the dipentaerythritol pentamethcrylate, the dipentaerythritol hexaacrylate, and the dipentaerythritol hexamethacrylate are preferable, and the dipentaerythritol pentaacrylate and the dipentaerythritol hexaacrylate are more preferable.

The pigment may be a pigment used for preparing a colored pattern of red, blue, or green, and examples thereof include a phthalocyanine-based pigment and the like. Examples of the phthalocyanine-based pigment include those containing magnesium, titanium, iron, cobalt, nickel, copper, zinc, or aluminum as a central metal. Specifically, examples thereof include C. I. Pigment red 1, C. I. Pigment red 2, C. I. Pigment red 5, C. I. Pigment red 17, C. I. Pigment red 31, C. I. Pigment red 32, C. I. Pigment red 41, C. I. Pigment red 122, C. I. Pigment red 123, C. I. Pigment red 144, C. I. Pigment red 149, C. I. Pigment red 166, C. I. Pigment red 168, C. I. Pigment red 170, C. I. Pigment red 171, C. I. Pigment red 175, C. I. Pigment red 176, C. I. Pigment red 177, C. I. Pigment red 178, C. I. Pigment red 179, C. I. Pigment red 180, C. I. Pigment red 185, C. I. Pigment red 187, C. I. Pigment red 202, C. I. Pigment red 206, C. I. Pigment red 207, C. I. Pigment red 209, C. I. Pigment red 214, C. I. Pigment red 220, C. I. Pigment red 221, C. I. Pigment red 224, C. I. Pigment red 242, C. I. Pigment red 243, C. I. Pigment red 254, C. I. Pigment red 255, C. I. Pigment red 262, C. I. Pigment red 264, C. I. Pigment red 272, C. I. Pigment blue 15, C. I. Pigment blue 15:1, C. I. Pigment blue 15:2, C. I. Pigment blue 15:3, C. I. Pigment blue 15:4, C. I. Pigment blue 15:5, C. I. Pigment blue 15:6, C. I. Pigment blue 16, C. I. Pigment blue 17:1, C. I. Pigment blue 75, C. I. Pigment blue 79, C. I. Pigment green 7, C. I. Pigment green 36, C. I. Pigment green 37, C. I. Pigment green 58, chloroalminum phthalocyanine, hydroxyaluminum phthalocyanine, aluminum phthalocyanine oxide, and zinc phthalocyanine.

The content of the pigment with respect to the weight of the colored composition 1 of the present invention is 10% to 50% by weight and preferably 10% to 30% by weight.

In a case where the colored composition 1 of the present invention contains the pigment, it is preferable that the colored composition 1 contains a pigment dispersant. Examples of the pigment dispersant include polyamide amine or a salt thereof, a polycarboxylic acid or a salt thereof, a high-molecular weight unsaturated ester, modified polyurethane, modified polyester, modified polyacrylate, modified polymethacrylate, an acrylic copolymer, a methacrylic copolymer, a nathalene sulfonate formaldehyde condensate, a polyoxyethylene alkyl phosphoric acid ester, polyoxyethylene alkylamine, alkanolamine, and the like. One kind of pigment dispersant may be used singly, or two or more kinds of pigment dispersants may be used in combination. The content of the pigment dispersant with respect to the weight of the pigment is generally 1% to 80% by weight, and preferably 10% to 60% by weight.

The solvent may be appropriately selected according to the components contained in the colored composition 1 of the present invention. Specifically, examples thereof include ethyl acetate, n-butyl acetate, isobutyl acetate, amyl formate, isoamyl acetate, butyl propionate, isopropyl butyrate, ethyl butyrate, butyl butyrate, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, methyl 3-oxypropionate, ethyl 3-oxypropionate, methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, ethyl 2-oxobutanoate, diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether, propylene glycol monomethyl ether acetate, propylene glycol monoethyl ether acetate, propylene glycol monopropyl ether acetate, methyl ethyl ketone, cyclohexanone, 2-heptanone, 3-heptanone, and the like. The amount of the solvent is set such that the concentration of the colored composition 1 of the present invention in the solvent becomes generally 10% to 80% by weight.

The silane coupling agent is used in a case where the colored composition 1 is bonded to a substrate such as glass. As the silane coupling agent, it is possible to use silane coupling agents known in the related art that are generally used in the field of the related art. Examples thereof include silane coupling agents having, as a reactive organic functional group, an epoxy group, a thiol group, a hydroxy group, an amino group, a ureide group, a vinyl group, an acryloyl group, or the like. Specifically, examples thereof include β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, γ-ureidopropyltriethoxysilane, vinyltriethoxysilane, vinyl-tris(β-methoxyethoxy)silane, and γ-methacryloxypropyltrimethoxysilane. The amount of the used silane coupling agent in a reaction solution is generally 0.1% to 10% by weight, and preferably 1% to 5% by weight.

The crosslinking agent is not particularly limited as long as it enables a film to be cured by a crosslinking reaction. Examples thereof include (a) epoxy resin, (b) melamine compound, guanamine compound, glycoluril compound, or urea compound substituted with at least one substituent selected from a methylol group, an alkoxymethyl group, and an acyloxymethyl group, and (c) phenol compound, naphthol compound, or hydroxyanthracene compound substituted with at least one substituent selected from a methylol group, an alkoxymethyl group, and an acyloxymethyl group. Among these, a polyfunctional epoxy resin is preferable.

The content of the crosslinking agent with respect to the weight of the colored composition 1 of the present invention is generally 10% to 50% by weight, and preferably 20% to 50% by weight.

The colored composition 1 of the present invention may contain, in addition to the components described above, a polymerization inhibitor, a surfactant, an additive, and the like. These are not particularly limited as long as they are known, and the amount thereof used is not limited as long as the amount is generally adopted in the field of the related art.

The colored composition 1 of the present invention is prepared by mixing together the above components.

Colored Composition 2

The quencher of the present invention can form a colored composition containing at least one kind of the quencher and at least one kind of compound to be quenched (hereinafter, the composition will be simply described as colored composition 2 of the present invention in some cases). The colored composition 2 of the present invention inhibits the fluorescence emitted from the compound to be quenched. For example, in a case where the colored composition 2 is used as a color filter, the composition can form an excellent colored cured film having high contrast. Therefore, the colored composition 2 of the present invention can be used for forming colored pixels of color filters used in liquid crystal display (LCD) or a solid-state imaging device (CCD, CMOS, or the like), and can used in printing ink, ink jet ink, paint, and the like. Particularly, the colored composition 2 of the present invention is suitable for color filters of a liquid crystal display. Furthermore, the colored composition 2 of the present invention can be used as a colored resin molded material by being molded into a sheet, a film, a bottle, a cup, and the like by means of molding methods known in the related art. Accordingly, the colored composition 2 of the present invention can also be used for eyeglasses, colored contact lenses, and the like. By being made into a multilayer structure with a known resin, the colored composition 2 of the present invention can also be used for the same uses. In addition, for example, the colored composition 2 of the present invention can be used for optical films, hair coloring agents, labeling substances for compounds or biological substances, materials for organic solar cells, and the like.

It is preferable that the colored composition 2 of the present invention contains at least one or more kinds of quenchers of the present invention, at least one or more kinds of compounds to be quenched, a polymerization initiator, a binder resin, and a radically polymerizable monomer or oligomer. If necessary, the colored composition 2 may contain a pigment, a solvent, a silane coupling agent, a crosslinking agent, and the like. In the colored composition 2 of the present invention, the content of the quencher the present invention is 1% to 80% by weight and preferably 10% to 50% by weight with respect to the weight of the colored composition 2 of the present invention. It should be noted that the weight of the colored composition 2 of the present invention means the weight of the solid components except for the solvent.

Examples of the compound to be quenched are the same as those exemplified above in the section of Quencher of present invention.

The content of the compound to be quenched is 1% to 50% by weight and preferably 5% to 30% by weight with respect to the weight of the colored composition 2 of the present invention.

Examples of the polymerization initiator, the binder resin, the radically polymerizable monomer or oligomer, the pigment, the solvent, the silane coupling agent, and the crosslinking agent in the colored composition 2 of the present invention are the same as the examples of those in the colored composition 1 of the present invention, and the content of each of these is also the same.

Hereinafter, the present invention will be more specifically described based on examples, but the present invention is not limited to the examples.

EXAMPLES

Example 1 Synthesis of Carboxylic Acid Substance (Compound 7)

(1) Synthesis of Diethyl Substance (Compound 2)

3-Bromoaniline 33.4 g (194.0 mmol) (compound 1: manufactured by TOKYO CHEMICAL INDUSTRY CO., LTD.) and 200 ml of acetonitrile were put into a round-bottom flask equipped with a stirring device, and dissolved. Furthermore, 136.2 g (873.0 mmol) of ethyl iodide (manufactured by Wako Pure Chemical Industries, Ltd.) and 93.8 g (679.0 mmol) of potassium carbonate (manufactured by Wako Pure Chemical Industries, Ltd.) were added thereto and reacted for 22 hours at 65° C. After the reaction, insoluble matters were removed from the reaction solution by filtration, the solvent was distilled away by concentration under reduced pressure to afford a yellow liquid. The liquid was purified using a silica gel column to afford 42.3 g (yield: 96%) of a diethyl substance (compound 2) as a yellow liquid.

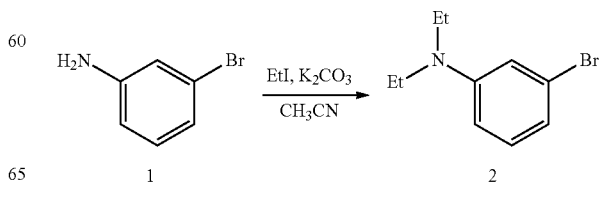

(2) Synthesis of Dibromo Substance (Compound 3)

The diethyl substance (compound 2) 4.6 g (20.0 mmol) obtained in the section (1) and 23 ml of acetic acid (manufactured by Wako Pure Chemical Industries, Ltd.) were put into a round-bottom flask equipped with a stirring device, and dissolved. Furthermore, 3.3 g (40.0 mmol) of a 37% formalin solution (manufactured by Wako Pure Chemical Industries, Ltd.) was added thereto and reacted for 2 hours at 60° C. After the reaction, the solvent was distilled away from the reaction solution by concentration under reduced pressure, 40 ml of a saturated aqueous sodium bicarbonate was added thereto, and extraction was performed using ethyl acetate. The extracted solution was washed with water, the solvent was distilled away by concentration under reduced pressure to afford a yellow liquid. The liquid was purified using a silica gel column to afford 4.6 g (yield: 98%) of a dibromo substance (compound 3) as a colorless liquid.

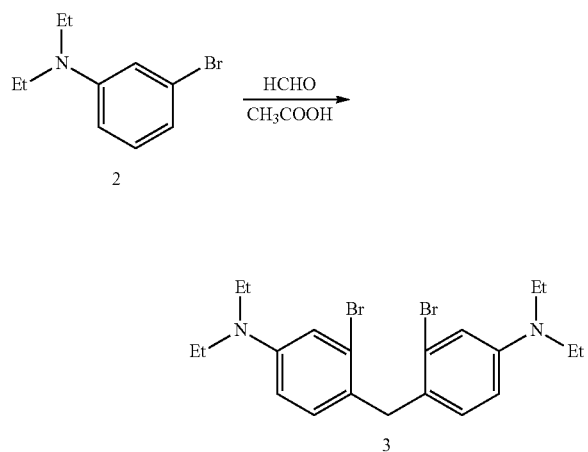

(3) Synthesis of Silyl-Xanthone Substance (Compound 4)

The dibromo substance (compound 3) 12.6 g (27.0 mmol) obtained in the section (2) and 500 ml of tetrahydrofuran were put into a round-bottom flask equipped with a stirring device, dissolved, and cooled to −60° C. Then, 81.0 ml (81.0 mmol) of 1.0 M sec-butyllithium hexane-cyclohexane solution (manufactured by KANTO KAGAKU) was added dropwise thereto and reacted for 1 hour at −60° C. Thereafter, 6.3 g (48.6 mmol) of dichlorodimethylsilane (manufactured by TOKYO CHEMICAL INDUSTRY CO., LTD.) was added thereto and reacted for 3 hours at room temperature. After the reaction, 1 N hydrochloric acid was added to the reaction solution, and extraction was performed using ethyl acetate. The extracted solution was washed with water, and the solvent was distilled away by concentration under reduced pressure to afford a brown liquid. Acetone (250 ml) was added to the liquid, and the liquid was cooled to 0° C. Subsequently, 10.7 g (67.5 mmol) of potassium permanganate (manufactured by Wako Pure Chemical Industries, Ltd.) was added thereto in divided portions, and a reaction was performed for 14 hours at 0° C. After the reaction, insoluble matters were removed from the reaction solution by filtration through celite, the solvent was distilled away by concentration under reduced pressure to afford a yellow liquid. The liquid was purified using a silica gel column to afford 4.5 g (yield: 44%) of a silyl-xanthone substance (compound 4) as a yellow solid.

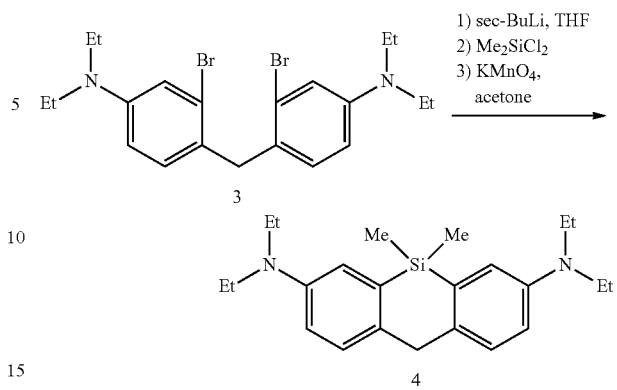

(4) Synthesis of Ester Substance (Compound 6)

2-Iodobenzoate (compound 5: manufactured by Wako Pure Chemical Industries, Ltd.) 10.7 g (43.0 mmol) and 130 ml of dichloromethane were put into a round-bottom flask equipped with a stirring device, and dissolved. Then, 3.8 g (51.6 mmol) of tert-butyl alcohol (manufactured by Wako Pure Chemical Industries, Ltd.), 6.3 g (51.6 mmol) of 4-dimethylaminopyridine (DMAP) (manufactured by Wako Pure Chemical Industries, Ltd.), and 10.7 g (51.6 mmol) of dicyclohexylcarbodiimide (DCC) (manufactured by Wako Pure Chemical Industries, Ltd.) were added thereto, and reacted for 8 hours at room temperature. After the reaction, insoluble matters were removed from the reaction solution by filtration through celite, the solvent was distilled away by concentration under reduced pressure to afford a yellow liquid. The liquid was purified using a silica gel column to afford 10.4 g (yield: 80%) of an ester substance (compound 6) as a colorless liquid.

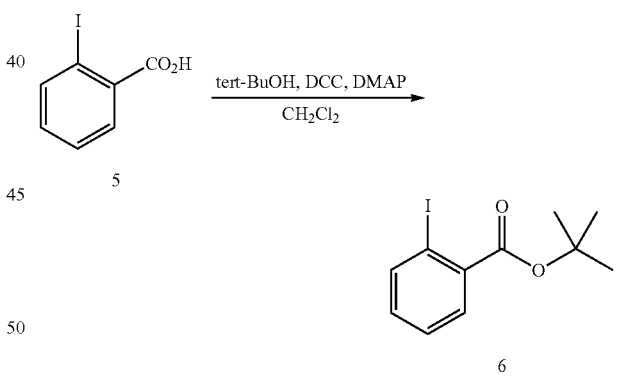

(5) Synthesis of Carboxylic Acid Substance (Compound 7)

The ester substance (compound 6) 1.5 g (5.0 mmol) obtained in the section (4) and 30 ml of THF were put into a round-bottom flask equipped with a stirring device, dissolved, and cooled to −60° C. Then, 10.3 ml (10.3 mmol) of 1.0 M sec-butyllithiumhexane-cyclohexane solution (manufactured by KANTO KAGAKU) was added dropwise thereto, and reacted for 1 hour at −60° C. Thereafter, 1.0 g (2.5 mmol) of the silyl-xanthone substance (compound 4) obtained in the section (3) was added thereto, and reacted for 3 hours at room temperature. The solvent was distilled away from the reaction solution by concentration under reduced pressure, and then 20 ml of dichloromethane, 0.5 g (4.5 mmol) of concentrated hydrochloric acid (manufactured by Wako Pure Chemical Industries, Ltd.), and 1.9 g (2.5 mmol) of a lithium salt of tetrakis(pentafluorophenyl)boron (IV) (LiFABA) (manufactured by Tosoh Finechem Corporation.) were added to the obtained brown liquid, and reacted for 7 hours at room temperature. After the reaction, the reaction solution was diluted with dichloromethane and washed with water, and the solvent was distilled away from the reaction solution by concentration under reduced pressure to afford a green solid. The solid were purified using a silica gel column to afford 0.7 g (yield: 24%) of a carboxylic acid substance (compound 7) as a blue solid having a tetrakis(pentafluorophenyl)boron (IV) anion as a counter anion.

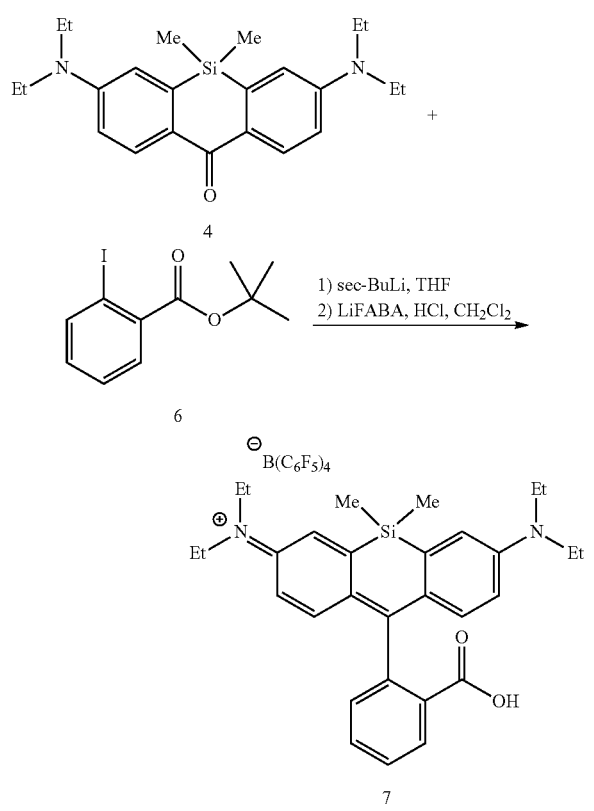

Example 2 Synthesis of Monomer (Compound 9)

The carboxylic acid substance (compound 7) 0.7 g (0.6 mmol) obtained in Example 1 and 6 ml of dichloromethane were put into a round-bottom flask equipped with a stirring device, and dissolved. Then, 0.1 g (0.7 mmol) of 2-hydroxyethyl methacrylate (compound 8: manufactured by Wako Pure Chemical Industries, Ltd.), 10 mg (0.1 mmol) of 4-dimethylaminopyridine (DMAP) (manufactured by Wako Pure Chemical Industries, Ltd.) and 0.2 g (1.0 mol) of 1-ethyl-3-(3-dimethylaminopropyl)carbodiimide hydrochloride (WSC) (manufactured by Toyobo Co., Ltd) were added thereto, and reacted for 8 hours at room temperature. After the reaction, the reaction solution was washed with water, and the solvent was distilled away by concentration under reduced pressure to afford reddish a brown solid. The solid were purified using a silica gel column to afford 0.3 g (yield: 39%) of a monomer (compound 9) as a dark blue solid.

Experimental Example 1 Evaluation of Quenching of Rhodamine B by Monomer (Compound 9)

(1) Measurement of Fluorescence from Compound to be Quenched

Rhodamine B (manufactured by Wako Pure Chemical Industries, Ltd.) 10.5 mg (0.022 mmol) was put into a volumetric flask and diluted with methanol such that the volume became 100 ml in total. By using a volumetric pipette, 1 ml of the solution was aliquoted and diluted again with methanol such that the volume became 100 ml in total. The obtained solution was named A solution. By using a volumetric pipette, 2 ml of the A solution was aliquoted and diluted with methanol such that the volume became 20 ml in total (concentration of rhodamine B: $2.19 \times 10^{-7}$ mol/L). By using a spectrofluorophotometer (spectrofluorophotometer F-4500 manufactured by Hitachi, LTD.), the fluorescence intensity (Ia) of the obtained solution at a maximum fluorescence wavelength was measured.

(2) Quenching Evaluation

The compound 9 obtained in Example 2 was taken in an amount of 10.3 mg (0.0081 mmol) and diluted with methanol such that the volume became 100 ml in total. The resulting solution was named B solution. By using a volumetric pipette, 2 ml of the A solution and 12 ml of the B solution were aliquoted and diluted with methanol such that the volume became 20 ml in total (concentration of compound 9: $4.84 \times 10^{-5}$ mol/L). By using a spectrofluorophotometer (spectrofluorophotometer F-4500 manufactured by Hitachi, LTD.), the fluorescence intensity (Ib) of the obtained solution at a maximum fluorescence wavelength was measured. From the measured values of Ia and Ib, a rate of reduction in fluorescence intensity (%) was calculated.

Rate of reduction in fluorescence intensity (%)=(Ia−Ib)/Ia×100

Experimental Example 2 Evaluation of Quenching of Cresyl Violet Acetate by Monomer (Compound 9)

(1) Measurement of Fluorescence from Compound to be Quenched

Cresyl violet acetate (manufactured by Wako Pure Chemical Industries, Ltd.) 10.2 mg (0.032 mmol) was put into a volumetric flask and diluted with methanol such that the volume became 100 ml in total. By using a volumetric pipette, 1 ml of the solution was aliquoted and diluted again with methanol such that the volume became 100 ml in total. The obtained solution was named C solution. By using a volumetric pipette, 5 ml of the C solution was aliquoted and diluted with methanol such that the volume became 20 ml in total (concentration of cresyl violet acetate: $7.94 \times 10^{0.7}$ mol/L). By using a spectrofluorophotometer (spectrofluorophotometer F-4500 manufactured by Hitachi, LTD.), the fluorescence intensity (Ic) of the obtained solution at a maximum fluorescence wavelength was measured.

(2) Quenching Evaluation

By using a volumetric pipette, 12 ml of the B solution and 5 ml of the C solution were aliquoted and diluted with methanol such that the volume became 20 ml in total (concentration of compound 9: $4.84 \times 10^{-5}$ mol/L). By using a spectrofluorophotometer (spectrofluorophotometer F-4500 manufactured by Hitachi, LTD.), the fluorescence intensity (Id) of the obtained solution at a maximum fluorescence wavelength was measured. From the measured values of Ic and Id, a rate of reduction in fluorescence intensity (%) was calculated.

Rate of reduction in fluorescence intensity (%)=(Ic−Id)/Ic×100

Comparative Example 1 Evaluation of Quenching of Rhodamine B by Diethylacrylamide Diethylacrylamide (manufactured by Wako Pure Chemical Industries, Ltd.) was taken in an amount of 12.5 mg (0.00098 mmol) and diluted with methanol such that the volume became 100 ml in total. The resulting solution was named B' solution. By using a volumetric pipette, 2 ml of the A solution obtained in Experimental Example 1 and 1 ml of the B' solution were aliquoted and diluted with methanol such that the volume became 20 ml in total (concentration of diethylacrylamide: $4.91 \times 10^{-5}$ mol/L). By using a spectrofluorophotometer (spectrofluorophotometer F-4500 manufactured by Hitachi, LTD.), the fluorescence intensity (Ib') of the obtained solution at a maximum fluorescence wavelength was measured. From the value of Ia obtained in Experimental Example 1 and the measured value of Ib', a rate of reduction in fluorescence intensity (%) was calculated.

Rate of reduction in fluorescence intensity (%)=(Ia−Ib')/Ia×100

Comparative Example 2 Evaluation of Quenching of Rhodamine B by Pyridine

A rate of reduction in fluorescence intensity was calculated by the same method as that in Comparative Example 1, except that 12.0 mg (0.0015 mmol) of pyridine (manufactured by Wako Pure Chemical Industries, Ltd.) was used instead of diethylacrylamide in Comparative Example 1 (concentration of pyridine: $7.58 \times 10^{-5}$ mol/L).

Comparative Example 3 Evaluation of Quenching of Rhodamine B by Triphenylamine

A rate of reduction in fluorescence intensity was calculated by the same method as that in Comparative Example 1, except that 28.2 mg (0.0011 mmol) of triphenylamine (manufactured by Wako Pure Chemical Industries, Ltd.) was used instead of diethylacrylamide in Comparative Example 1 (concentration of triphenylamine: $5.74 \times 10^{-5}$ mol/L).

Comparative Example 4 Evaluation of Quenching of Rhodamine B by N,N-Diethylaniline A rate of reduction in fluorescence intensity was calculated by the same method as that in Comparative Example 1, except that 20.0 mg (0.0013 mmol) of N,N-diethylaniline (manufactured by Wako Pure Chemical Industries, Ltd.) was used instead of diethylacrylamide in Comparative Example 1 (concentration of N,N-diethylaniline: $6.70 \times 10^{-5}$ mol/L).

Comparative Example 5 Evaluation of Quenching of Rhodamine B by p-Aminobenzoate

A rate of reduction in fluorescence intensity was calculated by the same method as that in Comparative Example 1, except that 14.3 mg (0.0010 mmol) of p-aminobenzoate (manufactured by Wako Pure Chemical Industries, Ltd.) was used instead of diethylacrylamide in Comparative Example 1 (concentration of p-aminobenzoate: $5.21 \times 10^{0.5}$ mol/L).

The results of Experimental Examples 1 and 2 are shown in Table 1. In addition, the results of Comparative Examples 1 to 5 are shown in Table 2.

TABLE 1

| Experimental Example | Quencher | Compound to be quenched | Concentration of compound 9 (mol/L) | Rate of reduction in fluorescence intensity (%) |
|---|---|---|---|---|
| Experimental Example 1 | Compound 9 | Rhodamine B | $4.84 \times 10^{-5}$ | 47.1 |
| Experimental Example 2 | Compound 9 | Cresyl violet acetate | $4.84 \times 10^{-5}$ | 94.1 |

TABLE 2

| Comparative Example | Quencher | Compound to be quenched | Concentration of each compound (mol/L) | Rate of reduction in fluorescence intensity (%) |
|---|---|---|---|---|
| Comparative Example 1 | Diethylacrylamide | Rhodamine B | $4.91 \times 10^{-5}$ | 2.3 |
| Comparative Example 2 | Pyridine | Rhodamine B | $7.58 \times 10^{-5}$ | 2.2 |

TABLE 2-continued

| Comparative Example | Quencher | Compound to be quenched | Concentration of each compound (mol/L) | Rate of reduction in fluorescence intensity (%) |
|---|---|---|---|---|
| Comparative Example 3 | Triphenylamine | Rhodamine B | $5.74 \times 10^{-5}$ | 5.1 |
| Comparative Example 4 | N,N-diethylaniline | Rhodamine B | $6.70 \times 10^{-5}$ | 5.9 |
| Comparative Example 5 | p-Aminobenzoate | Rhodamine B | $5.21 \times 10^{-5}$ | 5.9 |

From the results shown in Table 1, it was confirmed that to various fluorescent compounds such as rhodamine B having a xanthene skeleton and cresyl violet acetate having a benzo[a]phenoxazine skeleton, the quencher of the present invention demonstrates a quenching ability that is high enough to inhibit the fluorescence emission of the compounds. Furthermore, by the comparison between the result of Experimental Example 1 shown in Table 1 and the results of Comparative Examples 1 to 5 shown in Table 2, it was confirmed that the quencher of the present invention brings about a quenching effect that is higher than that of quenchers of the related art such as diethylacrylamide.

Synthesis Example 1 Synthesis of Dye Polymer (Derived from MMA/Compound 10)

(1) Synthesis of Dye Monomer (Compound 10)

According to the method described in WO2014/126167A, a dye monomer (compound 10) was synthesized.

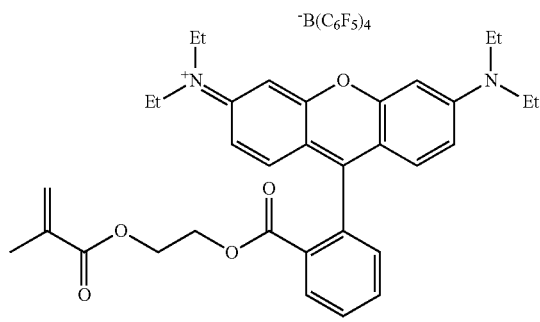

10

(2) Synthesis of Dye Polymer (Derived from MMA/Compound 10)

Propylene glycol monomethyl ether acetate (PGMEA) (manufactured by Daicel Corporation) (105 g) was put into a round-bottom flask equipped with a stirring device, nitrogen purging was performed, and the flask was heated to 95° C. The dye monomer (compound 10) 15 g (12.1 mmol) obtained in (1), 285.03 g (2.85 mol) of methyl methacrylate (MMA) (manufactured by Wako Pure Chemical Industries, Ltd.), 15 g (65.1 mmol) of methyl 2,2'-azobis(2-methylpropionate) (trade name V-601: manufactured by Wako Pure Chemical Industries, Ltd.), and 105 g of PGMEA were put into a conical flask and dissolved, and the resulting solution was added dropwise to the round-bottom flask for 2 hours at 95° C. After the dropwise addition, the solution was reacted for 2 hours at 95° C. After the reaction, 1,200 g of ethyl acetate was added thereto, and the resulting solution was added dropwise to 5.2 L of hexane so as to cause reprecipitation. The reprecipitated polymer was removed by filtration and dried under reduced pressure to afford 322.06 g (yield: 100%) of a red dye polymer (derived from MMA/compound 10).

Example 3 Synthesis of Polymer (MMA:Compound 9=95:5)

PGMEA (manufactured by Daicel Corporation) (1.75 g) was put into a round-bottom flask equipped with a stirring device, nitrogen purging was performed, and the flask was heated to 95° C. The monomer (compound 9) 0.25 g (0.20 mmol) obtained in Example 2, 4.75 g (47.44 mmol) of MMA (manufactured by Wako Pure Chemical Industries, Ltd.), 0.25 g (1.09 mmol) of methyl 2,2'-azobis(2-methylpropionate) (trade name V-601: manufactured by Wako Pure Chemical Industries, Ltd.), and 1.75 g of PGMEA were put into a conical flask and dissolved, and the resulting solution was added dropwise to the round-bottom flask for 2 hours at 95° C. After the dropwise addition, the solution was reacted for 2 hours at 95° C. After the reaction, 14 g of ethyl acetate was added thereto, and the resulting solution was added dropwise to 80 mL of hexane so as to cause reprecipitation. The reprecipitated polymer was removed by filtration and dried under reduced pressure to afford 4.62 g (yield: 88%) of a red polymer (derived from MMA/compound 9, MMA:compound 9=95:5).

Experimental Example 3 Evaluation of Quenching of Dye Polymer by Polymer (MMA:Compound 9=95:5)

(1) Measurement of Fluorescence from Compound to be Quenched

The dye polymer (derived from MMA/compound 10) 9.9 mg (amount of the compound 10: $4.01 \times 10^7$ mol) obtained in Synthesis Example 1 was put into a volumetric flask and diluted with PGMEA such that the volume became 100 ml in total. The resulting solution was named D solution. By using a volumetric pipette, 1 ml of the D solution was aliquoted and diluted again with PGMEA such that the volume became 20 ml in total (concentration of compound 10: $2.00 \times 10^{-8}$ mol/L). By using a spectrofluorophotometer (spectrofluorophotometer F-4500 manufactured by Hitachi, LTD.), the fluorescence intensity (Ie) of the obtained solution at a maximum fluorescence wavelength was measured.

(2) Quenching Evaluation

The polymer (MMA:compound 9=95:5) 100 mg (amount of compound 9: $3.92 \times 10^{-6}$ mol) obtained in Example 3 and 1 ml of the D solution aliquoted using a volumetric pipette were diluted with PGMEA such that the volume became 20 ml in total (concentration of compound 9: $1.96 \times 10^{-4}$ mol/L). By using a spectrofluorophotometer (spectrofluorophotometer F-4500 manufactured by Hitachi, LTD.), the fluorescence intensity (If) of the obtained solution at a maximum fluorescence wavelength was measured. From the measured values of Ie and If, a rate of reduction in fluorescence intensity (%) was calculated.

Rate of reduction in fluorescence intensity (%)=(Ie−If)/Ie×100

The result of Experimental Example 3 is shown in Table 3.

TABLE 3

| Experimental Example | Quencher | Object to be quenched | Concentration of compound 9 (mol/L) | Rate of reduction in fluorescence intensity (%) |
|---|---|---|---|---|
| Experimental Example 3 | Polymer of present invention (MMA:compound 9 = 95:5) | Dye polymer (derived from MMA/compound 10) | $1.96 \times 10^{-4}$ | 92.9 |

From the results shown in Table 3, it was confirmed that the polymer of the present invention exerts a sufficient quenching effect on a fluorescent dye polymer. That is, it was confirmed that just as the compound of the present invention, the polymer of the present invention also demonstrates a quenching ability which is high enough to sufficiently inhibit the emission of fluorescence from fluorescent compounds.

The invention claimed is:
1. A polymer comprising:
a monomer unit derived from a compound represented by the following general formula (3),

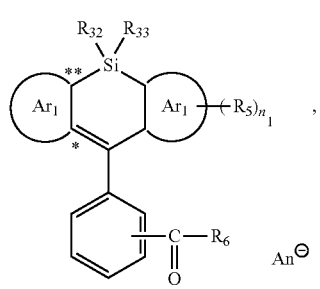
(3)

where, in the formula (3), $n_1$ pieces of $R_5$ each independently represent a group having a polymerizable unsaturated group, a halogeno group, an alkyl group having 1 to 20 carbon atoms, an alkoxy group having 1 to 20 carbon atoms, an alkylthio group having 1 to 20 carbon atoms, an amino group that has a substituent or is unsubstituted, a hydroxy group, an aryl group having 6 to 14 carbon atoms, an aryloxy group having 6 to 14 carbon atoms, or an arylalkyl group having 7 to 20 carbon atoms, $R_6$ represents a group having an acryloyl group or a methacryloyl group, a hydroxy, group, an alkoxy group having 1 to 20 carbon atoms, an amino group that has a substituent or is unsubstituted, or a heterocyclic amino group, $Ar_2$ represents a benzene ring, a naphthalene ring, or an anthracene ring, $n_1$ represents an integer of 0 to 4 if $Ar_2$ is the benzene ring, $n_1$ represents an integer of 0 to 6 if $Ar_2$ is the naphthalene ring, $n_1$ represents an integer of 0 to 8 if $Ar_2$ is the anthracene ring, $R_{32}$ and $R_{33}$ each independently represent an alkyl group having 1 to 6 carbon atoms or an aryl group having 6 to 14 carbon atoms, An⁻ represents an anion, $Ar_1$ represents a ring structure represented by any of the following general formulae (1-1) to (1-7), and

* and ** each represent a position of bonding to the ring structure represented by any of the general formulae (1-1) to (1-7),

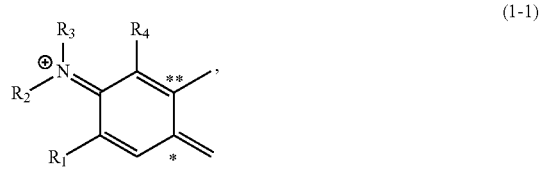
(1-1)

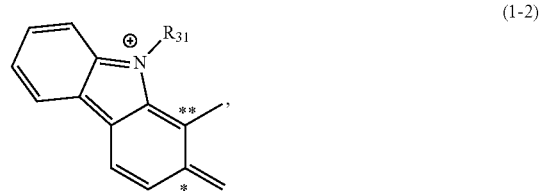
(1-2)

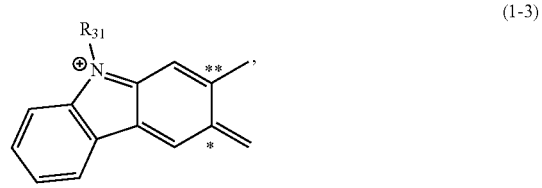
(1-3)

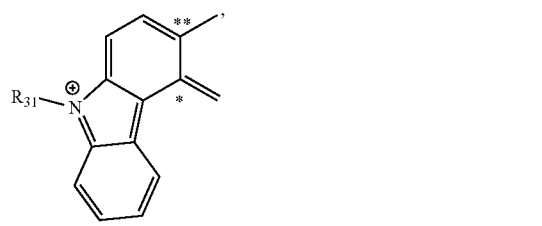
(1-4)

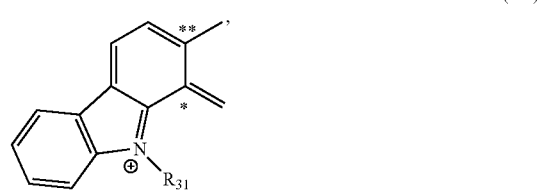
(1-5)

-continued (1-6)

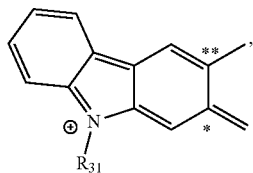

(1-7)

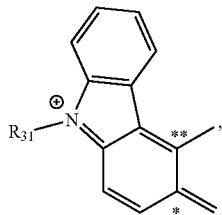

where, in the formula (1-1), $R_1$ and $R_4$ each represent a hydrogen atom, $R_2$ and $R_3$ each independently represent a group having a polymerizable unsaturated group, an alkyl group having 1 to 20 carbon atoms, or an aryl group having 6 to 14 carbon atoms that has a substituent or is unsubstituted,

* and ** each represent the same position as the position represented by each of * and ** in the general formula (3), $R_1$ and $R_2$ may form an alkylene group having 2 to 4 carbon atoms together, and $R_3$ and $R_4$ may form an alkylene group having 2 to 4 carbon atoms together, where, in the formulae (1-2) to (1-7), $R_{31}$ represents a group having a polymerizable unsaturated group or an alkyl group having 1 to 20 carbon atoms, and * and ** each represent the same position as the position represented by each of * and ** in the general formula (3), and at least one of $R_2$, $R_3$, $n_1$ pieces of $R_5$, and $R_{31}$ is a group having a polymerizable unsaturated group or $R_6$ is a group having an acryloyl group or a methacryloyl group.

2. The polymer according to claim 1, wherein the compound represented by the general formula (3) is a compound represented by the following general formula (3-3):

(3-3)

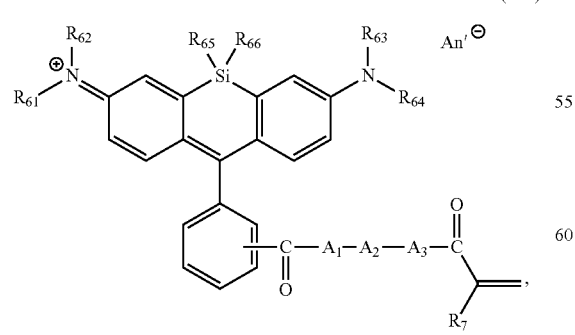

where, in the formula (3-3), $R_7$ represents a hydrogen atom or a methyl group, $R_{61}$ and $R_{62}$ each independently represent an alkyl group having 1 to 12 carbon atoms or a phenyl group that has an alkyl group having 1 to 6 carbon atoms or is unsubstituted, $R_{63}$ and $R_{64}$ each independently represent an alkyl group having 1 to 6 carbon atoms, a phenyl group, or a phenylalkyl group having 7 to 9 carbon atoms, $R_{65}$ and $R_{66}$ each independently represent an alkyl group having 1 to 6 carbon atoms or a phenyl group, $A_2$ represents an alkylene group having 1 to 21 carbon atoms that has at least one group selected from —O—, —OCO—, —COO—, —NHCONH—, and an arylene group in the chain; an alkylene group having 1 to 21 carbon atoms that has at least one group selected from —O—, —OCO—, —COO—, —NHCO—, —CONH—, —NHCONH—, and an arylene group in the chain and has a hydroxy group as a substituent; an alkylene group having 1 to 21 carbon atoms that has a hydroxy group as a substituent; or an alkylene group having 1 to 21 carbon atoms, $A_3$ represents —$NR_{10}$— or —O—, $R_{10}$ represents a hydrogen atom or an alkyl group having to 12 carbon atoms, and $An'^-$ represents an anion containing an aryl group having an electron-withdrawing substituent, a sulfonyl group having an electron-withdrawing substituent, a halogenated alkyl group, or a halogeno group, a halogen oxoacid anion, or a sulfonate anion, and $A_1$ represents —O— or a group represented by the following general formula (2-1), (2-1)

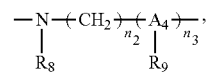

where, in the formula (2-1), $R_8$ represents a hydrogen atom, an alkyl group having 1 to 12 carbon atoms, or a group represented by the following general formula (2-4), (2-4)

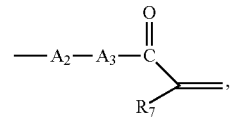

where, in the formulae (2-4), $R_7$, $A_2$, and $A_3$ are the same as $R_7$, $A_2$, and $A_3$ of the general formula (3-3), $R_9$ represents a hydrogen atom or an alkyl group having 1 to 12 carbon atoms, $A_4$ represents a nitrogen atom or a group represented by the following formula (2-2), (2-2)

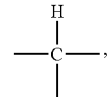

$n_2$ represents an integer of 0 to 3, $R_8$ and $R_9$ may form a cyclic structure of a 5- or 6-membered ring together with —N—$(CH_2)_{n2}$-$(A_4)_{n3}$- bonded to $R_8$ and $R_9$, in a case where $R_8$, $R_9$, and $-N-(CH_2)_{n2}-(A_4)_{n3}-$ form the cyclic structure of the 5- or 6-membered ring, $n_3$ represents 1, and in a case where $R_8$, $R_9$, and $-N-(CH_2)_{n2}-(A_4)_{n3}-$ do not form the cyclic structure of the 5- or 6-membered ring, $n_3$ represents 0 or 1.

3. The polymer according to claim 2,
wherein the compound represented by the general formula (3) is a compound represented by the following general formula (3-4);

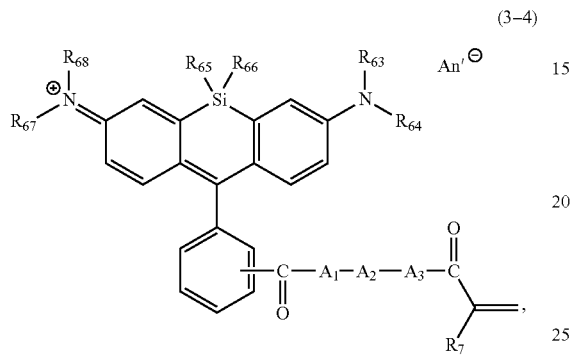

(3-4)

where, in the formula (3-4), $R_{67}$ and $R_{68}$ each independently represent an alkyl group having 1 to 6 carbon atoms or a phenyl group that has an alkyl group having 1 to 3 carbon atoms or is unsubstituted, and
$R_7$, $R_{63}$ to $R_{66}$, $A_1$ to $A_3$, and $An'^-$ are the same as $R_7$, $R_{63}$ to $R_{66}$, $A_1$ to $A_3$, and $An'^-$ of the general formula (3-3).

4. The polymer according to claim 3,
wherein the compound represented by the general formula (3) is a compound represented by the following general formula (3-5);

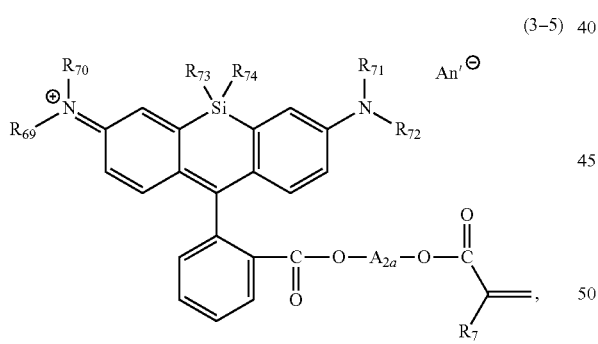

(3-5)

where, in the formula (3-5), $R_{69}$ to $R_{74}$ each independently represent an alkyl group having 1 to 4 carbon atoms, $A_{2a}$ represents an alkylene group having 1 to 21 carbon atoms, and
$R_7$ and $An'^-$ are the same as $R_7$ and $An'^-$ of the general formula (3-4).

5. The polymer according to claim 1, wherein the polymer is a copolymer.

6. The polymer according to claim 5, wherein the copolymer comprises, as constituent components:
the monomer unit derived from the compound represented by the general formula (3); and
a monomer unit derived from a fluorescent dye having a polymerizable unsaturated group and/or 1 or 2 kinds of monomer units derived from a compound represented by the following general formula (4), general formula (5), general formula (6), or general formula (7),

(4)

where, in the formula (4), $R_{11}$ represents a hydrogen atom or a methyl group, and $R_{12}$ represents a hydrogen atom, an alkyl group having 1 to 20 carbon atoms, a hydroxyalkyl group having 1 to 10 carbon atoms, an aryl group having 6 to 10 carbon atoms, an arylalkyl group having 7 to 13 carbon atoms, an alkoxyalkyl group having 2 to 9 carbon atoms, an alkoxyalkoxyalkyl group having 3 to 9 carbon atoms, an aryloxyalkyl group having 7 to 13 carbon atoms, a morpholinoalkyl group having 5 to 7 carbon atoms, a trialkylsilyl group having 3 to 9 carbon atoms, an alicyclic hydrocarbon group having 6 to 12 carbon atoms that has an oxygen atom, a dialkylaminoalkyl group having 3 to 9 carbon atoms, a fluoroalkyl group having 1 to 18 carbon atoms, a N-alkylenephthalimide group having 9 to 14 carbon atoms, a group represented by the following general formula (4-1), a group represented by the following general formula (4-2), or a group represented by the following general formula (4-3),

(4-1)

(4-2)

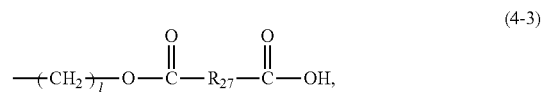

(4-3)

where, in the formula (4-1), q pieces of $R_{21}$ each independently represent an alkylene group having 1 to 3 carbon atoms that has a hydroxy group as a substituent or is unsubstituted, $R_{22}$ represents a phenyl group that has a hydroxy group as a substituent or is unsubstituted or represents an alkyl group having 1 to 3 carbon atoms, and q represents an integer of 1 to 3, where, in the formula (4-2), $R_{23}$ to $R_{25}$ each independently represent an alkyl group having 1 to 3 carbon atoms, and $R_{26}$ represents an alkylene group having 1 to 3 carbon atoms, where, in the formula (4-3), $R_{27}$ represents a phenylene group or a cyclohexylene group, and l represents an integer of 1 to 6,

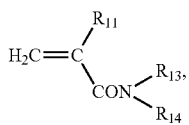
(5)

where, in the formula (5), $R_{13}$ represents a hydrogen atom or an alkyl group having 1 to 3 carbon atoms, $R_{14}$ represents a hydrogen atom, an alkyl group having 1 to 3 carbon atoms, a dialkylaminoalkyl group having 3 to 9 carbon atoms, or a hydroxyalkyl group having 1 to 10 carbon atoms, $R_{11}$ is the same as $R_{11}$ described above, and $R_{13}$ and $R_{14}$ may form a morpholine group together with a nitrogen atom adjacent thereto,

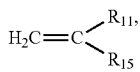
(6)

where, in the formula (6), $R_{15}$ represents a phenyl group or a pyrrolidino group, and $R_{11}$ is the same as $R_{11}$ described above,

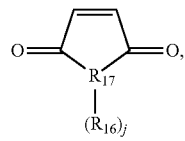
(7)

where, in the formula (7), $R_{17}$ represents a nitrogen atom or an oxygen atom, $R_{16}$ represents a hydrogen atom, an alkyl group having 1 to 20 carbon atoms, a hydroxyalkyl group having 1 to 10 carbon atoms, a halogenated alkyl group having 1 to 10 carbon atoms, an aryl group having 6 to 10 carbon atoms, or an aryl group having 6 to 10 carbon atoms that has a halogeno group or an alkyl group having 1 to 6 carbon atoms as a substituent, and j represents 0 in a case where $R_{17}$ is the oxygen atom and represents 1 in a case where $R_{17}$ is the nitrogen atom.

\* \* \* \* \*